(12) United States Patent
Hirai et al.

(10) Patent No.: US 8,419,972 B2
(45) Date of Patent: Apr. 16, 2013

(54) POLYMERIZABLE LIQUID CRYSTAL COMPOSITION

(75) Inventors: Yoshiharu Hirai, Chiba (JP); Kazumi Hagihara, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 130 days.

(21) Appl. No.: 12/591,062

(22) Filed: Nov. 6, 2009

(65) Prior Publication Data

US 2010/0117027 A1    May 13, 2010

(30) Foreign Application Priority Data

Nov. 7, 2008  (JP) .................................. 2008-286282
Sep. 16, 2009  (JP) .................................. 2009-214896

(51) Int. Cl.
*C09K 19/00*  (2006.01)
*C09K 19/06*  (2006.01)
*C09K 19/34*  (2006.01)
*C09K 19/52*  (2006.01)
*C08G 59/00*  (2006.01)

(52) U.S. Cl.
USPC ............. 252/299.6; 252/299.01; 252/299.61; 252/299.62; 252/299.63; 428/1.1; 349/182; 528/417; 528/418; 528/421

(58) Field of Classification Search ............. 252/299.01, 252/299.6–299.67; 428/1.1; 430/20; 349/1, 349/56, 182; 345/87; 528/417, 418, 421
See application file for complete search history.

(56) References Cited

U.S. PATENT DOCUMENTS

| | | | | |
|---|---|---|---|---|
| 6,800,219 | B2 * | 10/2004 | Ichihashi et al. ......... | 252/299.01 |
| 7,101,595 | B2 * | 9/2006 | Shundo et al. ............. | 428/1.1 |
| 7,527,837 | B2 * | 5/2009 | Shundo et al. ............. | 428/1.3 |
| 2003/0071947 | A1 | 4/2003 | Shiraogawa et al. | |
| 2005/0179005 | A1 | 8/2005 | Kato et al. | |
| 2006/0209238 | A1 | 9/2006 | Shiraogawa et al. | |
| 2009/0074990 | A1 * | 3/2009 | Shi et al. ................... | 428/1.1 |

FOREIGN PATENT DOCUMENTS

JP      2005-345982      12/2005

* cited by examiner

*Primary Examiner* — Geraldina Visconti
(74) *Attorney, Agent, or Firm* — Wenderoth, Lind & Ponack, L.L.P.

(57) ABSTRACT

A polymerizable liquid crystal composition is provided that is excellent in UV curing characteristics in the air and is excellent in orientation homogeneity, and a polymer film as a selective reflection film is provided that is obtained by orienting and polymerizing the composition on a supporting substrate. The liquid crystal composition contains a compound (1), a compound (2), a compound (3), a compound selected from a group of compounds represented by the formulae (4) to (6), and a surfactant. In the following formulae $Y^1$ to $Y^4$ and $Y^6$ are each alkylene, $A^2$, $A^3$, $A^{41}$, $A^{42}$, $A^{51}$, $A^{52}$ and $A^6$ are each a cyclic group, $Z^2$ to $Z^4$ and $Z^6$ are each a bonding group, $P^4$ and $P^6$ are each an integer of from 0 to 3, $R^2$, $R^{31}$ and $R^{32}$ are each hydrogen, halogen or alkyl, and $Q^1$ and $Q^2$ are each a polymerizable group.

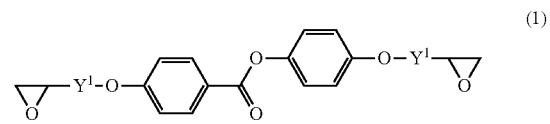

(1)

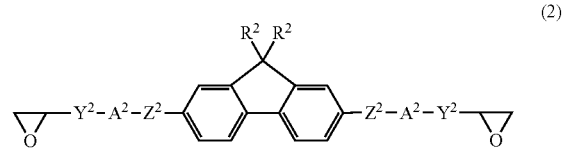

(2)

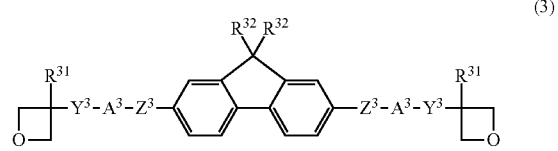

(3)

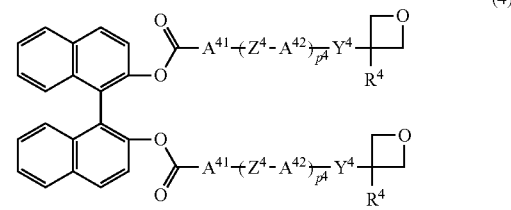

(4)

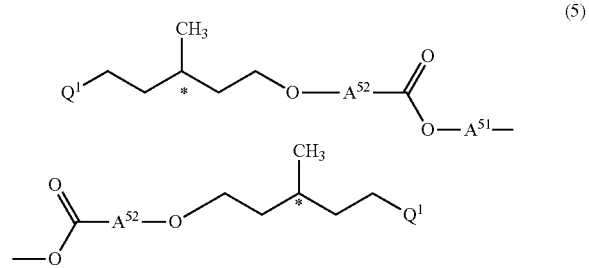

(5)

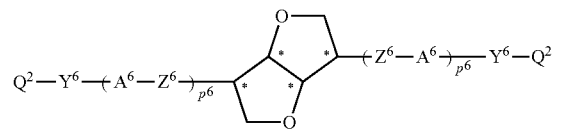

(6)

31 Claims, No Drawings

POLYMERIZABLE LIQUID CRYSTAL COMPOSITION

FIELD OF THE INVENTION

The present invention relates to a polymerizable liquid crystal composition having a planar orientation, a film having optical anisotropy obtained by polymerizing the composition, and use of the composition. The planar orientation referred herein is a name of an orientation state where a helical axis is perpendicular to a substrate surface.

BACKGROUND OF THE INVENTION

In recent years, a polymerizable liquid crystal compound is used for a film having optical anisotropy. The compound has optical anisotropy in a liquid crystal state, and the orientation of the liquid crystal compound is fixed through polymerization. The addition of an optically active compound to a polymerizable liquid crystal compound or composition induces a helical structure, and the compound or composition has various applications depending on the helical pitch.

Examples of the application utilizing selective reflection of visible light include a design application including ornamental members and an application to a color filter used in a liquid crystal display device. Furthermore, an application to anti-counterfeit technologies is also included since reflected light and transmitted light have peculiar metallic gloss and variation in color depending on viewing angles, and these optical characteristics cannot be duplicated with an ordinary duplicator. Moreover, such a brightness enhancing film is also proposed by utilizing a circularly polarized light separating function that has a polarizing plate laminated thereon a ¼ wavelength plate and an optically anisotropic film exhibiting a circularly polarized light separating function. These applications demand a circularly polarized light separating function over the whole visible light region (a wavelength range of from 350 to 750 nm), for which plural layers with different pitches are laminated, or the pitch is continuously changed in the thickness direction (see Patent Documents 1 and 2). Such a reflection film is also proposed that has a reflection wavelength range set at an near infrared region (a wavelength range of from 800 to 2,500 nm) (see Patent Document 3).

The inventors have provided a polymerizable liquid crystal composition exhibiting twisted orientation containing a polymerizable liquid crystal compound having an epoxy group and an oxetanyl group as a polymerizable group with an optically active compound (see Patent Document 4). Simplification in production process is expected since the polymerizable liquid crystal composition can be cured in the air, but there are some cases depending on the combination of polymerizable liquid crystal compounds where orientation defects occur in the drying step after coating to a supporting substrate, thereby causing a problem, such as appearance failure.

Patent Document 1: JP-A-2003-84269
Patent Document 2: JP-A-2005-345982
Patent Document 3: JP-A-2004-333671
Patent Document 4: JP-A-2005-263778

SUMMARY OF THE INVENTION

An object of the invention is to provide a polymerizable liquid crystal composition that is excellent in UV curing characteristics in the air and is excellent in orientation homogeneity. Another object of the invention is to provide a polymer film as a selective reflection film that is obtained by orienting and polymerizing the composition on a supporting substrate.

As a result of earnest investigations made by the inventors for attaining the aforementioned and other objects of the invention, they have found a polymerizable liquid crystal composition that is excellent in UV curing characteristics in the air and is excellent in orientation homogeneity. Furthermore, they have found that a polymer of the composition is excellent as a selective reflection film, thereby completing the invention. According to an aspect of the invention, a polymerizable liquid crystal composition shown by the following item [1] is provided.

[1] A liquid crystal composition containing a component A which is at least one compound selected from the group consisting of compounds represented by the formula (1), a component B which is at least one compound selected from the group consisting of compounds represented by the formula (2), a component C which is at least one compound selected from the group consisting of compounds represented by the formula (3), a component D which is at least one compound selected from the group consisting of compounds represented by the formulae (4) to (6), and a component E which is at least one surfactant selected from the group consisting of a nonionic surfactant, an anionic surfactant and a cationic surfactant:

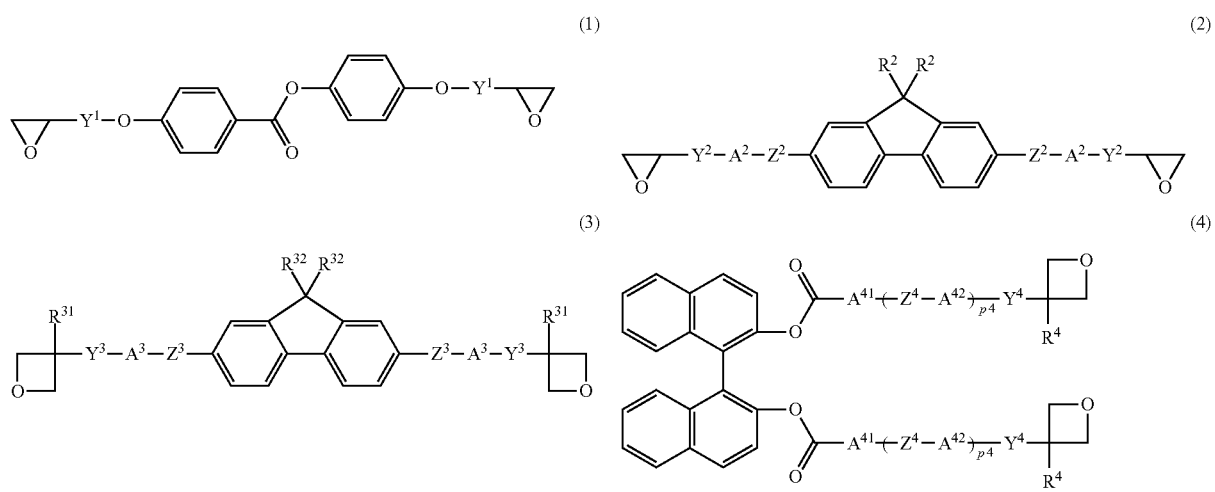

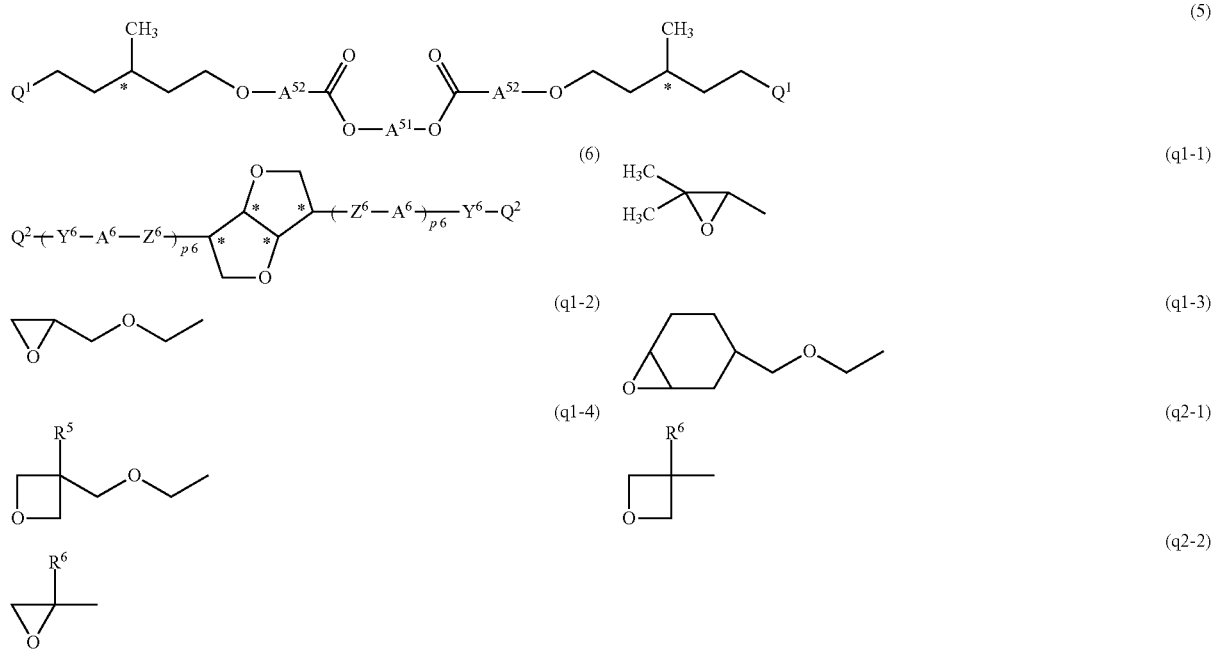

wherein in the formula (1), $Y^1$ independently represents alkylene having from 1 to 15 carbon atoms, and not-adjacent arbitrary —$CH_2$— in the alkylene may be replaced by —O—, —COO—, —OCO— or —CO—, in the formula (2), $Y^2$ independently represents alkylene having from 1 to 15 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-phenylene in which at least one hydrogen is replaced by halogen, methyl or trifluoromethyl, or 1,4-cyclohexylene in which at least one hydrogen is replaced by fluorine; $Z^2$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —$OCH_2$—; and $R^2$ independently represents hydrogen, fluorine, chlorine or alkyl having from 1 to 5 carbon atoms, in the formula (3), $Y^3$ independently represents alkylene having from 1 to 15 carbon atoms, and not-adjacent arbitrary —$CH_2$— in the alkylene may be replaced by —O—, —COO—, —OCO— or —CO—; $A^3$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-phenylene in which at least one hydrogen is replaced by halogen, methyl or trifluoromethyl, or 1,4-cyclohexylene in which at least one hydrogen is replaced by fluorine; $Z^3$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —$OCH_2$—; $R^{31}$ independently represents hydrogen or alkyl having from 1 to 5 carbon atoms; and $R^{32}$ independently represents hydrogen, fluorine, chlorine or alkyl having from 1 to 5 carbon atoms, in the formula (4), $R^4$ independently represents methyl or ethyl; $Y^4$ independently represents alkylene having from 1 to 15 carbon atoms, and not-adjacent arbitrary —$CH_2$— in the alkylene may be replaced by —O—, —COO—, —OCO— or —CO—; $A^{41}$ independently represents 1,4-phenylene or 4,4'-biphenylene; $A^{42}$ independently represents 1,4-phenylene, 4,4'-biphenylene or 1,4-phenylene in which at least one hydrogen is replaced by fluorine; $Z^4$ independently represents a single bond, —COO— or —OCO—; and $p^4$ independently represents an integer of from 0 to 3, and when $p^4$ is 2 or 3, plural rings represented by $A^{42}$ may be all the same rings or may be constituted by at least two kinds of different rings, and plural bonding groups represented by $Z^4$ may be all the same bonding groups or may be constituted by at least two kinds of different bonding groups, in the formula (5), $A^{51}$ represents 1,4-phenylene, 2-methyl-1,4-phenylene, fluoren-2,7-diyl, 9-methylfluoren-2,7-diyl, 9,9'-dimethylfluoren-2,7-diyl or naphthalen-2,6-diyl; $A^{52}$ independently represents 1,4-phenylene or 1,4-phenylene in which at least one hydrogen is replaced by halogen or methyl; $Q^1$ independently represents a group represented by one of the formulae (q1-1) to (q1-4), $R^5$ in the formula (q1-4) represents methyl or ethyl, and when both of two $Q^1$'s represent a group represented by the formula (q1-4), $R^5$ independently represents methyl or ethyl, and in the formula (6), $Y^6$ independently represents alkylene having from 1 to 15 carbon atoms, and not-adjacent arbitrary —$CH_2$— in the alkylene may be replaced by —O—, —COO—, —OCO— or —CO—; $A^6$ independently represents 1,4-phenylene, 4,4'-biphenylene or 1,4-phenylene in which at least one hydrogen is replaced by methyl or halogen; $Z^6$ independently represents a single bond, —COO—, —OCO—, —OCOO—, —CH=CH—COO—, —OCO—CH=CH—, —$C_2H_4$—COO— or —OCO—$C_2H_4$—; $p^6$ independently represents an integer of from 0 to 3, and when $p^6$ is 2 or 3, plural rings represented by $A^6$ may be all the same rings or may be constituted by at least two kinds of different rings, and plural bonding groups represented by $Z^6$ may be all the same bonding groups or may be constituted by at least two kinds of different bonding groups; and $Q^2$ independently represents a group represented by one of the formulae (q2-1) or (q2-2), wherein $R^6$ independently represents hydrogen, methyl or ethyl.

DETAILED DESCRIPTION OF THE INVENTION

The terms used herein are defined as follows. The term "liquid crystal compound" is a generic term for a compound that has a liquid crystal phase, such as a nematic phase and a smectic phase, and a compound that has no liquid crystal phase but is useful as a component of a liquid crystal composition. The term "liquid crystal display device" is a generic term for a liquid crystal display panel, a liquid crystal display module and the like. A compound represented by the formula (1) may be abbreviated as a compound (1). The abbreviation rule may also be applied to compounds represented by the other formulae, such as the formula (2). The term "arbitrary" used for describing the structures of the compounds includes not only an arbitrary position but also an arbitrary number. For example, the expression "arbitrary A may be replaced by B, C or D" not only includes the case where arbitrary A is replaced by B, the case where arbitrary A is replaced by C, and the case where arbitrary A is replaced by D, but also includes the case where arbitrary plural A are replaced by at least two of B, C and D. In the definition that arbitrary —$CH_2$— may be replaced by —O—, however, two groups of —$CH_2$— adjacent to each other are not replaced by —O— simultaneously to exclude a bonding group —O—O—. The substituent that is not clearly bonded to the position of the carbon atom constituting a ring, is free for the position within a range where no problem occurs chemically.

The invention includes the aforementioned item [1] and also includes the following items [2] to [24].

[2] The liquid crystal composition according to the item [1], wherein in the formula (1), $Y^1$ independently represents alkylene having from 1 to 12 carbon atoms, and not-adjacent arbitrary —$CH_2$— in the alkylene may be replaced by —O—, —COO—, —OCO— or —CO—, in the formula (2), $Y^2$ independently represents alkylene having from 1 to 12 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene, 1,4-cyclohexylene in which at least one hydrogen is replaced by fluorine, or 1,4-phenylene in which at least one hydrogen is replaced by fluorine or methyl; $Z^2$ independently represents —COO— or —OCO—; and $R^2$ independently represents hydrogen, fluorine or alkyl having from 1 to 3 carbon atoms, in the formula (3), $Y^3$ independently represents alkylene having from 1 to 12 carbon atoms, and not-adjacent arbitrary —$CH_2$— in the alkylene may be replaced by —O—, —COO—, —OCO— or —CO—; $A^3$ independently represents 1,4-phenylene, 1,4-cyclohexylene or 1,4-phenylene in which at least one hydrogen is replaced by fluorine or methyl; $Z^3$ independently represents —COO— or —OCO—; $R^{31}$ independently represents hydrogen, methyl or ethyl; and $R^{32}$ independently represents hydrogen, fluorine or alkyl having from 1 to 3 carbon atoms, in the formula (4), $Y^4$ independently represents alkylene having from 1 to 12 carbon atoms, and not-adjacent arbitrary —$CH_2$— in the alkylene may be replaced by —O—, —COO—, —OCO— or —CO—, in the formula (5), $A^{52}$ independently represents 1,4-phenylene or 1,4-phenylene in which at least one hydrogen is replaced by fluorine or methyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or fluorine; and $Z^6$ independently represents a single bond, —COO— or —OCO—, and the nonionic surfactant is a fluorine series, silicone series or hydrocarbon series nonionic surfactant; the anionic surfactant is a sulfate ester anionic surfactant; and the cationic surfactant is a quaternary ammonium cationic surfactant.

[3] The liquid crystal composition according to the item [1], wherein in the formula (1), $Y^1$ independently represents alkylene having from 1 to 12 carbon atoms, and not-adjacent arbitrary —$CH_2$— in the alkylene may be replaced by —O—, —COO—, —OCO— or —CO—, in the formula (2), $Y^2$ independently represents alkylene having from 1 to 12 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene or 1,4-phenylene in which at least one hydrogen is replaced by fluorine or methyl; $Z^2$ independently represents —COO— or —OCO—; and $R^2$ independently represents hydrogen, fluorine or methyl, in the formula (3), $Y^3$ independently represents alkylene having from 1 to 12 carbon atoms, and not-adjacent arbitrary —$CH_2$— in the alkylene may be replaced by —O—, —COO—, —OCO— or —CO—; $A^3$ independently represents 1,4-phenylene, 1,4-cyclohexylene or 1,4-phenylene in which at least one hydrogen is replaced by fluorine or methyl; $Z^3$ independently represents —COO— or —OCO—; $R^{31}$ independently represents hydrogen, methyl or ethyl; and $R^{32}$ independently represents hydrogen, fluorine or methyl, in the formula (4), $Y^4$ independently represents alkylene having from 1 to 12 carbon atoms, and not-adjacent arbitrary —$CH_2$— in the alkylene may be replaced by —O—, —COO—, —OCO— or —CO—; and $p^4$ independently represents an integer of from 0 to 2, and when $p^4$ is 2, two rings represented by $A^{42}$ may be the same rings or different rings, and two bonding groups represented by $Z^4$ may be the same bonding groups or different bonding groups, in the formula (5), $A^{51}$ represents 1,4-phenylene, 2-methyl-1,4-phenylene, fluoren-2,7-diyl, 9-methylfluoren-2,7-diyl or 9,9'-dimethylfluoren-2,7-diyl; and $A^{52}$ independently represents 1,4-phenylene or 1,4-phenylene in which at least one hydrogen is replaced by fluorine or methyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or fluorine; $Z^6$ independently represents a single bond, —COO— or —OCO—; and $p^6$ independently represents an integer of from 1 or 2, and when $p^6$ is 2, two rings represented by $A^6$ may be the same rings or different rings, and two bonding groups represented by $Z^6$ may be the same bonding groups or different bonding groups, and the nonionic surfactant is a fluorine series, silicone series or hydrocarbon series nonionic surfactant; the anionic surfactant is a sulfate ester anionic surfactant; and the cationic surfactant is a quaternary ammonium cationic surfactant.

[4] The liquid crystal composition according to the item [1], wherein in the formula (1), $Y^1$ represents alkylene having from 1 to 12 carbon atoms, and not-adjacent arbitrary —$CH_2$— in the alkylene may be replaced by —O—, —COO—, —OCO— or —CO—, in the formula (2), $Y^2$ represents alkylene having from 1 to 12 carbon atoms, and not-adjacent arbitrary —$CH_2$— in the alkylene may be replaced by —O—, —COO—, —OCO— or —CO—; $A^2$ represents 1,4-phenylene or 1,4-phenylene in which at least one hydrogen is replaced by fluorine or methyl; $Z^2$ independently represents —COO— or —OCO—; and $R^2$ independently represents hydrogen or methyl, in the formula (3), $Y^3$ represents alkylene having from 1 to 12 carbon atoms, and not-adjacent arbitrary —$CH_2$— in the alkylene may be replaced by —O—, —COO—, —OCO— or —CO—; $A^3$ represents 1,4-phenylene or 1,4-phenylene in which at least one hydrogen is replaced by fluorine; $Z^3$ independently represents —COO— or —OCO—; $R^{31}$ represents methyl or ethyl; and $R^{32}$ independently represents hydrogen or methyl, in the formula (4), $R^4$ represents methyl or ethyl; $Y^4$ independently represents alkylene having from 1 to 12 carbon atoms, and not-adjacent arbitrary —$CH_2$— in the alkylene may be replaced by —O—, —COO—, —OCO— or —CO—; $A^{41}$ represents 1,4-phenylene or 4,4'-biphenylene; $A^{42}$ represents 1,4-phenylene, 4,4'-biphenylene or 1,4-phenylene in which at least one hydrogen is replaced by fluorine; $Z^4$ represents a single bond, —COO— or —OCO—; and $p^4$ represents an integer of from 0 to 2, and when $p^4$ is 2, two rings represented by $A^{42}$ may be the same rings or different rings, and two bonding groups represented by $Z^4$ may be the same bonding groups or different bonding groups, in the formula (5), $A^{51}$ represents 1,4-phenylene, 2-methyl-1,4-phenylene, fluoren-2,7-diyl, 9-methylfluoren-2,7-diyl or 9,9'-dimethylfluoren-2,7-diyl; $A^{52}$ represents 1,4-phenylene or 1,4-phenylene in which at least one hydrogen is replaced by fluorine; and $Q^1$ represents a group represented by one of the formulae (q1-1) to (q1-4) and $R^5$ in formula (q1-4) represents methyl or ethyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or fluorine; $Z^6$ independently represents a single bond, —COO— or —OCO—; $p^6$ represents an integer of from 1 or 2, and when $p^6$ is 2, two rings represented by $A^6$ may be the same rings or different rings, and two bonding groups represented by $Z^6$ may be the same bonding groups or different bonding groups; and $Q^2$ represents a group represented by one of the formulae (q2-1) or (q2-2), wherein $R^6$ independently represents hydrogen, methyl or ethyl, and the nonionic surfactant is a fluorine series, silicone series or hydrocarbon series nonionic surfactant; the anionic surfactant is a sulfate ester anionic surfactant; and the cationic surfactant is a quaternary ammonium cationic surfactant.

[5] The liquid crystal composition according to one of the items [1] to [4], wherein a ratio of the component A is from 5 to 98% by weight, a ratio of the component B is from 1 to 60% by weight, and a ratio of the component C is from 1 to 35% by weight, based on a total amount of the components A to C; and a weight ratio of the component D is from 0.001 to 0.90, and a weight ratio of the component E is from 0.0001 to 0.015, based on a total amount of the components A to C.

[6] The liquid crystal composition according to one of the items [1] to [4], wherein a ratio of the component A is from 15 to 98% by weight, a ratio of the component B is from 1 to 55% by weight, and a ratio of the component C is from 1 to 30% by weight, based on a total amount of the components A to C; and a weight ratio of the component D is from 0.005 to 0.80, and a weight ratio of the component E is from 0.0001 to 0.01, based on a total amount of the components A to C.

[7] The liquid crystal composition according to one of the items [1] to [4], wherein a ratio of the component A is from 23 to 98% by weight, a ratio of the component B is from 1 to 50% by weight, and a ratio of the component C is from 1 to 27% by weight, based on a total amount of the components A to C; and a weight ratio of the component D is from 0.010 to 0.70, and a weight ratio of the component E is from 0.0001 to 0.007, based on a total amount of the components A to C.

[8] The liquid crystal composition according to one of the items [1] to [4], wherein a ratio of the component A is from 30 to 98% by weight, a ratio of the component B is from 1 to 45% by weight, and a ratio of the component C is from 1 to 25% by weight, based on a total amount of the components A to C; and a weight ratio of the component D is from 0.015 to 0.60, and a weight ratio of the component E is from 0.0003 to 0.007, based on a total amount of the components A to C.

[9] A polymer obtained by polymerizing the polymerizable liquid crystal composition according to one of the items [1] to [8].

[10] An optically anisotropic film having a liquid crystal phase fixed in orientation, obtained by coating the polymerizable liquid crystal composition according to one of the items [1] to [8] on a supporting substrate, orienting the coated composition, and then polymerizing the oriented composition through radiation with an electromagnetic wave.

[11] The optically anisotropic film according to the item [10], wherein the electromagnetic wave radiated is an ultraviolet ray.

[12] The optically anisotropic film according to the item [10] or [11], wherein the fixed orientation of the liquid crystal phase is a planar orientation.

[13] An optical device containing the optically anisotropic film according to one of the items [10] to [12].

[14] The optical device according to the item [13], wherein the optically anisotropic film has circular dichroism.

[15] The optical device according to the item [14], wherein the optical device exhibits circular dichroism to light having a wavelength of a part or the whole of a visible region of from 350 to 750 nm.

[16] The optical device according to the item [14], wherein the optical device exhibits circular dichroism to light having a wavelength of the whole of a visible region of from 350 to 750 nm with a helical structure induced by a chiral nematic phase or a cholesteric phase, in which a pitch is continuously changed in a thickness direction of the polymer having optical anisotropy.

[17] The optical device according to the item [15], wherein the optical device contains two or more layers of polymers each having different wavelength ranges exhibiting circular dichroism, and selectively reflects light having a wavelength of the whole range of from 350 to 750 nm.

[18] An optical device containing the optical device according to one of the items [13] to [17] having provided therewith a layer functioning as a ¼ wavelength plate.

[19] The optical device according to one of the items [13] to [18], wherein the optical device functions as a brightness enhancing film.

[20] The optical device according to the item [13] or [14], wherein the optical device exhibits circular dichroism to light having a wavelength of an ultraviolet region of from 100 to 350 nm.

[21] The optical device according to the item [13] or [14], wherein the optical device exhibits circular dichroism to light having a wavelength of a near infrared region of from 800 to 2,500 nm.

[22] The optical device according to the item [13] or [14], wherein the optical device exhibits circular dichroism to light having a wavelength of a range of from 800 to 2,500 nm, and contains two or more layers of polymers each having helical structures opposite to each other in helical direction induced by a chiral nematic phase or a cholesteric phase.

[23] The optical device according to the item [21] or [22], wherein the optical device functions as an infrared ray reflection film.

[24] A liquid crystal display device containing the optical device according to one of the items [13] to [20].

The polymerizable liquid crystal composition of the invention contains at least one of the compound (1) as the component A. The compound (1) has an ester bond structure containing two benzene rings and has two oxyranyl groups. The compound exhibits a nematic liquid crystal phase in a wide temperature range. The compound has an orientation direction of the liquid crystal molecules that is liable to be directed in parallel to the substrate. A polymer of the compound can have a three-dimensional structure and thus becomes a hard polymer as compared to a compound having one polymerizable group.

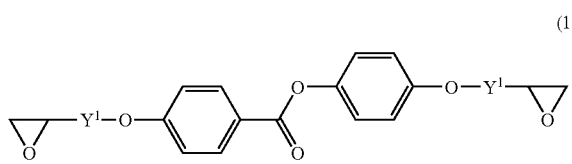

(1)

The symbols in the formula (1) have the following meanings.

$Y^1$ independently represents alkylene having from 1 to 15 carbon atoms. The alkylene is preferably linear alkylene and may be branched alkylene. And in the alkylene, not-adjacent arbitrary —$CH_2$— may be replaced by —O—, —COO—, —OCO— or —CO—. The alkylene preferably has from 1 to 12 carbon atoms. Two groups represented by $Y^1$ are preferably the same groups.

The polymerizable liquid crystal composition of the invention contains at least one of the compound (2) as the component B. The compound (2) has a fluorene skeleton and two oxyranyl groups. A polymer of the compound can have a three-dimensional structure and thus becomes a hard polymer as compared to a compound having one polymerizable group. The compound exhibits liquid crystallinity and has a function of increasing the birefringence (Δn). The compound has an orientation direction of the liquid crystal molecules that is liable to be directed in parallel to the substrate.

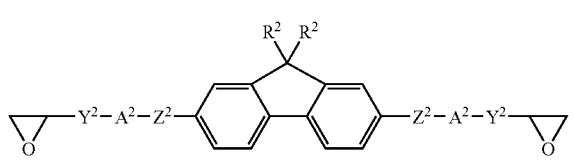

(2)

The symbols in the formula (2) have the following meanings.

$Y^2$ independently represents alkylene having from 1 to 15 carbon atoms. And in the alkylene, not-adjacent arbitrary —$CH_2$— may be replaced by —O—, —COO—, —OCO— or —CO—. The alkylene preferably has from 1 to 12 carbon atoms. Two groups represented by $Y^2$ are preferably the same groups.

$A^2$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-cyclohexylene in which at least one hydrogen is replaced by fluorine or 1,4-phenylene in which at least one hydrogen is replaced by halogen, methyl or trifluoromethyl. $A^2$ preferably represents 1,4-phenylene, 1,4-cyclohexylene, 1,4-cyclohexylene in which at least one hydrogen is replaced by fluorine or 1,4-phenylene in which at least one hydrogen is replaced by fluorine or methyl. $A^2$ more preferably represents 1,4-phenylene, 1,4-cyclohexylene or 1,4-phenylene in which at least one hydrogen is replaced by fluorine or methyl. $A^2$ further preferably represents 1,4-phenylene or 1,4-phenylene in which at least one hydrogen is replaced by fluorine. Two groups represented by $A^2$ are preferably the same groups.

$Z^2$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —O$CH_2$—. $Z^2$ preferably independently represents —COO— or —OCO—.

$R^2$ independently represents hydrogen, fluorine, chlorine or alkyl having from 1 to 5 carbon atoms. $R^2$ preferably independently represents hydrogen, fluorine or alkyl having from 1 to 3 carbon atoms. $R^2$ more preferably independently represents hydrogen, fluorine or methyl.

The polymerizable liquid crystal composition of the invention contains at least one of the compound (3) as the component C. The compound (3) has a fluorene skeleton and two oxyranyl groups. The compound exhibits liquid crystallinity. The compound has a function of accelerating cationic polymerization.

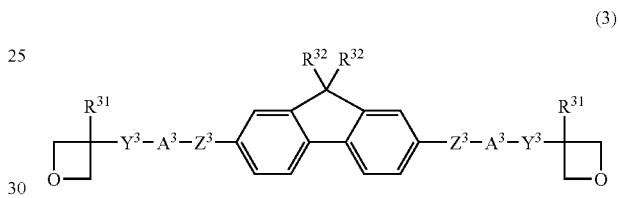

(3)

The symbols in the formula (3) have the following meanings.

$Y^3$ independently represents alkylene having from 1 to 15 carbon atoms. And in the alkylene, not-adjacent arbitrary —$CH_2$— may be replaced by —O—, —COO—, —OCO— or —CO—. The alkylene preferably has from 1 to 12 carbon atoms. Two groups represented by $Y^3$ are preferably the same groups.

$A^3$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-cyclohexylene in which at least one hydrogen is replaced by fluorine or 1,4-phenylene in which at least one hydrogen is replaced by halogen, methyl or trifluoromethyl. $A^3$ preferably independently represents 1,4-phenylene, 1,4-cyclohexylene or 1,4-phenylene in which at least one hydrogen is replaced by fluorine or methyl. $A^3$ more preferably independently represents 1,4-phenylene, 1,4-cyclohexylene or 1,4-phenylene in which at least one hydrogen is replaced by fluorine. $A^3$ further preferably represents 1,4-phenylene or 1,4-phenylene in which at least one hydrogen is replaced by fluorine.

$Z^3$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —O$CH_2$—. $Z^3$ preferably independently represents —COO— or —OCO—.

$R^{31}$ independently represents hydrogen or alkyl having from 1 to 5 carbon atoms. $R^{31}$ preferably independently represents hydrogen, methyl or ethyl. $R^{31}$ more preferably represents methyl or ethyl.

$R^{32}$ independently represents hydrogen, fluorine, chlorine or alkyl having from 1 to 5 carbon atoms. $R^{32}$ preferably independently represents hydrogen, fluorine or alkyl having from 1 to 3 carbon atoms. $R^{32}$ more preferably independently represents hydrogen, fluorine or methyl. $R^{32}$ further preferably independently represents hydrogen or methyl.

The polymerizable liquid crystal composition of the invention contains at least one optically active compound selected from compounds represented by the formulae (4) to (6) as a component D. The compound (4) has two oxyranyl groups. The compound has a function of controlling the helical pitch of the polymerizable liquid crystal composition.

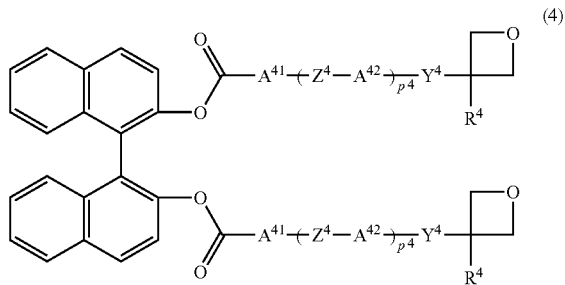

(4)

The symbols in the formula (4) have the following meanings.

$R^4$ independently represents methyl or ethyl. Two groups represented by $R^4$ are preferably the same groups.

$A^{41}$ independently represents 1,4-phenylene or 4,4'-biphenylene. Two groups represented by $A^{41}$ are preferably the same groups.

$A^{42}$ independently represents 1,4-phenylene, 4,4'-biphenylene or 1,4-phenylene in which at least one hydrogen is replaced by fluorine. Two groups represented by $A^{42}$ are preferably the same groups.

$Z^4$ independently represents a single bond, —COO— or —OCO—. Two groups represented by $Z^4$ are preferably the same groups.

$Y^4$ independently represents alkylene having from 1 to 15 carbon atoms. And in the alkylene, not-adjacent arbitrary —CH$_2$— may be replaced by —O—, —COO—, —OCO— or —CO—. $Y^4$ preferably has from 1 to 12 carbon atoms. Two groups represented by $Y^4$ are preferably the same groups.

$p^4$ independently represents an integer of from 0 to 3. when $p^4$ is 2 or 3, plural rings represented by $A^{42}$ may be all the same rings or may be constituted by at least two kinds of different rings, and plural bonding groups represented by $Z^4$ may be all the same bonding groups or may be constituted by at least two kinds of different bonding groups. $p^4$ preferably independently represents an integer of from 0 to 2, and when $p^4$ is 2, two rings represented by $A^{42}$ may be the same rings or different rings, and two bonding groups represented by $Z^4$ may be the same bonding groups or different bonding groups. Two integers represented by $p^4$ are preferably the same integers.

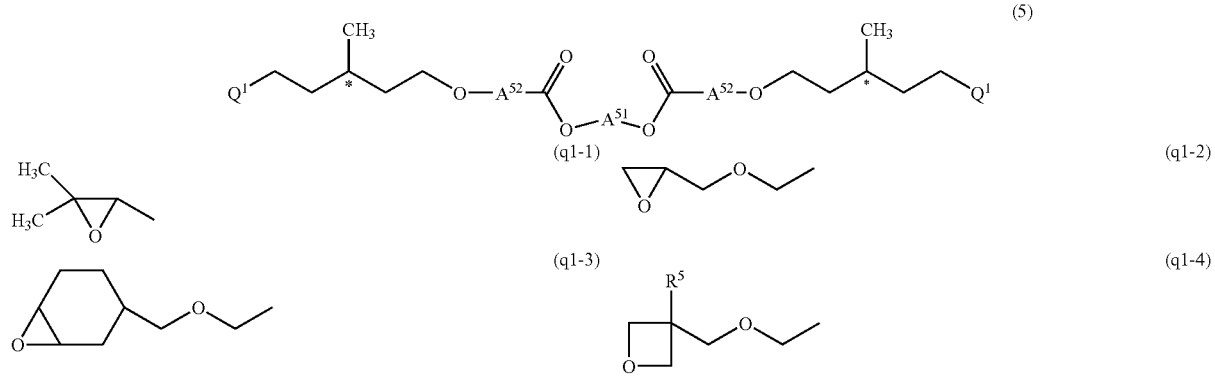

(5)

(q1-1)

(q1-2)

(q1-3)

(q1-4)

In the formula (5), $Q^1$ represents a group represented by one of the formulae (q1-1) to (q1-4). Accordingly, the formula (5) can be expanded to the following formulae (5-1) to (5-4):

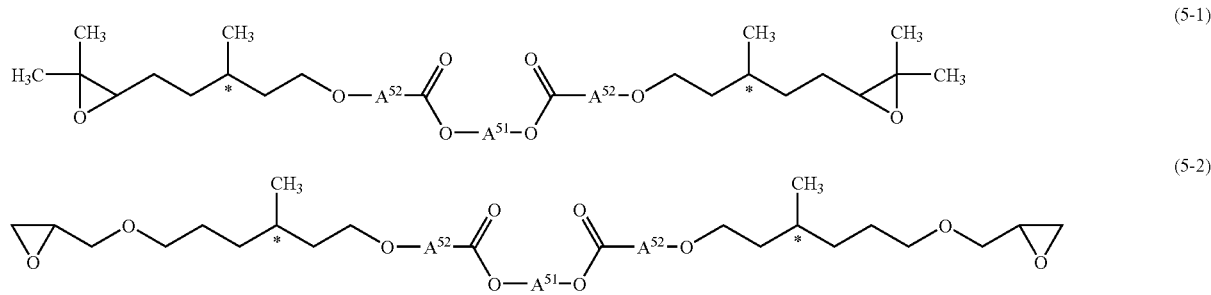

(5-1)

(5-2)

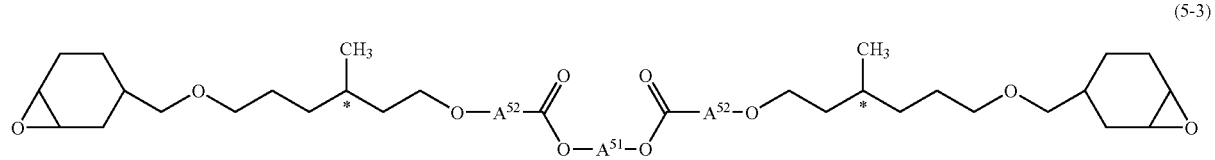

(5-3)

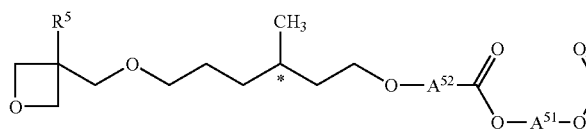
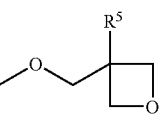
(5-4)

The symbols in the formulae (5-1) to (5-4) have the following meanings.

$R^5$ independently represents methyl or ethyl. Two groups represented by $R^5$ are preferably the same groups.

$A^{51}$ represents 1,4-phenylene, 2-methyl-1,4-phenylene, fluoren-2,7-diyl, 9-methylfluoren-2,7-diyl, 9,9'-dimethylfluoren-2,7-diyl or naphthalen-2,6-diyl.

$A^{52}$ independently represents 1,4-phenylene or 1,4-phenylene in which at least one hydrogen is replaced by halogen or methyl. $A^{52}$ preferably independently represents 1,4-phenylene or 1,4-phenylene in which at least one hydrogen is replaced by fluorine or methyl. $A^{52}$ more preferably represents 1,4-phenylene or 1,4-phenylene in which at least one hydrogen is replaced by fluorine.

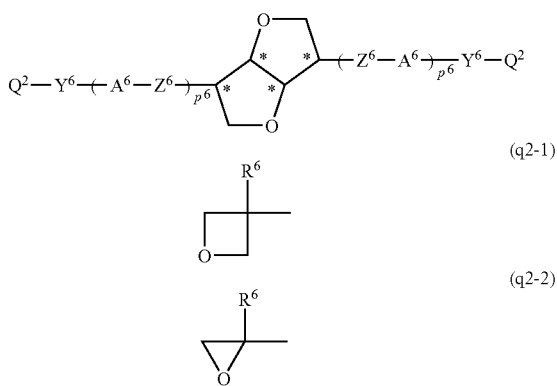

The symbols in the formula (6) have the following meanings.

$Q^2$ independently represents a group represented by the formula (q2-1) or the formula (q2-2), wherein $R^6$ independently represents hydrogen, methyl or ethyl. Two groups represented by $R^6$ in one formula are preferably the same groups.

$Y^6$ independently represents alkylene having from 1 to 15 carbon atoms. And in the alkylene, not-adjacent arbitrary —$CH_2$— may be replaced by —O—, —COO—, —OCO— or —CO—. $Y^6$ preferably has from 1 to 12 carbon atoms. Two groups represented by $Y^6$ are preferably the same groups.

$A^6$ independently represents 1,4-phenylene, 4,4'-biphenylene or 1,4-phenylene in which at least one hydrogen is replaced by methyl or halogen. $A^6$ preferably independently represents 1,4-phenylene, 4,4'-biphenylene or 1,4-phenylene in which at least one hydrogen is replaced by methyl or fluorine. Two groups represented by $A^6$ are preferably the same groups.

$Z^6$ independently represents a single bond, —COO—, —OCO—, —OCOO—, —CH=CH—COO—, —OCO—CH=CH—, —$C_2H_4$—COO— or —OCO—$C_2H_4$—. $Z^6$ preferably independently represents —COO— or —OCO—.

$p^6$ independently represents an integer of from 0 to 3, and when $p^6$ is 2 or 3, plural rings represented by $A^6$ may be all the same rings or may be constituted by at least two kinds of different rings, and plural bonding groups represented by $Z^6$ may be all the same bonding groups or may be constituted by at least two kinds of different bonding groups. $p^6$ preferably independently represents an integer of 1 or 2, and when $p^6$ is 2, two rings represented by $A^6$ may be the same rings or different rings, and two bonding groups represented by $Z^6$ may be the same bonding groups or different bonding groups. Two integers represented by $p^6$ are preferably the same integers.

The polymerizable liquid crystal composition of the invention contains at least one surfactant selected from the group consisting of a nonionic surfactant, an anionic surfactant and a cationic surfactant as a component E for preventing an occurrence of an orientation defect. Examples of the nonionic surfactant include a fluorine series nonionic surfactant, a silicone series nonionic surfactant and a hydrocarbon series nonionic surfactant. Preferred examples of the anionic surfactant include a sulfate ester anionic surfactant, and preferred examples of the cationic surfactant include a quaternary ammonium cationic surfactant. Different kinds of surfactants may be used in combination for controlling the orientation homogeneity.

The ratios of the components in the polymerizable liquid crystal composition of the invention will be described.

A preferred ratio of the component A is from 5 to 98% by weight based on the total amount of the components A to C. The ratio of the component A is more preferably from 15 to 98% by weight, further preferably from 23 to 98% by weight, and particularly preferably from 30 to 98% by weight.

A preferred ratio of the component B is from 1 to 60% by weight based on the total amount of the components A to C. The ratio of the component B is more preferably from 1 to 55% by weight, further preferably from 1 to 50% by weight, and particularly preferably from 1 to 45% by weight.

A preferred ratio of the component C is from 1 to 35% by weight based on the total amount of the components A to C. The ratio of the component C is more preferably from 1 to 30% by weight, further preferably from 1 to 27% by weight, and particularly preferably from 1 to 25% by weight.

A preferred ratio of the component D is from 0.001 to 0.90 in terms of weight ratio based on the total amount of the components A to C. The weight ratio of the component D is more preferably from 0.005 to 0.80, further preferably from 0.01 to 0.70, and particularly preferably from 0.015 to 0.60.

A preferred ratio of the component E is from 0.0001 to 0.015 in terms of weight ratio based on the total amount of the components A to C. The weight ratio of the component E is more preferably from 0.0001 to 0.01, further preferably from 0.0001 to 0.007, and particularly preferably from 0.0003 to 0.007.

The liquid crystal composition of the invention may contain an organic solvent. A solvent is useful for forming a coated film (paint film) having a homogeneous thickness. The concentration of the solvent in the polymerizable liquid crystal composition of the invention is preferably from 5 to 95% by weight taking the use of the solvent into consideration. The concentration of the solvent is preferably from 20 to 85% by weight, further preferably from 35 to 80% by weight, and particularly preferably from 50 to 80% by weight.

The components of the polymerizable liquid crystal composition of the invention have been described for preferred embodiments and preferred contents. The aforementioned items [2] to [8] are examples of combinations of the components with preferred embodiments and contents.

The polymerizable liquid crystal composition of the invention has a cholesteric nematic phase at room temperature, and exhibits a planar orientation when a supporting substrate is subjected to such a treatment as a rubbing treatment, an optical orientation treatment or a stretching treatment.

The polymerizable liquid crystal composition of the invention may further contain other liquid crystal compound than the components A to D. When other liquid crystal compound is added, a preferred ratio thereof is from 0.01 to 0.50, more preferably from 0.03 to 0.30, and further preferably from 0.05 to 0.20, in terms of weight ratio based on the total amount of the components A to D.

The other liquid crystal compound is not particularly limited in structure as far as a planar orientation is obtained, and preferred examples thereof include compound represented by the following formulae (M1a) to (M1k) and (M2a) to (M2c).

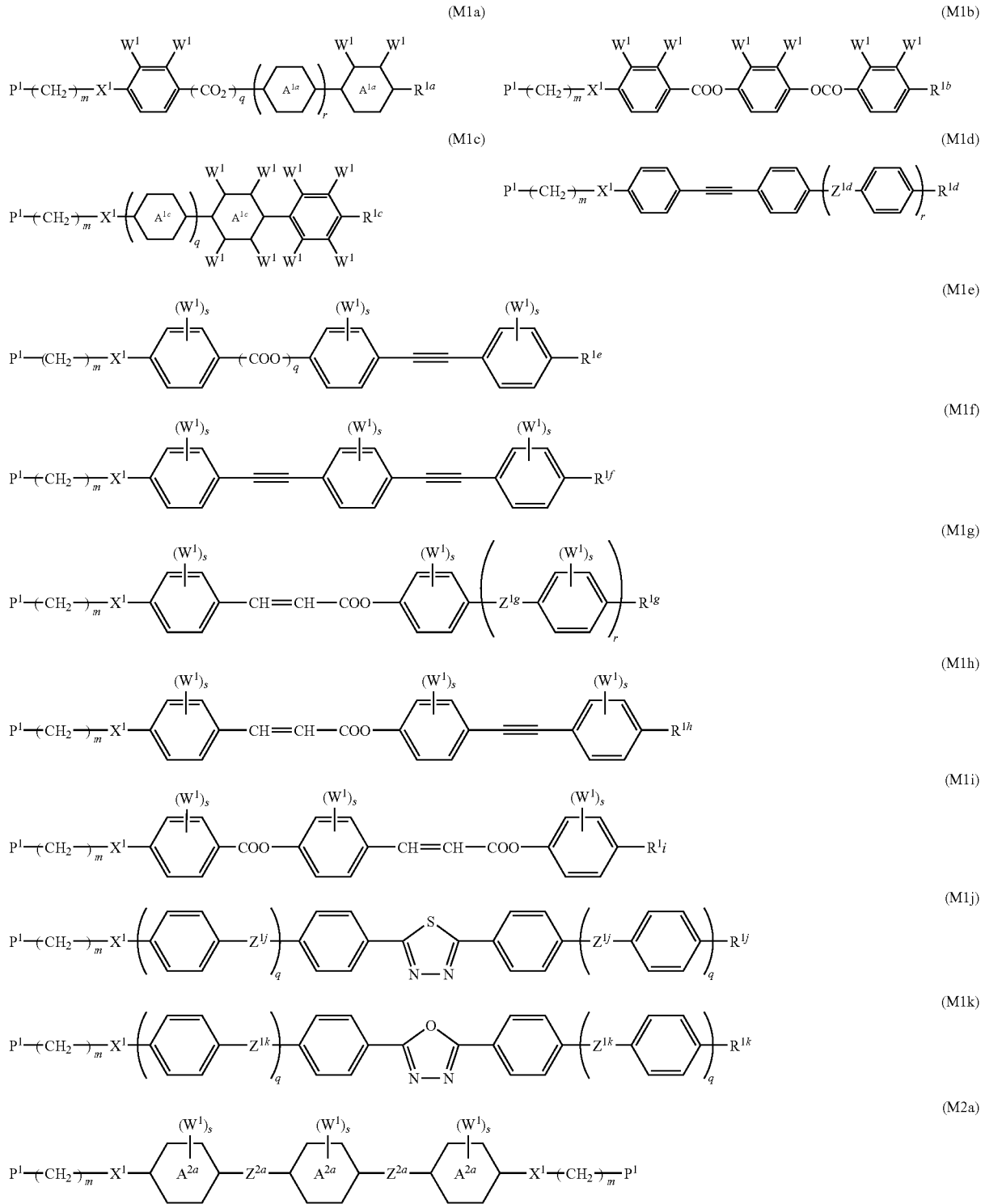

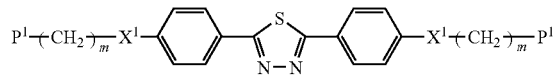 (M2b)

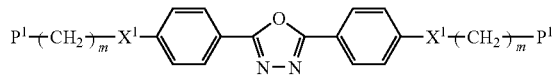 (M2c)

In the formulae (M1a) to (M1k) and (M2a) to (M2c), $P^1$ represents a group represented by the formula (P-1) or (P-2). In the formula (P-2), $R^m$ represents methyl or ethyl.

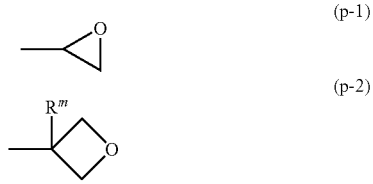

(p-1)

(p-2)

The symbols in the formulae (M1a) to (M1k) and (M2a) to (M2c) have the following meanings.

$R^{1a}$ to $R^{1k}$ each represent hydrogen, fluorine, chlorine, cyano or alkyl having from 1 to 20 carbon atoms. And in the alkyl, not-adjacent arbitrary —$CH_2$— may be replaced by —O—, —COO— or —OCO—, and arbitrary hydrogen may be replaced by halogen.

Rings $A^{1a}$, $A^{1c}$ and $A^{2a}$ each independently represent 1,4-cyclohexylene or 1,4-phenylene.

$W^1$ independently represents hydrogen, halogen, alkyl having from 1 to 3 carbon atoms or halogenated alkyl having from 1 to 3 carbon atoms.

s represents a number of from 0 to 4.

$X^1$ independently represents a single bond or alkylene having from 1 to 20 carbon atoms. And in the alkylene, not-adjacent arbitrary —$CH_2$— may be replaced by —O—, —COO— or —OCO—.

q and r each independently represents a number of 0 or 1.

$Z^{1d}$, $Z^{1g}$, $Z^{1j}$ and $Z^{1k}$ each independently represents a single bond, —COO—, —OCO—, —$CH_2CH_2$—, —C≡C—, —CH=CH—, —CH=CH—COO—, —OCO—CH=CH—, —$CH_2CH_2$—COO— or —OCO—$CH_2CH_2$—.

$Z^{2a}$ independently represents a single bond, —COO—, —OCO—, —$CH_2CH_2$—, —C≡C—, —CH=CH—, —CH=CH—COO—, —OCO—CH=CH—, —$CH_2CH_2$—COO— or —OCO—$CH_2CH_2$—.

m independently represents an integer of from 0 to 15.

The polymerizable liquid crystal composition of the invention may contain an additive, such as a polymerizable compound having no liquid crystallinity other than the compounds (1) to (6), a polymerization initiator suitable for polymerization reaction, and a photosensitizer. The composition may further contain an additive, such as an ultraviolet ray absorbent, an antioxidant, a radical scavenger and a photostabilizer, for enhancing the characteristics of the polymer. Upon using the additives, such as a polymerization initiator, the amounts thereof may be the minimum amounts that attain the objects of the addition thereof.

The synthesis methods of the compounds will be described. The compounds used in the invention can be synthesized by combining properly synthesis methods in organic chemistry described, for example, in Houben Wyle, Methoden der Organischen Chemie, Georg Thieme Verlag, Stuttgart, Organic Reactions, John Wily & Sons Inc., Organic Syntheses, John Wily & Sons, Inc., Comprehensive Organic Synthesis, Pergamon Press, and New Experimental Chemistry Course (Shin Jikken Kagaku Kouza) (Maruzen, Inc.).

The synthesis method of the compound (1) is disclosed in Macromolecules, vol. 26, pp. 1244-1247 (1993), Macromol. Chem. Phys., vol. 202, pp. 180-187 (2001) and the like.

The synthesis method of the compounds (2) and (3) is disclosed in JP-A-2005-60373 and the like.

The synthesis method of the compound (4) is disclosed in JP-A-2005-263778 and JP-A-2007-176927.

The synthesis method of the compound (5) is disclosed in JP-A-2005-97281.

The synthesis method of the compound (6) is disclosed in JP-A-2005-141206 for the case where $Q^2$ represents a group represented by the formula (q2-1). JP-A-2002-161096 and JP-T-H07-508797 disclose production methods of an intermediate for producing the compound (6).

The synthesis method of the compounds (M1a) to (M1k) and (M2a) is disclosed in Macromol. Chem. Phys., vol. 196, pp. 2941-2945 (1995), JP-A-2006-117564, JP-T-2003-513107, JP-A-2005-320317, Polymer Bulletin, vol. 25, pp. 439-442 (1991), Liquid Crystals, vol. 31, No. 12, pp. 1627-1637 (2004), JP-T-2004-510785 and the like.

Preferred examples of the compound (1) include compounds represented by the following formulae (I-1) to (I-6).

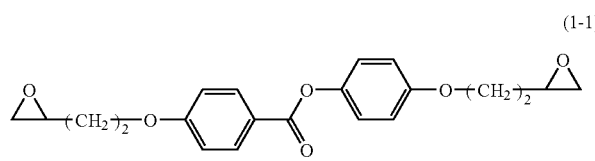 (1-1)

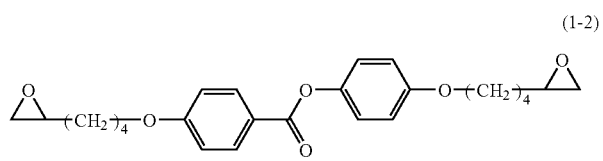 (1-2)

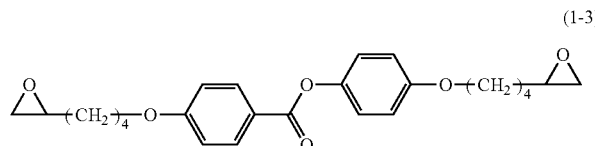 (1-3)

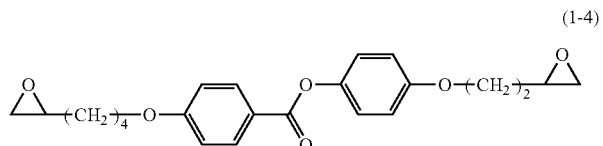 (1-4)

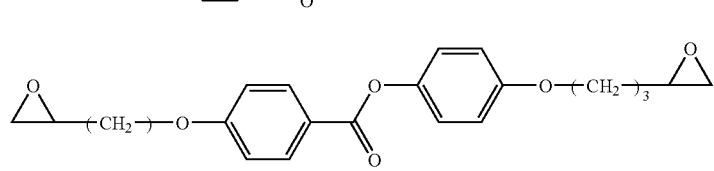 (1-5)

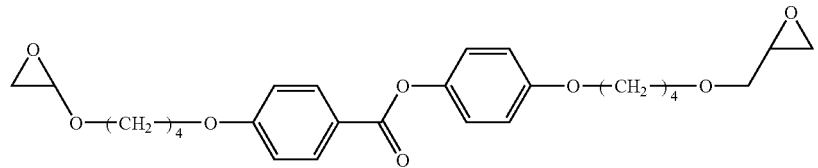
(1-6)
Preferred examples of the compound (2) include compounds represented by the following formulae (2-1) to (2-4).
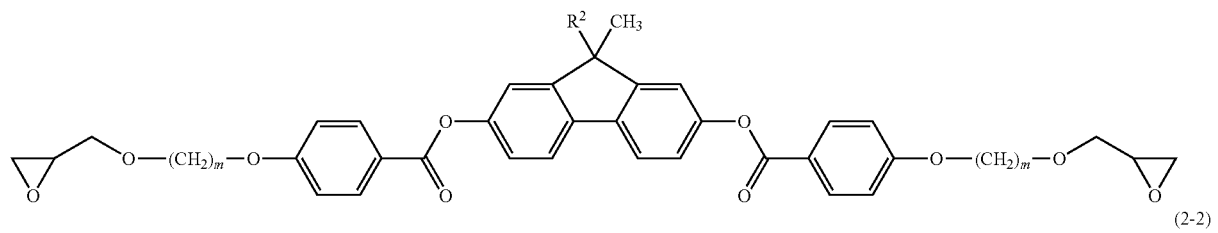
(2-1)
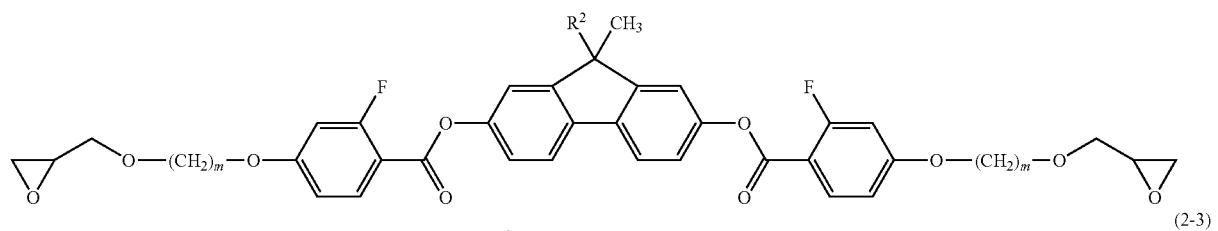
(2-2)
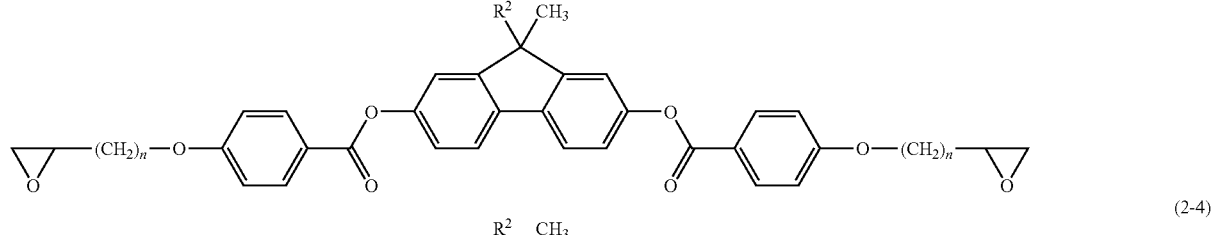
(2-3)
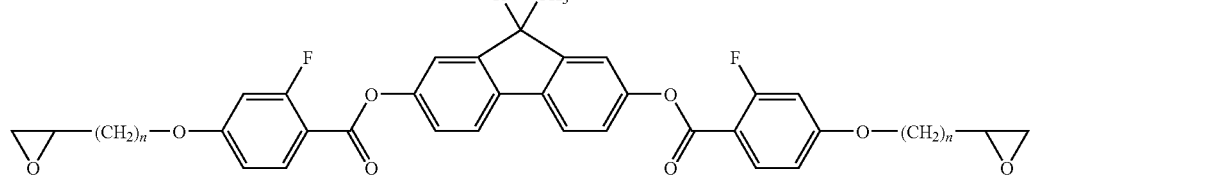
(2-4)
In the formulae (2-1) to (2-4), m represents an integer of from 2 to 15; n represents an integer of from 1 to 15; and $R^2$ has the same meaning as in the formula (2).
Preferred specific examples of the compound (2) include compounds represented by the following formulae (2-1-1) to (2-1-6), (2-2-1) to (2-2-6), (2-3-1) to (2-3-6), and (2-4-1) to (2-4-6).
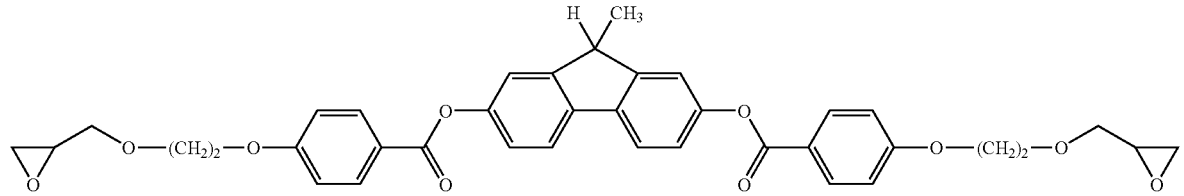
(2-1-1)

-continued
(2-1-2)
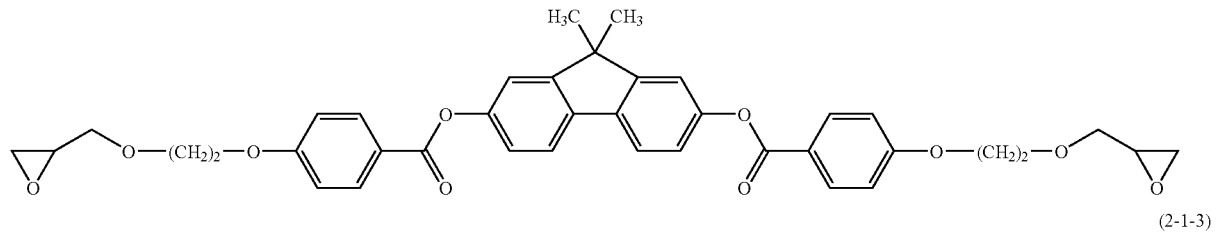
(2-1-3)
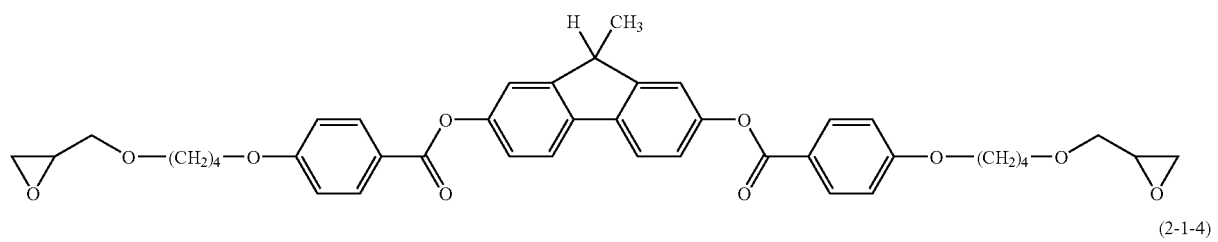
(2-1-4)
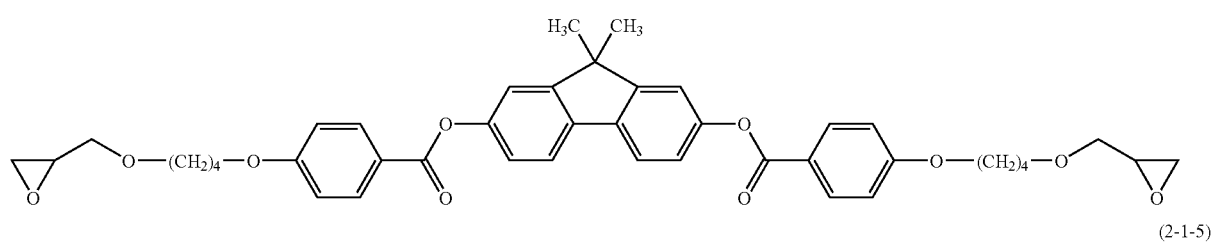
(2-1-5)
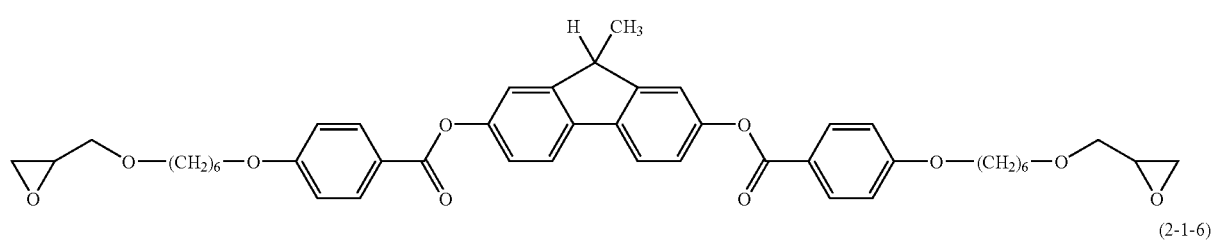
(2-1-6)
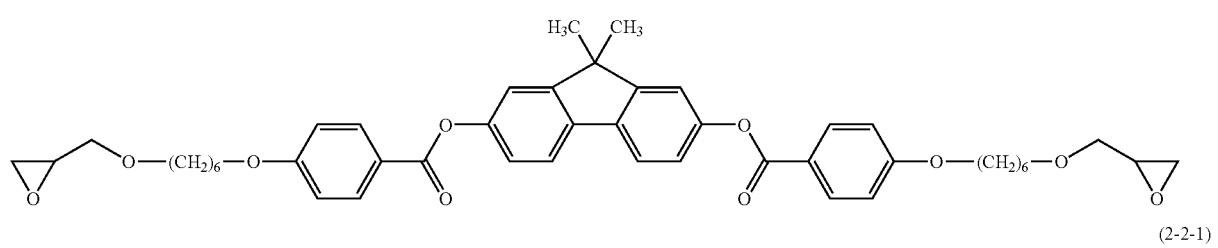
(2-2-1)
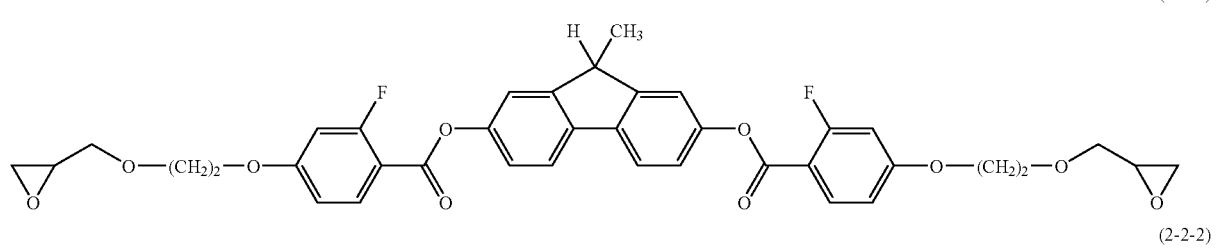
(2-2-2)
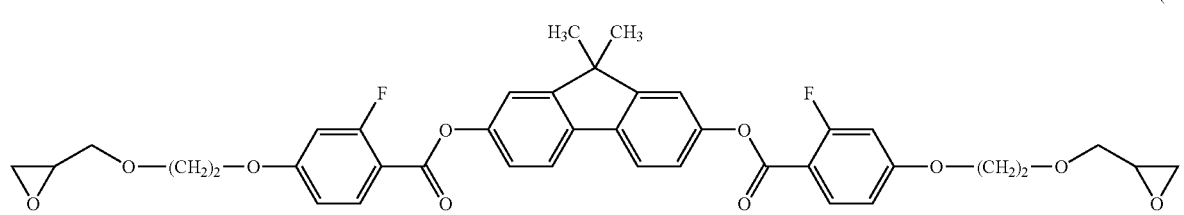

(2-2-3)
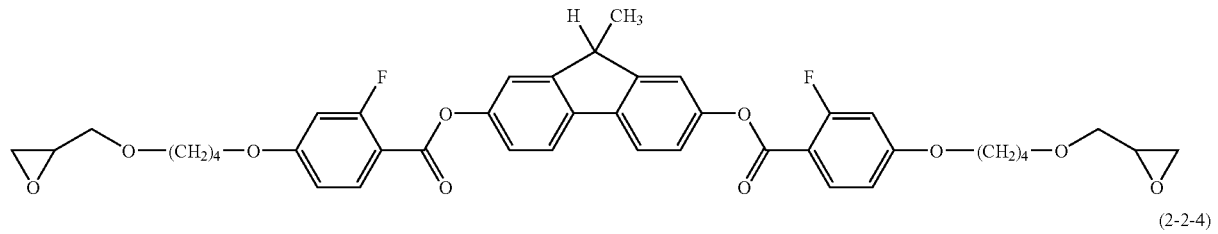
(2-2-4)
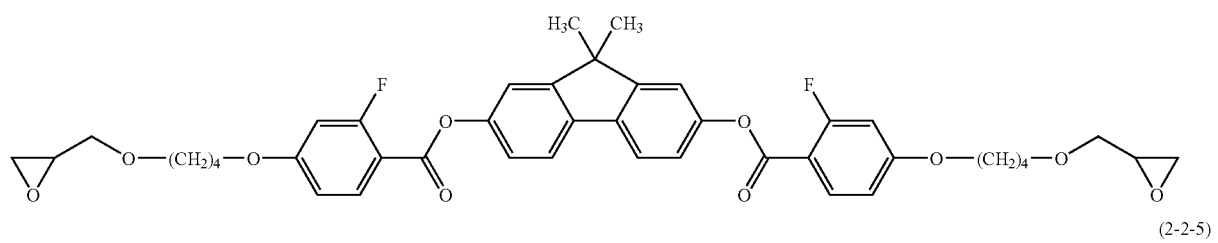
(2-2-5)
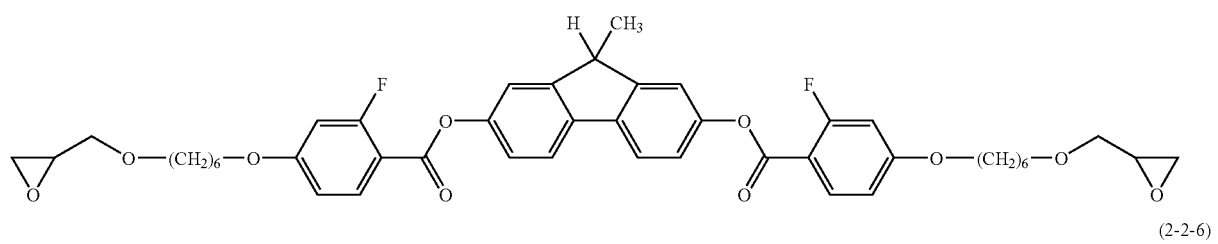
(2-2-6)
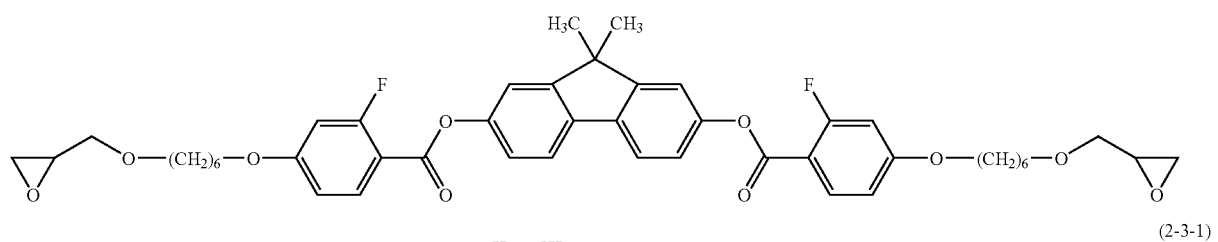
(2-3-1)
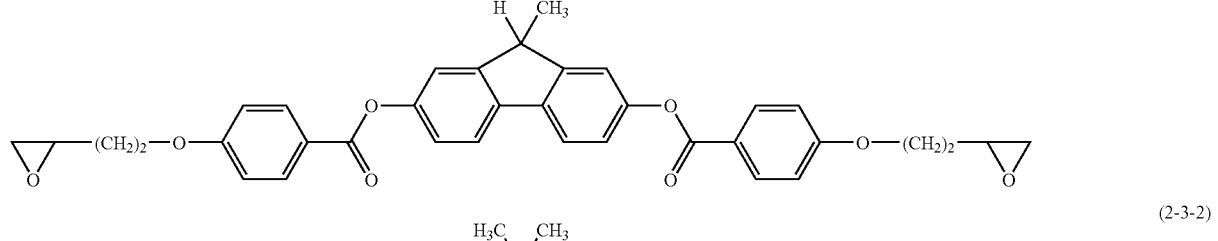
(2-3-2)
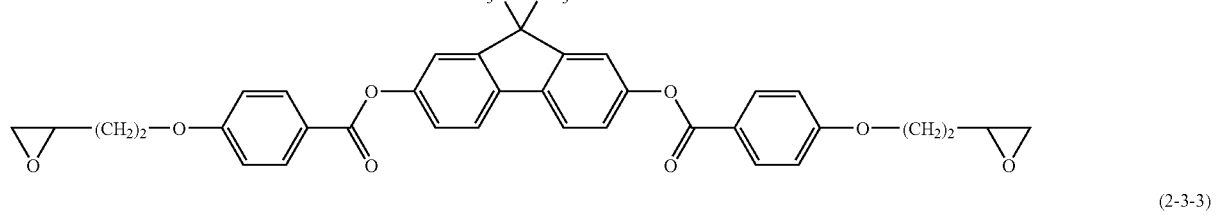
(2-3-3)
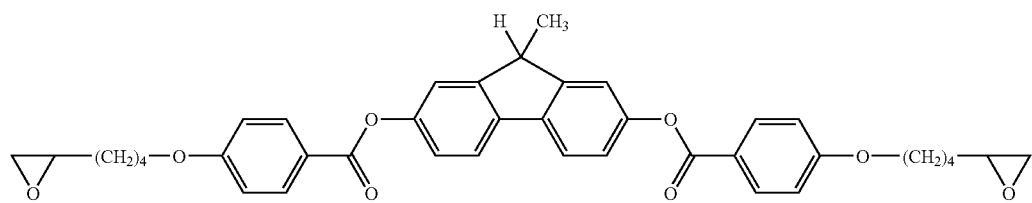

-continued
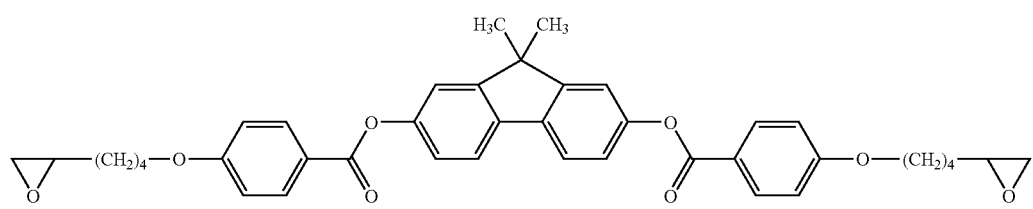
(2-3-4)
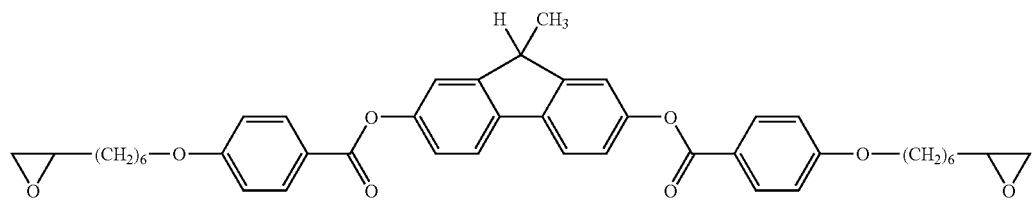
(2-3-5)
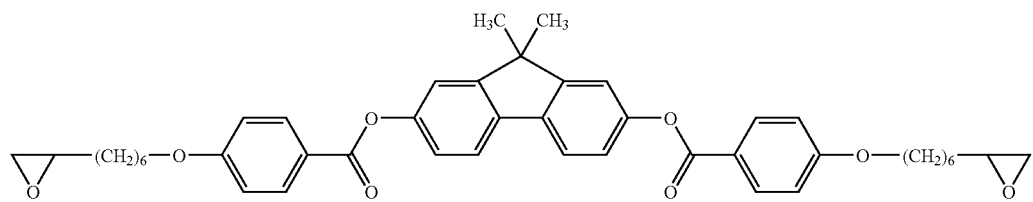
(2-3-6)
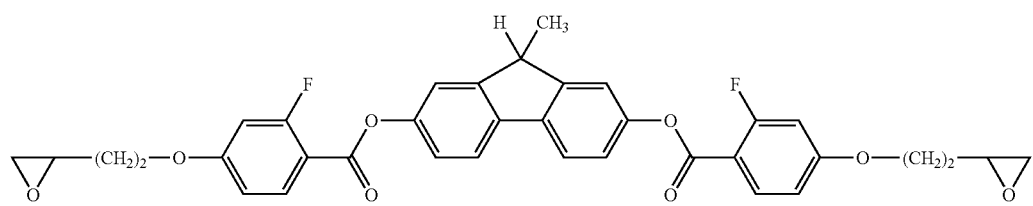
(2-4-1)
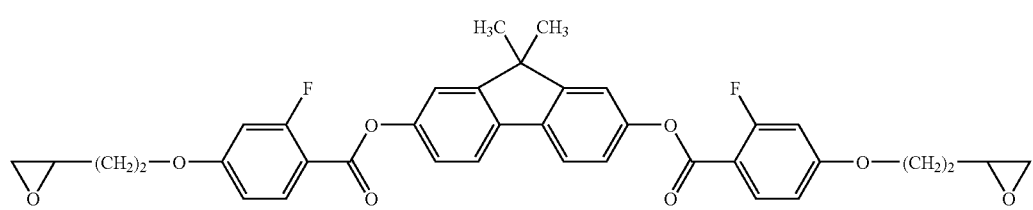
(2-4-2)
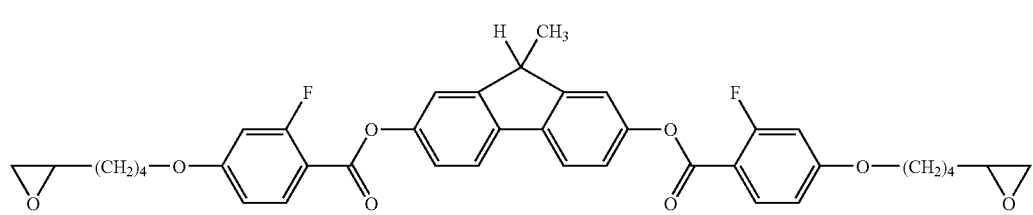
(2-4-3)
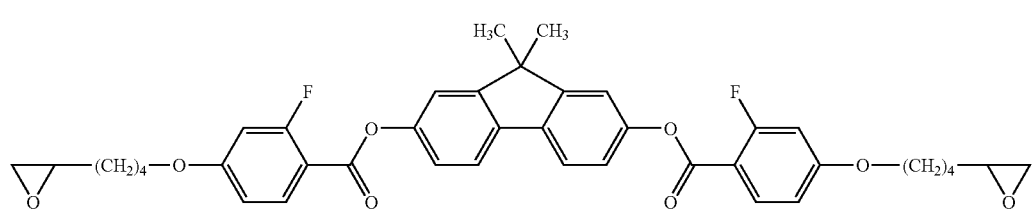
(2-4-4)
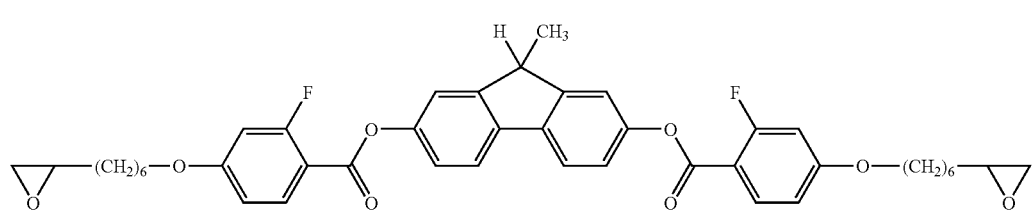
(2-4-5)

(2-4-6)
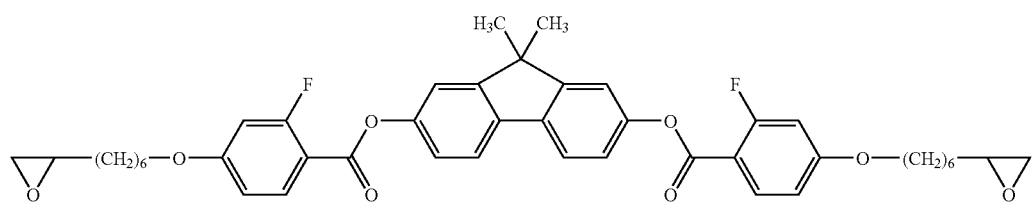
Preferred examples of the compound (3) include compounds represented by the following formulae (3-1) to (3-4).
(3-1)
(3-2)
(3-3)
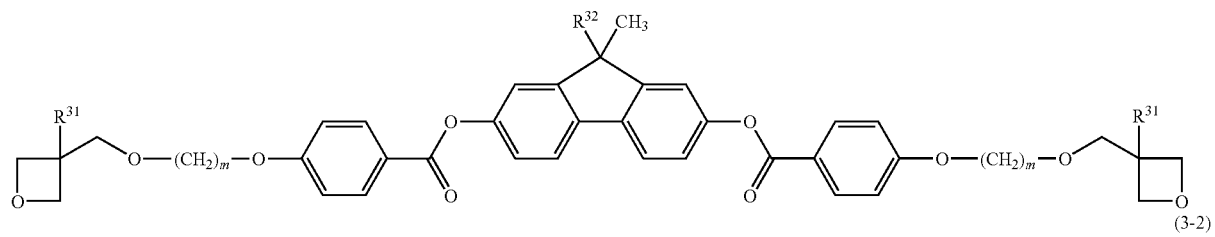
(3-4)
In the formulae (3-1) to (3-4), m represents an integer of from 2 to 15; and $R^{31}$ and $R^{32}$ each have the same meaning as in the formula (3).
Preferred specific examples of the compound (3) include compounds represented by the following formulae (3-1-1) to (3-1-6), (3-2-1) to (3-2-6), (3-3-1) to (3-3-4), and (3-4-1) to (3-4-4).
(3-1-1)
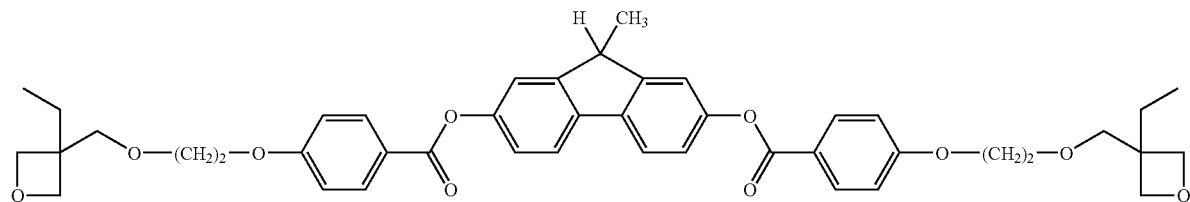

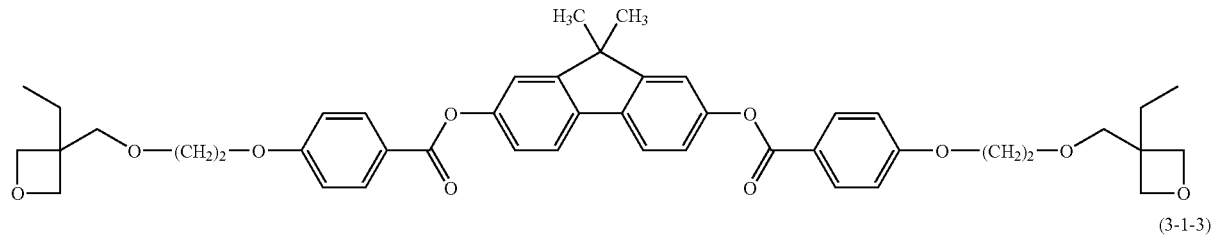
(3-1-2)
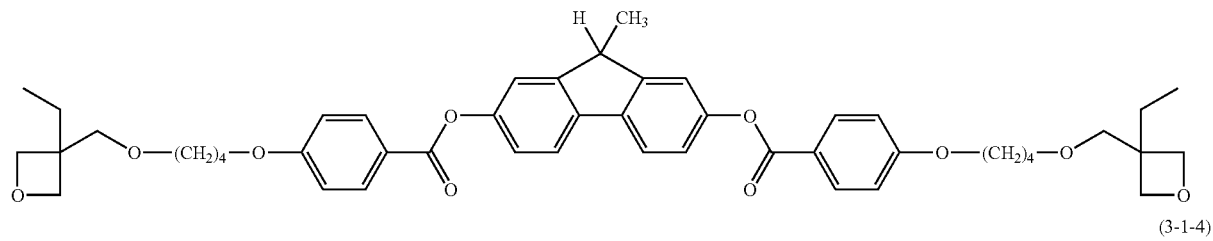
(3-1-3)
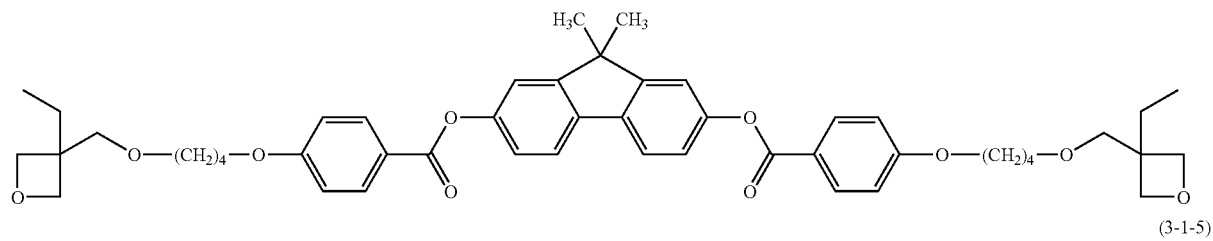
(3-1-4)
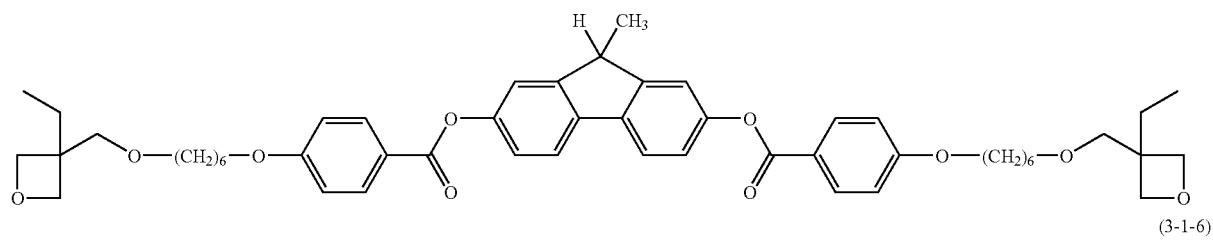
(3-1-5)
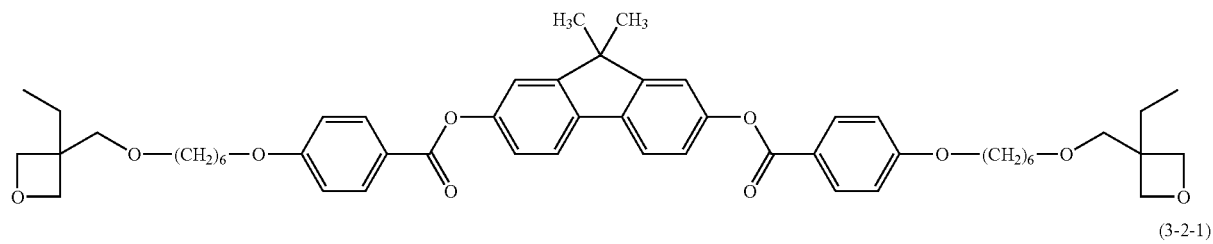
(3-1-6)
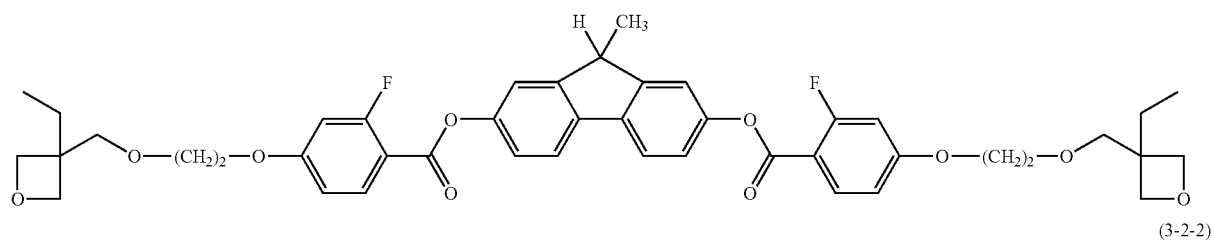
(3-2-1)
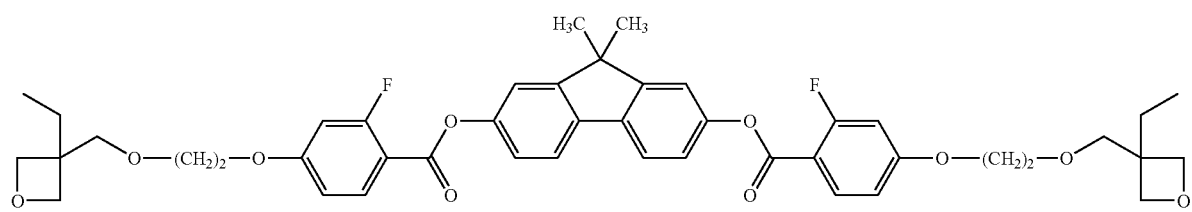
(3-2-2)

(3-2-3)
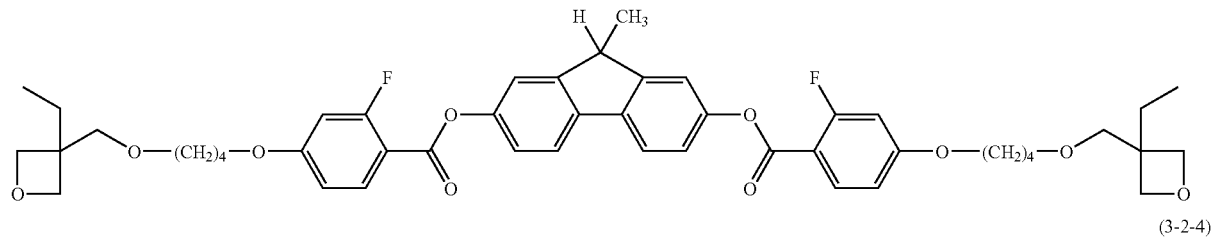
(3-2-4)
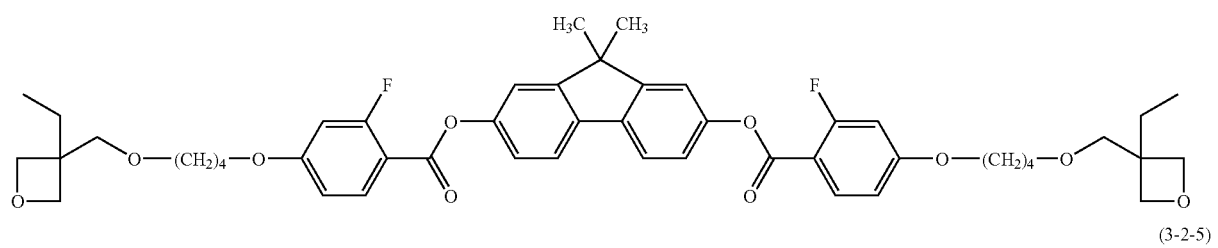
(3-2-5)
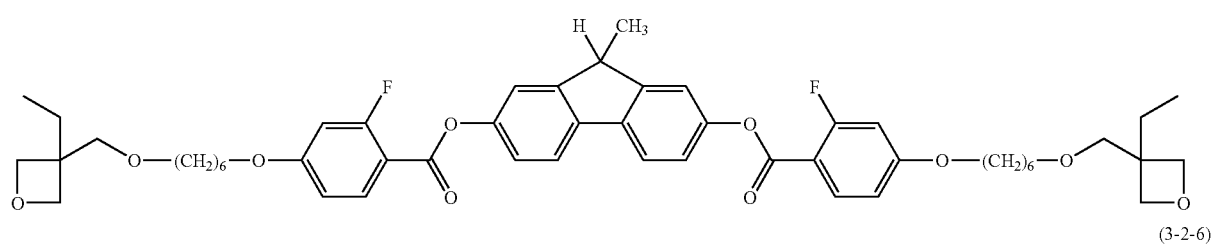
(3-2-6)
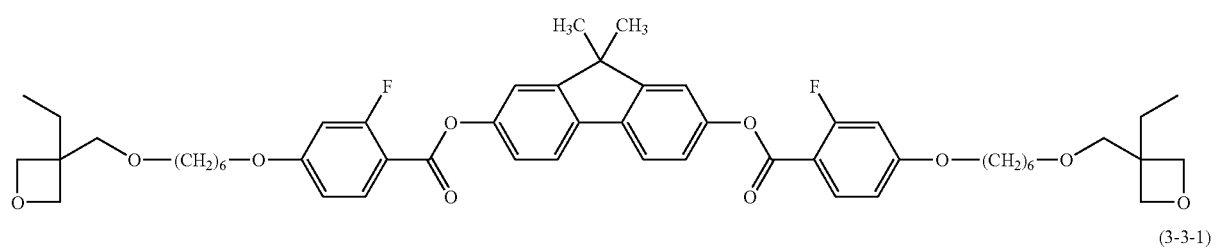
(3-3-1)
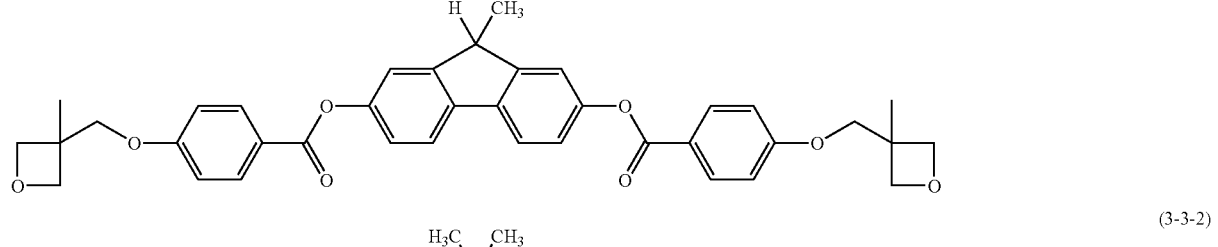
(3-3-2)
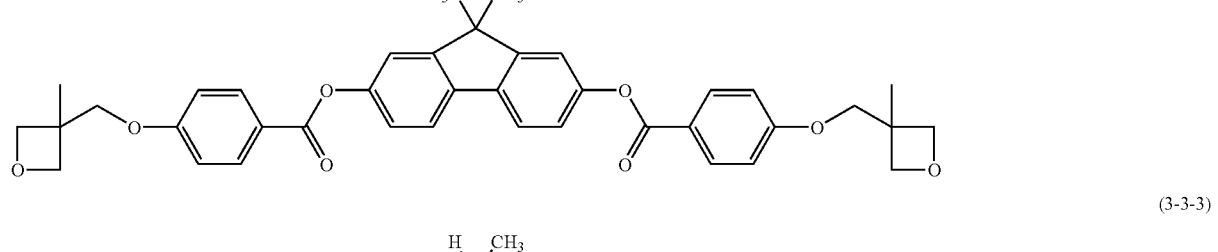
(3-3-3)
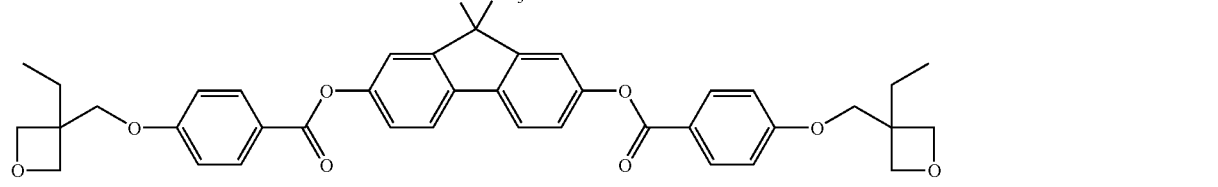

(3-3-4)
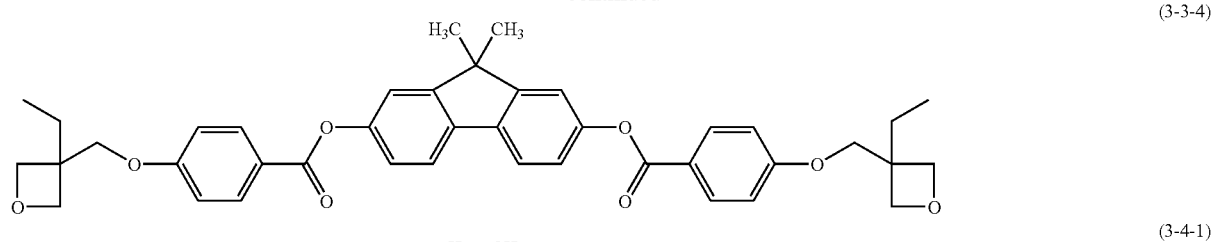
(3-4-1)
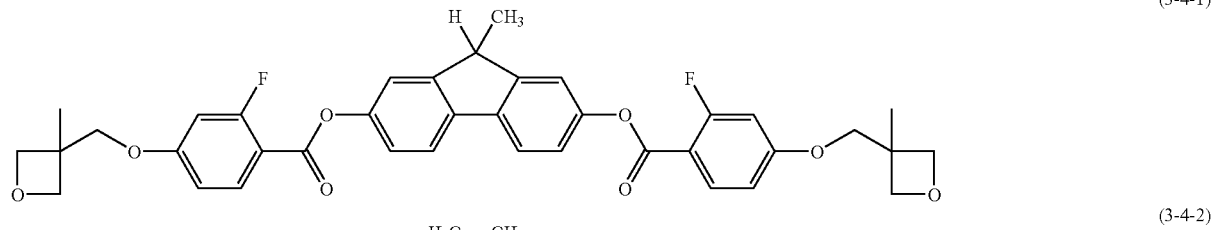
(3-4-2)
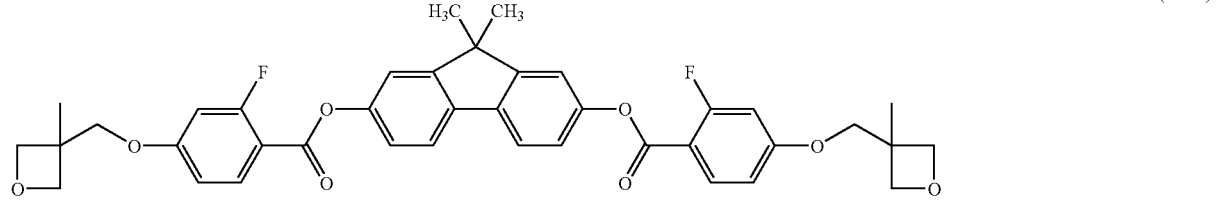
(3-4-3)
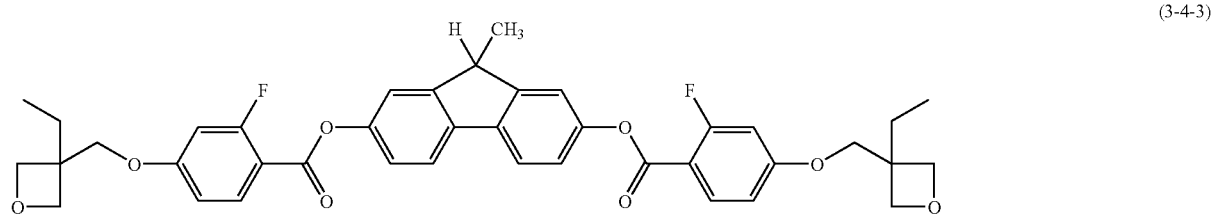
(3-4-4)
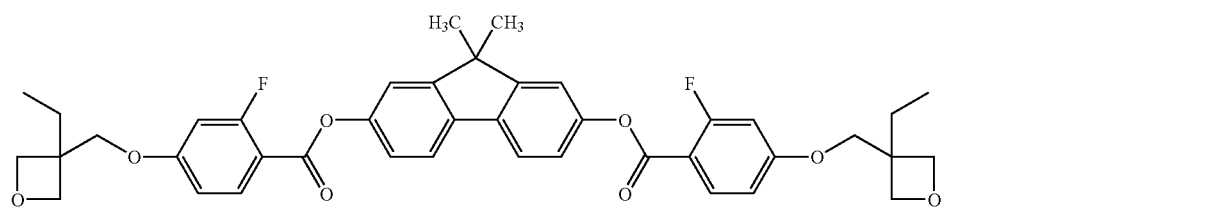
Preferred specific examples of the compound (4) include compounds represented by the following formulae (4-1) to (4-12).
(4-1)
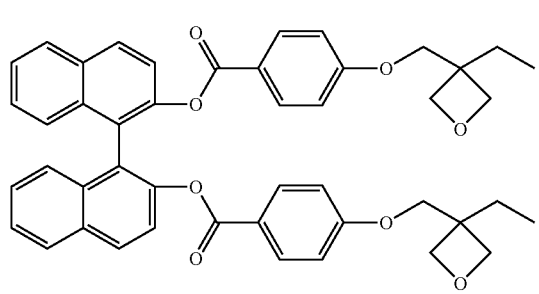
(4-2)
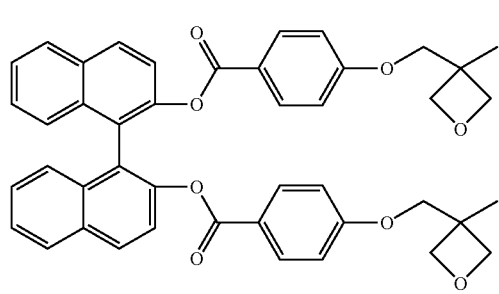

-continued
(4-3)
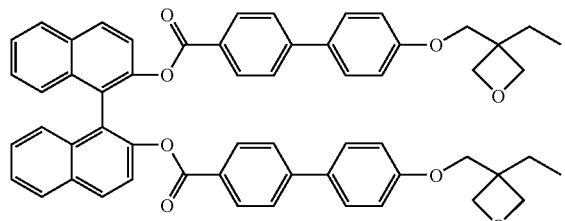
(4-4)
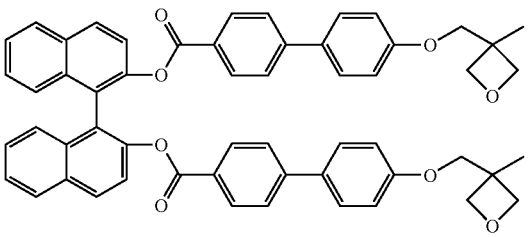
(4-5)
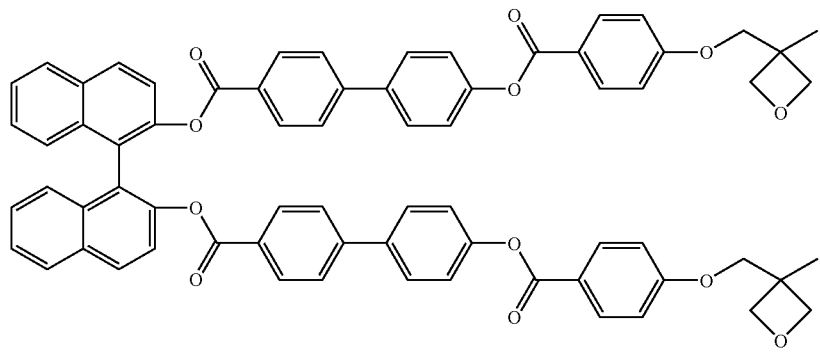
(4-6)
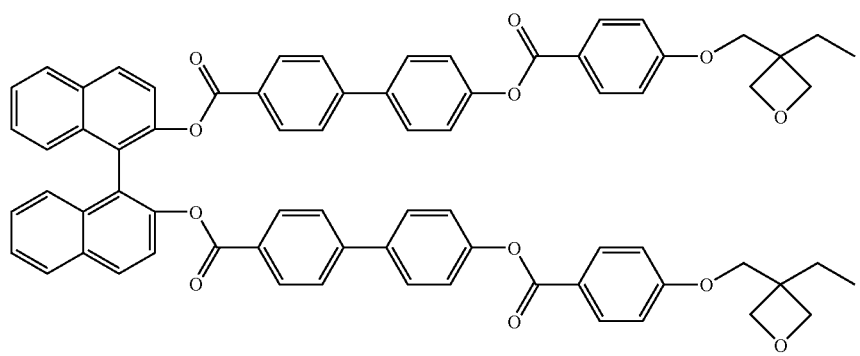
(4-7)
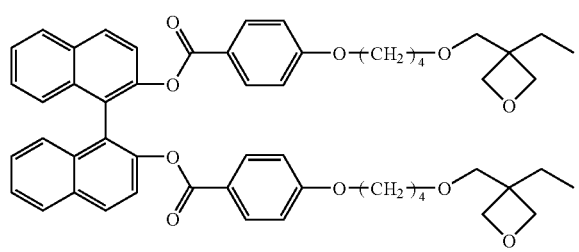
(4-8)
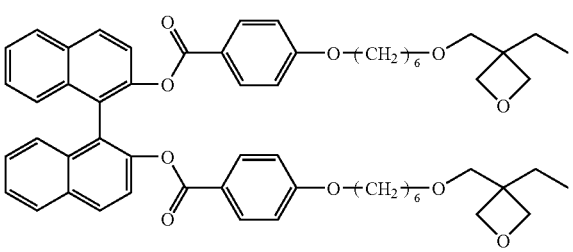
(4-9)
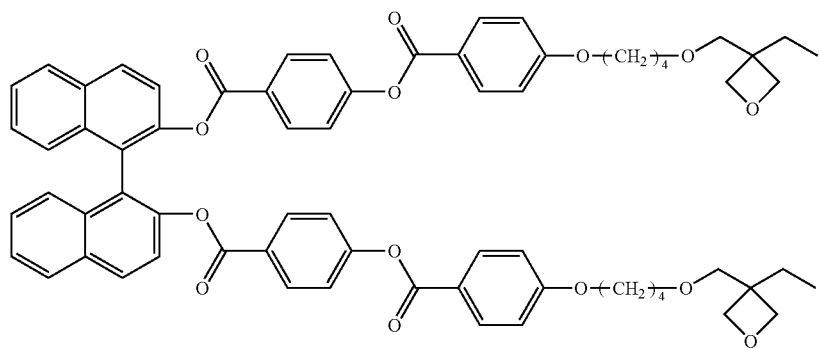

-continued
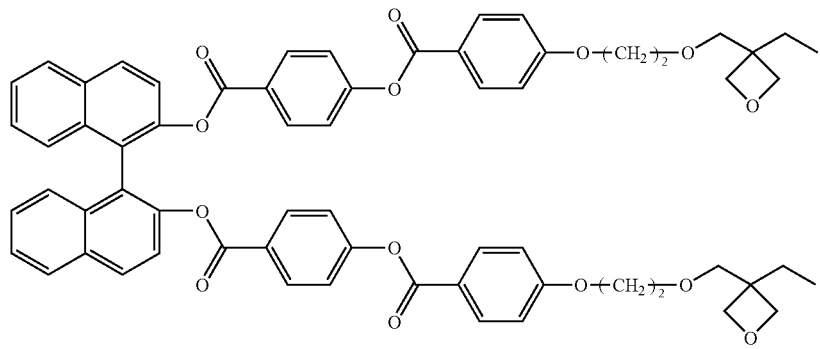
(4-10)
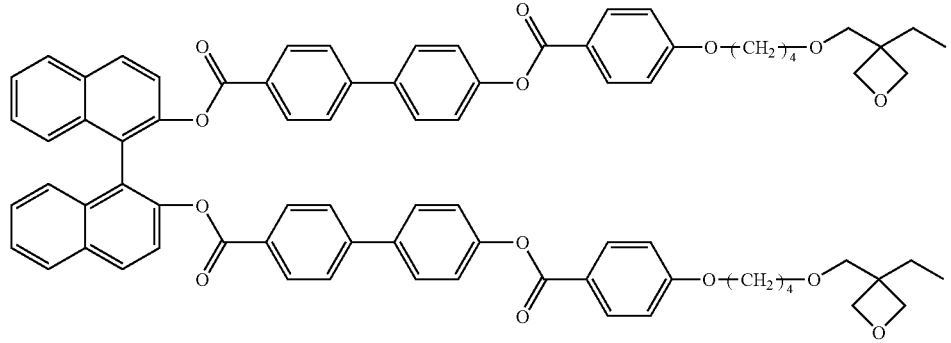
(4-11)
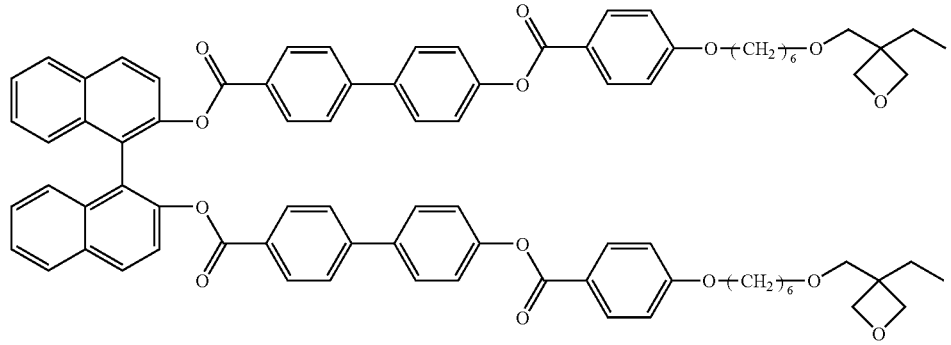
(4-12)
Preferred specific examples of the compound (5) include compounds represented by the following formulae (5-1-1) to (5-1-4), (5-2-1) to (5-2-4), (5-3-1) to (5-3-4), and (5-4-1) to (5-4-4).
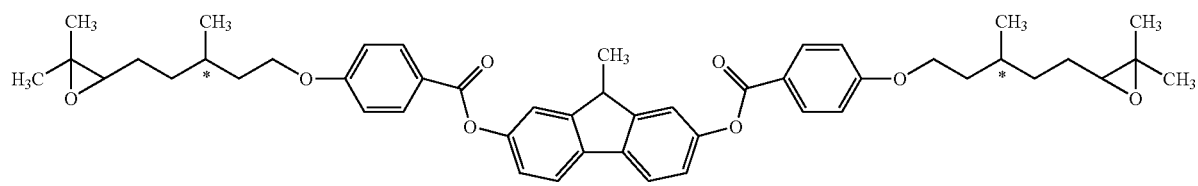
(5-1-1)
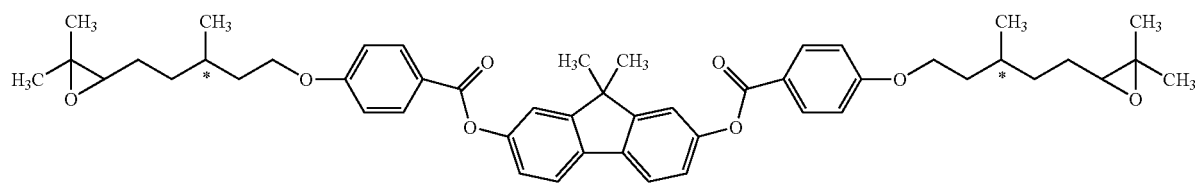
(5-1-2)

-continued
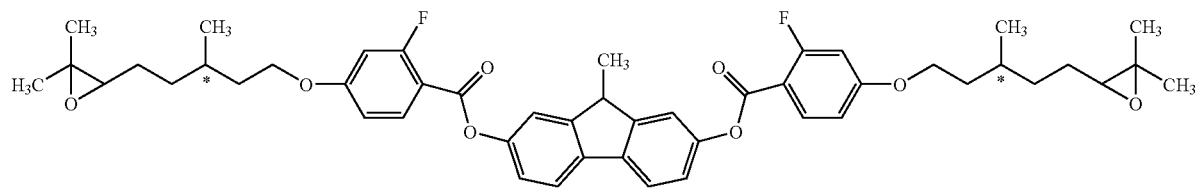
(5-1-3)
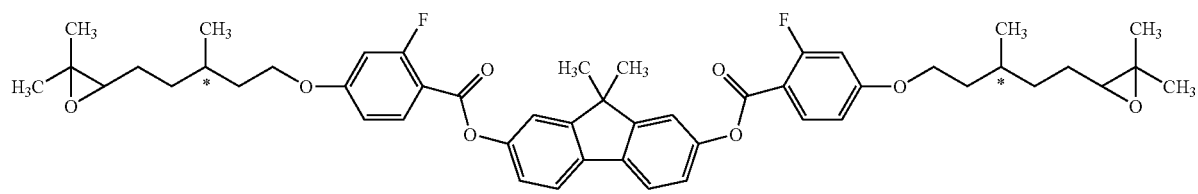
(5-1-4)
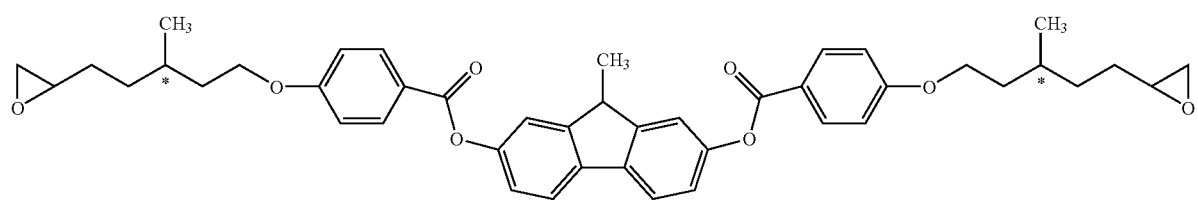
(5-2-1)
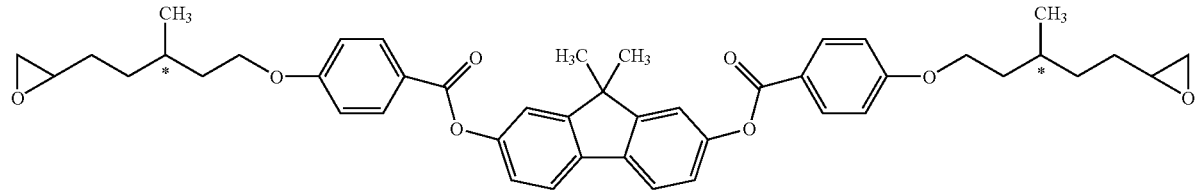
(5-2-2)
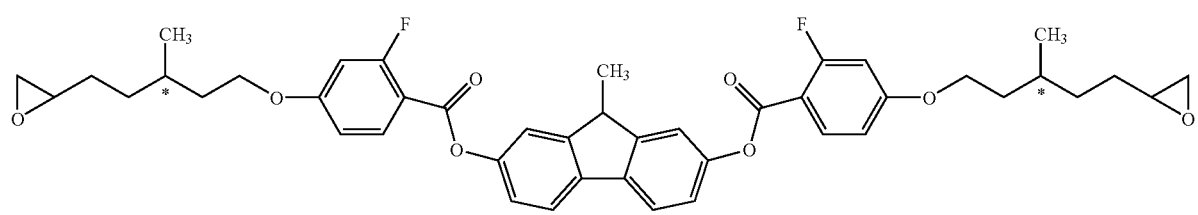
(5-2-3)
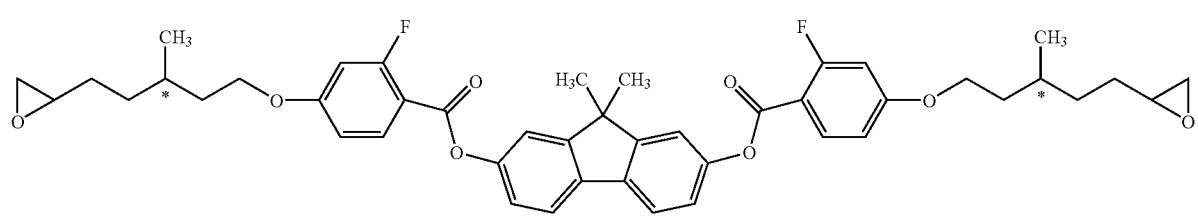
(5-2-4)
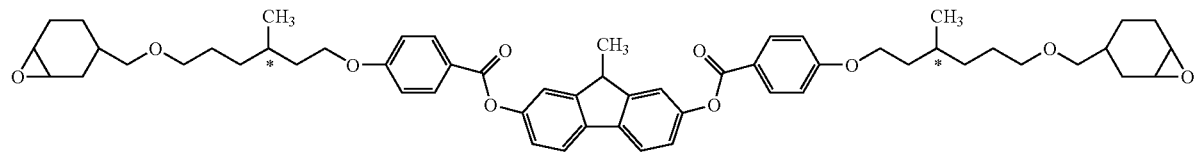
(5-3-1)

-continued
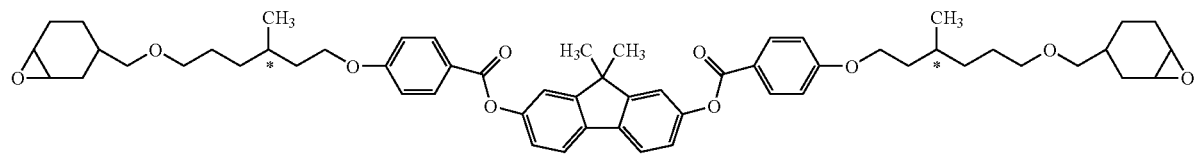
(5-3-2)
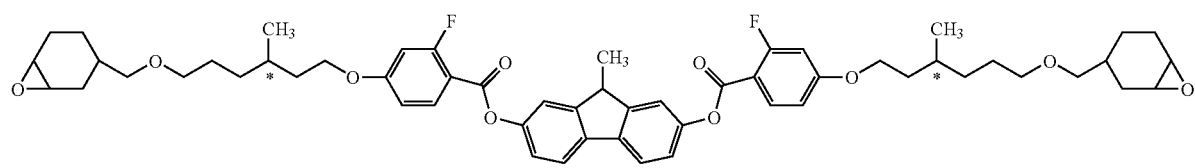
(5-3-3)
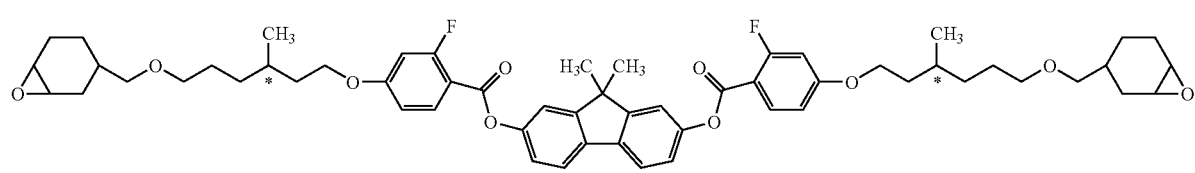
(5-3-4)
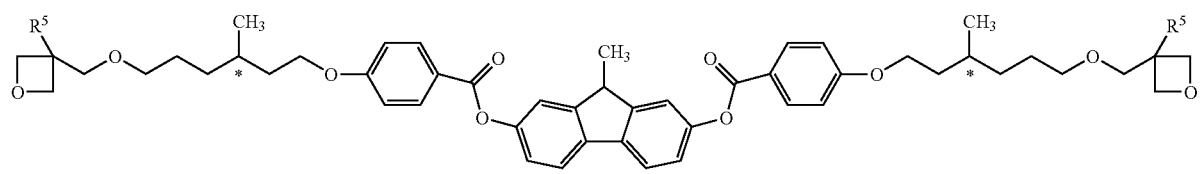
(5-4-1)
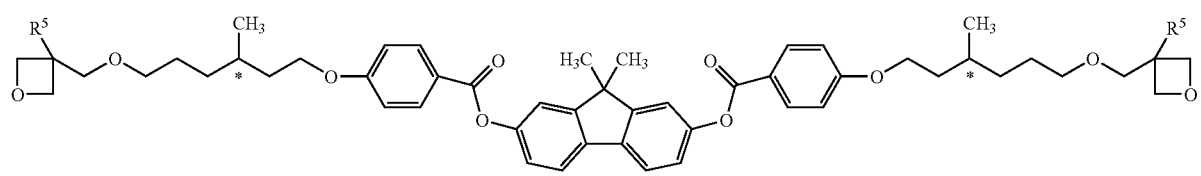
(5-4-2)
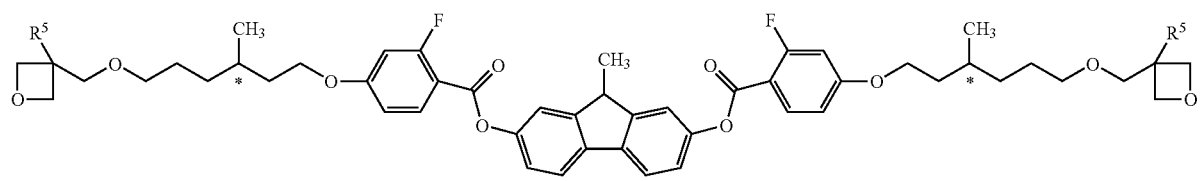
(5-4-3)
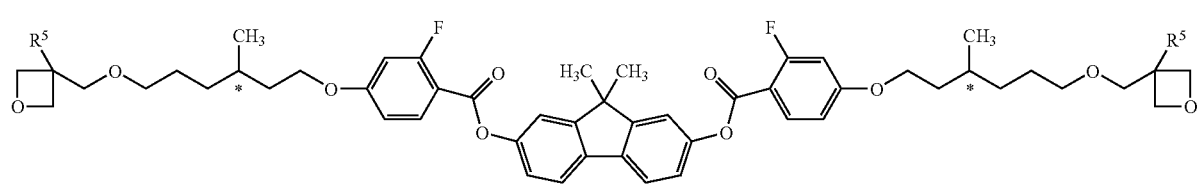
(5-4-4)

In the formulae (5-1-1) to (5-1-4), (5-2-1) to (5-2-4), (5-3-1) to (5-3-4), and (5-4-1) to (5-4-4), $R^5$ represents methyl or ethyl.

Preferred examples of the compound (6) include compounds represented by the following formulae (6-1) to (6-4).

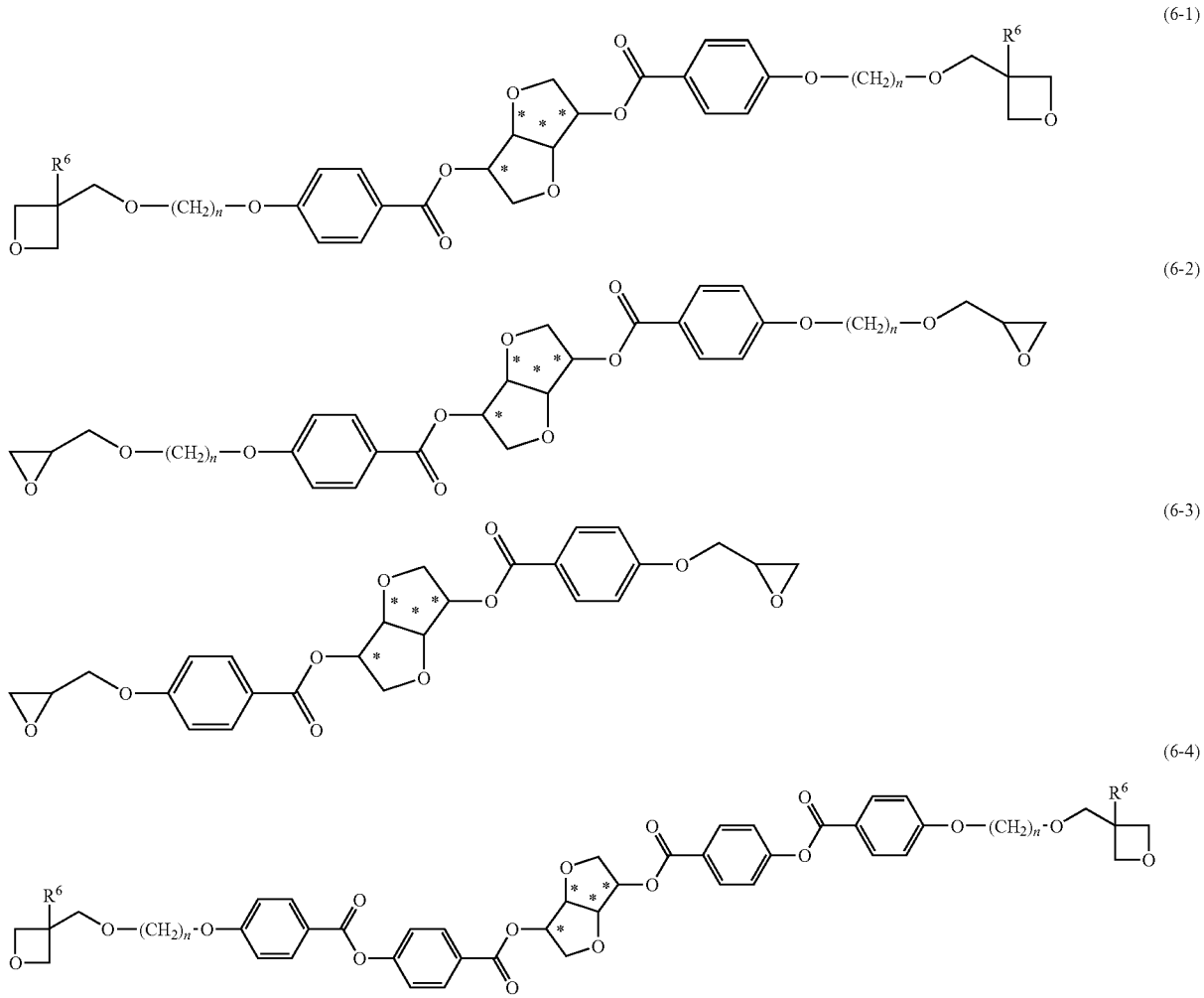

In the formulae (6-1) to (6-4), $R^6$ represents methyl or ethyl; and n represents an integer of from 4 to 6.

Specific examples of the compounds (M1a) to (M1k) and (M2a) to (M2c) include compounds represented by the following formulae (M1a-1) to (M1a-41), (M1k-1), (M2a-1) to (M2a-11), (M2b-1) and (M2c-1).

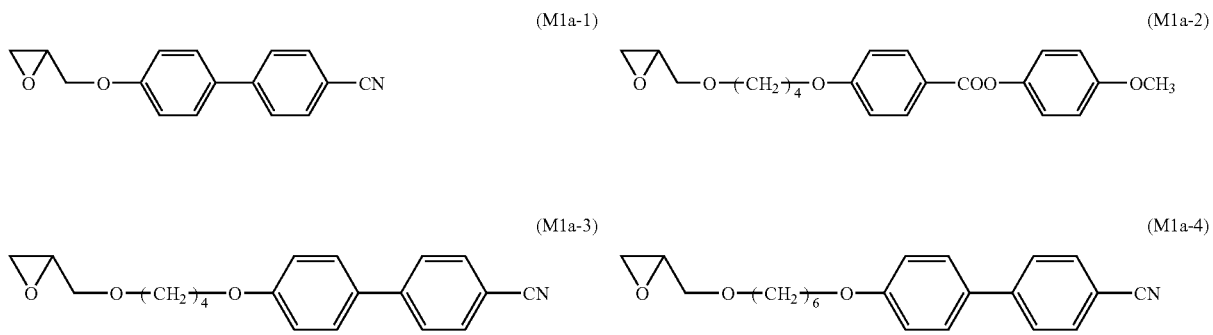

-continued
(M1a-5)
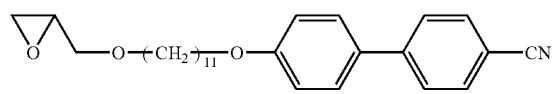
(M1a-6)
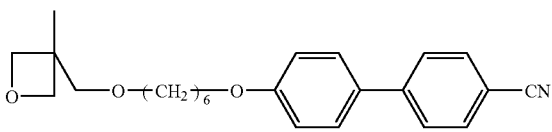
(M1a-7)
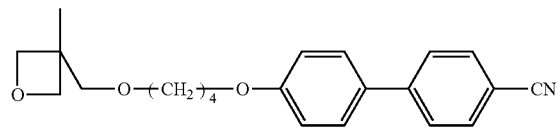
(M1a-8)
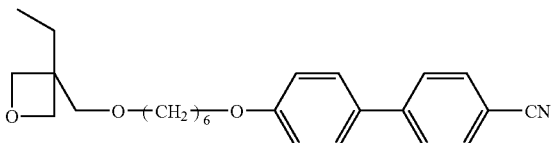
(M1a-9)
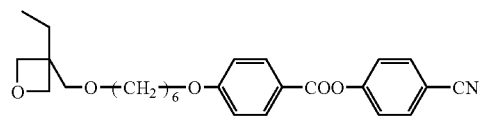
(M1a-10)
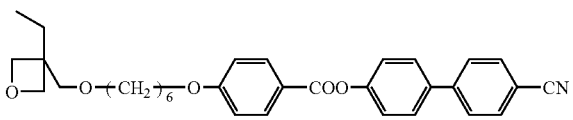
(M1a-11)
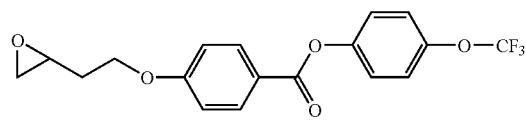
(M1a-12)
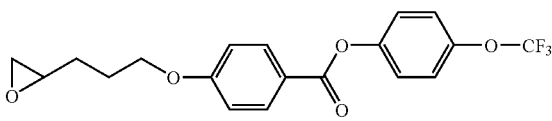
(M1a-13)
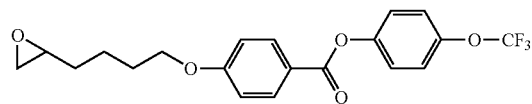
(M1a-14)
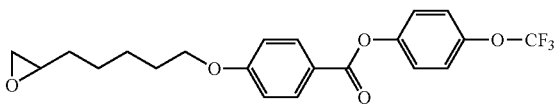
(M1a-15)
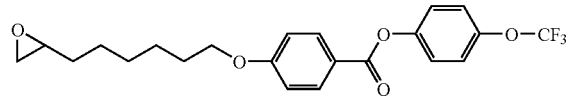
(M1a-16)
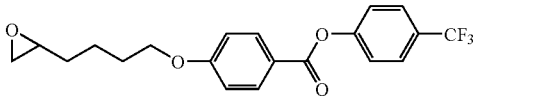
(M1a-17)
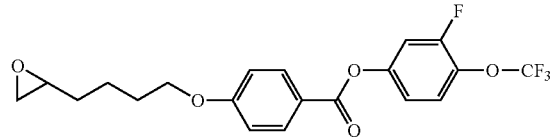
(M1a-18)
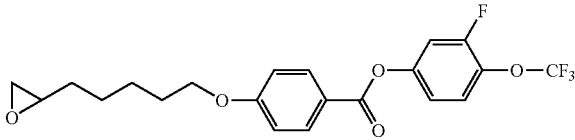
(M1a-19)
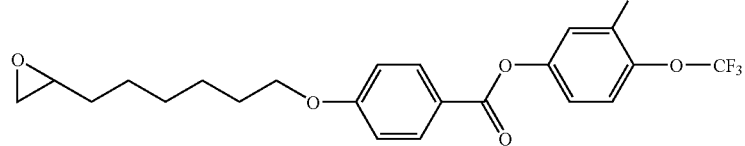
(M1a-20)
(M1a-21)
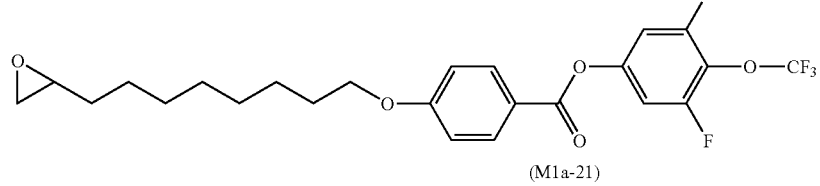
(M1a-22)
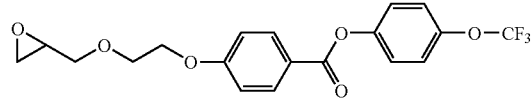
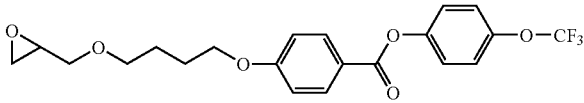

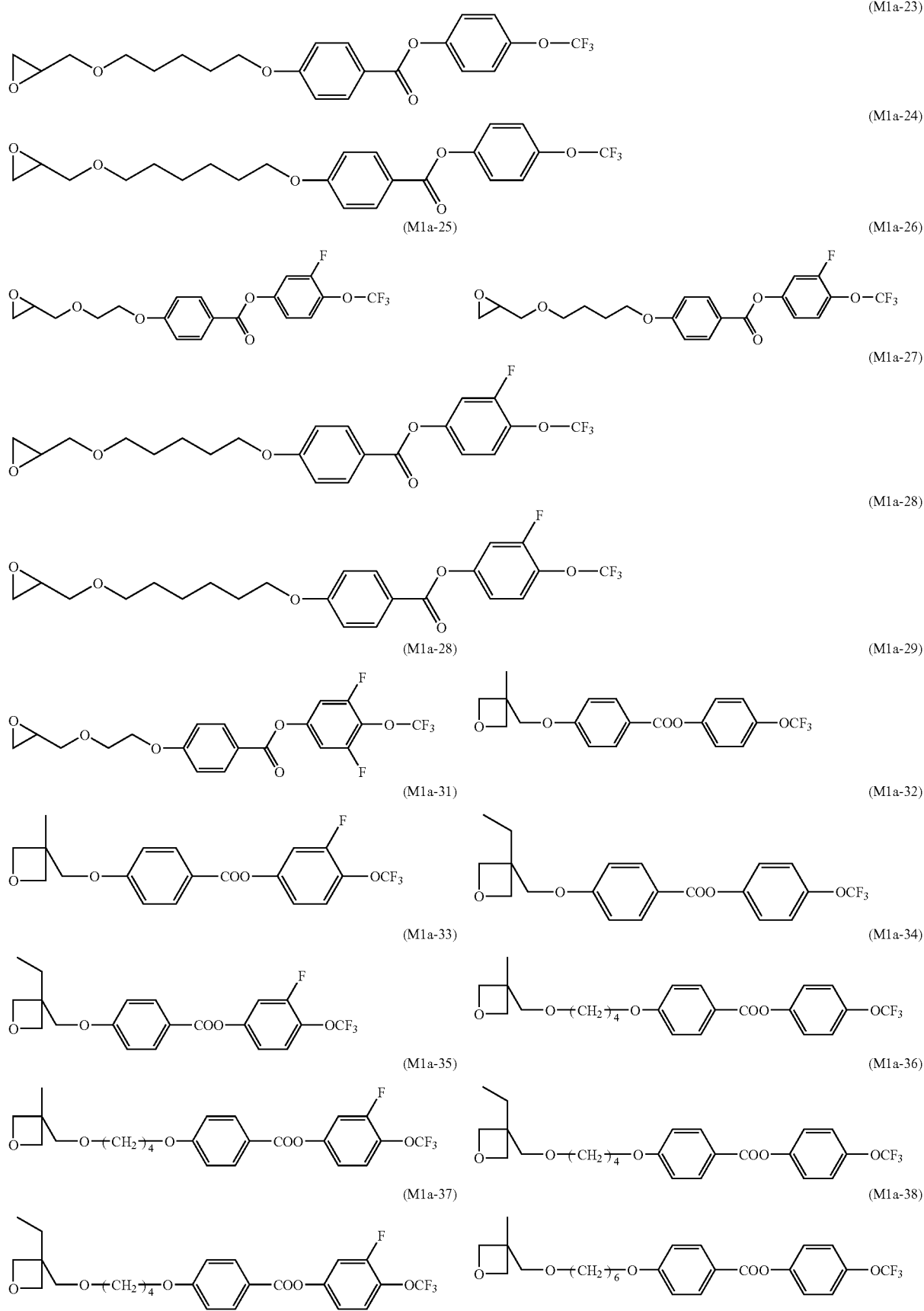

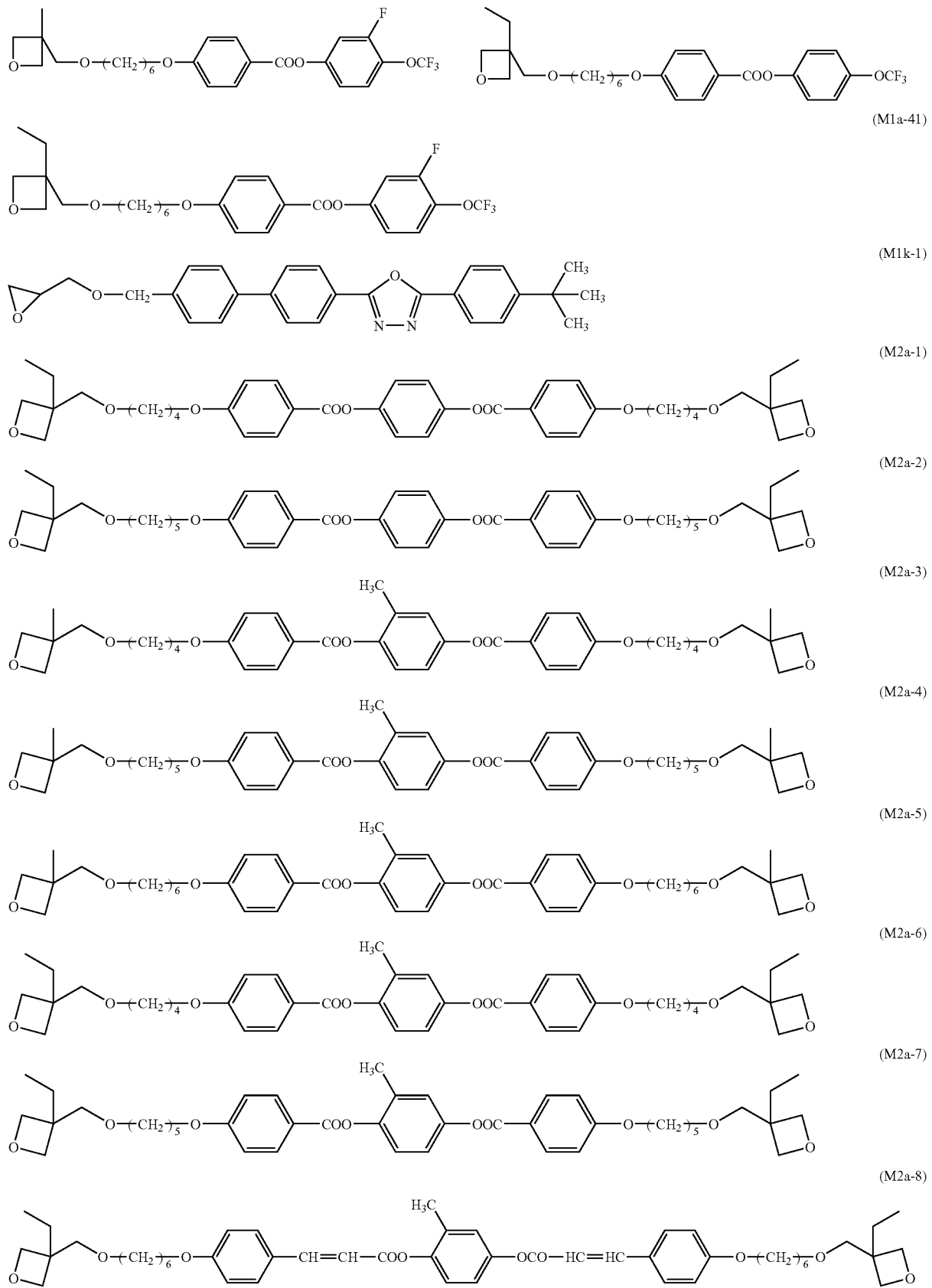

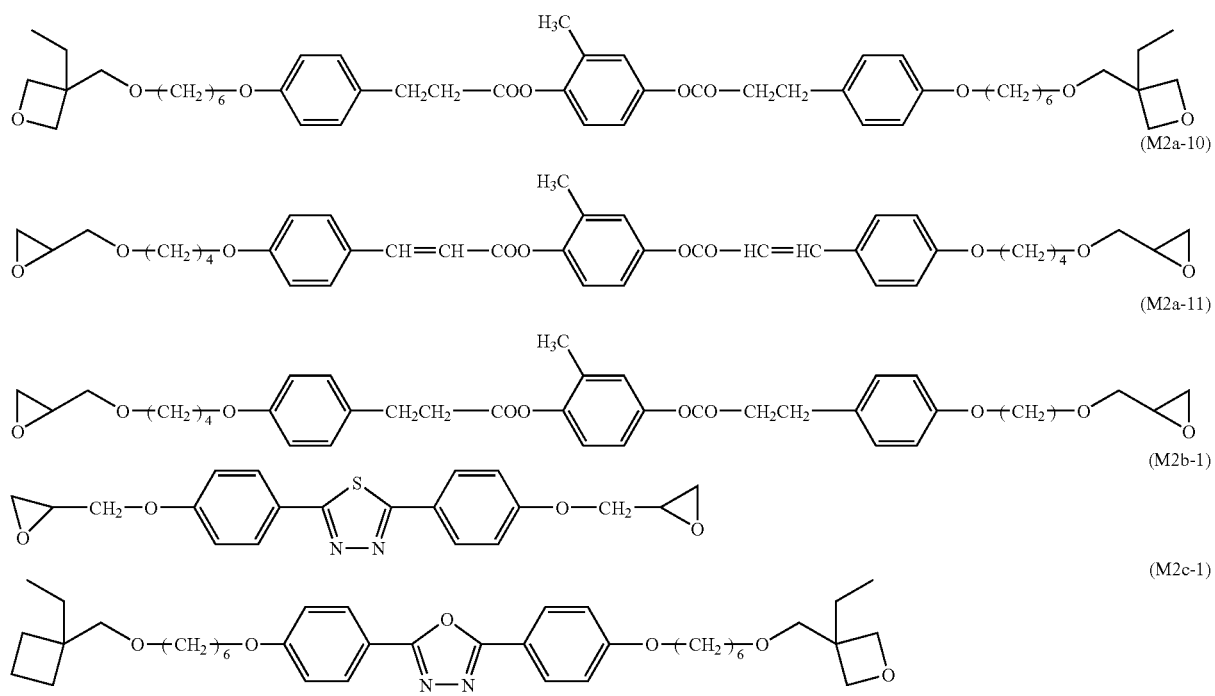

The nonionic surfactant will be described. Preferred examples of the nonionic surfactant include a fluorine series nonionic surfactant, a silicone series nonionic surfactant and a hydrocarbon series nonionic surfactant. Examples of the fluorine series nonionic surfactant include BYK-340, Ftergent 251, Ftergent 221 MH, Ftergent 250, FTX-215M, FTX-218M, FTX-233M, FTX-245M, FTX-290M, FTX-209F, FTX-213F, Ftergent 222F, FTX-233F, FTX-245F, FTX-208G, FTX-218G, FTX-240G, FTX-206D, Ftergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM.

Examples of the silicone series nonionic surfactant include Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270, Polyflow KL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570.

Examples of the hydrocarbon series nonionic surfactant include those containing an acrylic polymer as a major component, such as Polyflow No. 3, Polyflow No. 50EHF, Polyflow No. 54N, Polyflow No. 75, Polyflow No. 77, Polyflow No. 85HF, Polyflow No. 90, Polyflow No. 95, BYK-350, BYK-352, BYK-354, BYK-355, BYK-358N, BYK-361N, BYK-380N, BYK-381, BYK-392 and BYK-Silclean3700.

"Polyflow" and "Glanol" are trade names of the products available from Kyoeisha Chemical Co., Ltd. "BYK" is a trade name of the products available from BYK Chemie Co., Ltd. "Ftergent", "FTX" and "KB" are trade names of the products available from Neos Co., Ltd.

The anionic surfactant will be described. Preferred examples of the anionic surfactant include a sulfate ester anionic surfactant. More specifically, examples thereof include those using an alkyl sulfate ester and those using an alkyl ether sulfate ester, and examples thereof include Sunnol LM-1130, Sunnol LM-1140T, Sunnol EH-1145M, Sunnol LMT-1430, Emal 0, Emal 40, Emal AD-25R, Emal TD, Emal 20C, Emal 20CM, Emal 20T, Megafac F-114, Megafac F-410, Flownon SD-700, Ftergent 100, Ftergent 100C, Ftergent 110 and FTX-100A.

"Sunnol", "Emal", "Megafac", "Flownon" and "Ftergent" are trade names of the products available from Lion Corporation, Kao Corporation, DIC Corporation, Kyoeisha Chemical Co., Ltd. and Neos Co., Ltd., respectively.

The cationic surfactant will be described. Preferred examples of the cationic surfactant include a quaternary ammonium salt cationic surfactant. Specific examples thereof include Ftergent 300, Ftergent 310, Arquad series, Ethoquad series, Quartamin series and Sanisol series.

"Ftergent" is a trade name of the products available from Neos Co., Ltd., "Arquad" and "Ethoquad" are trade names of the products available from Lion Corporation, and "Quartamin" and "Sanisol" are trade names of the products available from Kao Corporation.

Examples of the polymerizable compound other than the compounds (1) to (6), the additive and the organic solvents are shown below. Commercially available products may be used as the compounds. Examples of the other polymerizable compound include an epoxy compound having one polymerizable group and an epoxy compound having two epoxy group.

Examples of the epoxy resin, that can be used, include an epoxy resin derived from a dihydric phenol compound, such as a bisphenol A type epoxy resin, a bisphenol F type epoxy resin, a bisphenol S type epoxy resin, a bisphenol AD type epoxy resin, a resorcin type epoxy resin, a hydroquinone type epoxy resin, a catechol type epoxy resin, a dihydroxynaphthalene type epoxy resin, a biphenyl type epoxy resin and a tetramethylbiphenyl type epoxy resin, an epoxy resin derived from a trihydric or higher phenol compound, such as a phenol-novolac type epoxy resin, a cresol-novolac type epoxy resin, a triphenylmethane type epoxy resin, a tetraphenylethane type epoxy resin, a dicyclopentadiene-phenol-modified type epoxy resin, a phenol-aralkyl type epoxy resin, a biphenyl-aralkyl type epoxy resin, a naphthol-novolac type epoxy resin, a naphthol-aralkyl type epoxy resin, a naphthol-phenol copolycondensation novolac type epoxy resin, a naphthol-cresol copolycondensation novolac type epoxy resin, an aromatic hydrocarbon-formaldehyde resin-modified phenol resin type epoxy resin and a biphenyl-modified novolac type epoxy resin, a tetrabromobisphenol A type epoxy resin, a brominated phenol-novolac type epoxy resin, a polycarboxylic acid polyglycidyl ester, a polyol polyglycidyl ether, a fatty acid type epoxy resin, an alicyclic type epoxy resin, a glycidylamine type epoxy resin, a triphenolmethane type epoxy resin, and a dihydroxybenzene type epoxy resin, but the invention is not limited to these resins. The epoxy resins may be used solely or as a mixture of two or more of them.

Specific examples of the epoxy compound include an alkyl monoglycidyl ether having from 2 to 25 carbon atoms (such as butyl glycidyl ether, 2-ethylhexyl glycidyl ether, decyl glycidyl ether and stearyl glycidyl ether), butanediol diglycidyl ether, 1,6-hexanediol diglycidyl ether, neopentyl glycol diglycidyl ether, dodecanediol diglycidyl ether, pentaethyltriol polyglycidyl ether, trimethylolpropane polyglycidyl ether, glycerol polyglycidyl ether, phenyl glycidyl ether, p-sec-butylphenyl glycidyl ether, p-tert-butylphenyl glycidyl ether, resorcin glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, vinylcyclohexene oxide, butoxypolyethylene glycol glycidyl ether, polyethylene glycol diglycidyl ether, 3,4-epoxycyclohexenylmethyl 3',4'-epoxychclohexenecarboxylate, 3,4-epoxycyclohexenylethyl 3',4'-epoxychclohexenecarboxylate, 1,2-epoxy-4-vinylcyclohexane, vinylcyclohexene dioxide, allylcyclohexene dioxide, 1-epoxyethyl-3,4-epoxycyclohexane, 3,4-epoxy-4-methylcyclohexyl-2-propylene oxide, bis(3,4-epoxycyclohexyl)ether, bis(3,4-epoxycyclohexylmethyl) adipate, diglycidyl phthalate, diglycidyl terephthalate, diglycidyl hexahydrophthalate, diglycidyl tetrahydrophthalate, tris(2,3-epoxypropyl) isocyanurate, 3-ethyl-3-hydroxymethyloxetane, 3-ethyl-3-(phenoxymethyl)oxetane, di(1-ethyl(3-oxetanyl)) methyl ether, 3-ethyl-3-hydroxymethyloxetane, 3-methyl-3-hydroxymethyloxetane, di(3-ethyl-oxet-3-ylmethyl) and 3-ethyl-3-(2-ethylhexyloxymethyl)oxetane.

Examples of the other polymerizable compound also include, in addition to the aforementioned epoxy compounds, a vinyl compound, such as ethyl vinyl ether, hydroxybutyl monovinyl ether, t-amyl vinyl ether and cyclohexanedimethanol/methyl vinyl ether.

The surfactant may be used in combination with a surfactant of other types than those mentioned above. Specific examples of the other surfactant include various compounds including a polyether compound, an acrylic acid copolymer, a titanate compound, an imidazoline compound, an alkylamine oxide compound, a polyamine derivative, a polyoxyethylene-polyoxypropylene condensate, polyethylene glycol and an ester thereof, an alkylphosphate salt, an aliphatic or aromatic sulfonic acid-formalin condensate, a laurylamide propyl betaine, a laurylaminoacetic acid betaine, a polyethylene glycol fatty acid ester, a polyoxyethylene alkylamine compound and a perfluoroalkyl carboxylate salt. These surfactants have, for example, a function of facilitating the coating operation of the composition onto a supporting substrate or the like.

A known photopolymerization initiator may be used for optimizing the polymerization rate of the compound having an epoxy group. The amount of the photopolymerization initiator added is preferably from 0.0001 to 0.1, and more preferably from 0.001 to 0.07, in terms of weight ratio based on the total amount of the polymerizable composition. Examples of the photopolymerization initiator are shown below. Upon irradiation of light, the composition may be heated to such a temperature range that the liquid crystal phase is maintained. The polymerizable liquid crystal composition of the invention may be used after adding an ordinary cationic photopolymerization initiator thereto. Examples of the cationic photopolymerization initiator include a diaryliodonium salt (hereinafter abbreviated as DAS) and a triarylsulfonium salt (hereinafter abbreviated as TAS).

Examples of the DAS include diphenyliodonium tetrafluoroborate, diphenyliudonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium p-toluenesulfonate, 4-methoxyphenylphenyliodonium diphenyliodonium tetra(pentafluorophenyl)borate, bis(4-t-butylphenyl)iodonium diphenyliodonium tetrafluoroborate, bis(4-t-butylphenyl)iodonium diphenyliodonium hexafluoroarsenate, bis(4-t-butylphenyl)iodonium diphenyliodonium trifluoromethanesulfonate, bis(4-t-butylphenyl)iodonium trifluoroacetate, bis(4-t-butylphenyl)iodonium p-toluenesulfonate and bis(4-t-butylphenyl)iodonium diphenyliodonium tetra(pentafluorophenyl)borate.

The DAS may be enhanced in sensitivity by adding thereto a photosensitizer, such as thioxanthone, phenothiazine, chlorothioxanthonse, xanthone, anthracene, diphenylanthracene and rubrene.

Examples of the TAS include triphenylphosphonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium p-toluenesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium p-toluenesulfonate and 4-phenylthiophenyldiphenylsulfonium tetra(pentafluorophenyl)borate.

The cationic photopolymerization initiator is available as various commercially available products, and specific examples of the trade names thereof include Cyracure UVI-6990, Cyracure UVI-6974 and Cyracure UVI-6992, available from Union Carbide Corp., Adeka Optomer SP-150, SP-152, SP-170 and SP-172, available from Adeka Corp., Photoinitiator 2074, available from Rhodia, Inc., Irgacure 250, available from Ciba Japan Co., Ltd., UV-9380C, available from GE Silicones, CPI Series, available from SAN-APRO Ltd., and TPS Series, TAZ Series, DPI Series, BPI Series, MDS Series, DTS Series, SI Series, PI Series, NDI Series, PAI Series, NAI Series, NI Series, DAM Series, MBZ Series, PYR Series, DNB Series and NB Series, available from Midori Kagaku Co., Ltd.

A thermal polymerization initiator may be used in combination. Specific examples of the trade name thereof include San-Aid (base agent) SI-60, SI-80, SI-100, SI-110, SI-145, SI-150, SI-160 and SI-180 and San-Aid (auxiliary agent) SI, available from Sanshin Chemical Industry, Co., Ltd. The thermal polymerization initiator may be used in combination with the photoradical polymerization initiator and the cationic photoradical polymerization initiator or used in combination with the photoradical polymerization initiator.

The polymerizable liquid crystal composition of the invention may contain a photosensitizer.

Examples of the photosensitizer include a thioxanthone derivative, an anthraquinone derivative and a naphthoquinone derivative, and preferred examples thereof include the compounds (Z-1) to (Z-6) shown below. Particularly preferred examples of the photosensitizer include the compounds (Z-1) and (Z-2). The photosensitizers may be used solely or as a mixture of two or more of them.

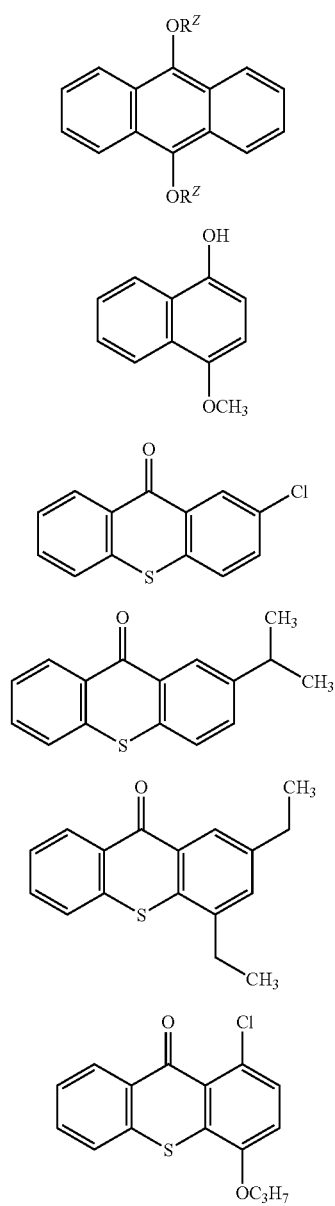

wherein $R^z$ represents linear alkyl having from 1 to 10 carbon atoms.

The compound (Z-1) wherein $R^z$ represents n-butyl is commercially available as Anthracure UVS-1331 from Kawasaki Kasei Chemicals, Ltd. The compound (Z-2) is commercially available as Anthracure ET-2111 from Kawasaki Kasei Chemicals, Ltd. The compound (Z-3) is commercially available as Speedcure CTX from Lambson Group, Ltd. The compound (Z-4) is commercially available as Quantacure ITX from Shell Chemicals Co. Ltd. The compound (Z-5) is commercially available as Kayacure DETX-S from Nippon Kayaku Co., Ltd. The compound (Z-6) is commercially available as Speedcure CPTX from Lambson Group, Ltd.

The sensitivity to light is enhanced by using the DAS and the photosensitizer in combination. The mixing ratio of the DAS and the photosensitizer is preferably from 10 to 200 parts by weight of the photosensitizer per 100 parts by weight of the DAS. The mixing ratio is more preferably from 20 to 100 parts by weight of the photosensitizer per 100 parts by weight of the DAS.

In order to improve the weather resistance of the polymerizable liquid crystal composition, an ultraviolet ray absorbent, a light stabilizer (radical scavenger), an antioxidant and the like may be added. Examples of the ultraviolet ray absorbent include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK STAB LA-32, ADK STAB LA-34, ADK STAB LA-36, ADK STAB LA-31, ADK STAB 1413 and ADK STAB LA-51. "Tinuvin" is a trade name of the products available from Ciba Japan Co., Ltd., and "ADK STAB" is a trade name of the products available from ADEKA Corporation.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, 5060, Tinuvin 5151, Chimassorb 119FL, Chimassorb 944FL, Chimassorb 944LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346, available from Nihon Cytec Industries Inc., and Good-rite UV-3034, available from Goodrich Corporation. "Chimassorb" is a trade name of the products available from Ciba Japan Co., Ltd.

Examples of the antioxidant include ADK STAB AO-20, AO-30, AO-40, AO-50, AO-60 and AO-80, Sumilizer BHT, Sumilizer BBM-S and Sumilizer GA-80, available from Sumitomo Chemical Co., Ltd., and Irganox 1076, Irganox 1010, Irganox 3114 and Irganox 245, available from Ciba Japan Co., Ltd. These commercially available products may be used in the invention.

The polymerizable liquid crystal composition of the invention may contain a solvent as described above. In general, the components described above are dissolved in a solvent to prepare the polymerizable liquid crystal composition. For facilitating the coating operation, the polymerizable liquid crystal composition may be further diluted with a solvent to control the viscosity of the polymerizable liquid crystal composition. The solvent may be used solely or as a mixture of two or more of them. Examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (such as methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (such as methyl propionate, methyl 3-methoxypropyonate, ethyl propionate, propyl propionate and butyl propionate), alkyl butyrate (such as methyl butyrate, ethyl butyrate, isobutyl butyrate and propyl butyrate), dialkyl malonate (such as diethyl malonate), alkyl glycolate (such as methyl glycolate and ethyl glycolate), alkyl lactate (such as methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-diemthylacetamide, N-methylpropyonamide, N,N-dimethylormamide, N,N-diethylformamide, N,N-diethylacetamide, N,N-diemthylacetamide dimethylacetal, N-methylcaprolactam and dimethylimidazolidinone.

Preferred examples of the alcohol solvent include methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis (2-propyl)ether, 1,4-dioxane and tetrahydrofuran (THF).

Preferred examples of the glycol monoalkyl ether solvent include ethylene glycol monoalkyl ether (such as ethylene glycol monomethyl ether and ethylene glycol monobutyl ether), diethylene glycol monoalkyl ether (such as diethylene glycol monoethyl ether), triethylene glycol monoalkyl ether, propylene glycol monoalkyl ether (such as propylene glycol monobutyl ether), dipropylene glycol monoalkyl ether (such as dipropylene glycol monomethyl ether), ethylene glycol monoalkyl ether acetate (such as ethylene glycol monobutyl ether acetate), diethylene glycol monoalkyl ether acetate (such as diethylene glycol monoethyl ether acetate), triethylene glycol monoalkyl ether acetate, propylene glycol monoalkyl ether acetate (such as propylene glycol monomethyl ether acetate, propylene glycol monoethyl ether acetate and propylene glycol monobutyl ether acetate), dipropylene glycol monoalkyl ether acetate (such as dipropylene glycol monomethyl ether acetate), and diethylene glycol methyl ethyl ether.

Preferred examples of the aromatic hydrocarbon solvent include benzene, toluene, xylene, mesitylene, ethylbenzene, diethylbenzene, i-propylbenzene, n-propylbenzene, tert-butylbenzene, sec-butylbenzene, n-butylbenzene and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane and decalin.

Preferred examples of the ketone solvent include acetone, methyl ethyl ketone, methyl isobutyl ketone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl acetate, methyl acetoacetate and 1-methoxy-2-propyl acetate.

An amide solvent, an aromatic hydrocarbon solvent and a ketone solvent are preferably used from the standpoint of solubility of the polymerizable liquid crystal compounds, and an ester solvent, an alcohol solvent, an ether solvent and a glycol monoalkyl ether solvent are also preferably used in combination from the standpoint of the boiling point of the solvent. There is no particular limitation on selecting the solvent, and in the case where a plastic substrate is used as the supporting substrate, it is necessary to lower the drying temperature to prevent the substrate from being deformed, and is also necessary to prevent the substrate from being damaged with the solvent. Preferred examples of the solvent used in this case include an aromatic hydrocarbon solvent, a ketone solvent, an ester solvent, an ether solvent, an alcohol solvent, an acetate solvent and a glycol monoalkyl acetate solvent.

The preferred ratio of the solvent in the polymerizable liquid crystal composition of the invention is generally from 0 to 95% by weight, and taking the solubility of the polymerizable liquid crystal compound and the optimum viscosity upon coating the solution of the composition into consideration, and also taking the economical standpoint including the cost of the solvent and the time and energy required for evaporating the solvent into consideration, the ratio of the solvent is more preferably from 40 to 95% by weight, further preferably from 45 to 90% by weight, and still further preferably from 50 to 85% by weight.

In the following description, a liquid crystal film of the invention obtained from the polymerizable liquid crystal composition may be referred simply to as a liquid crystal film in some cases. The liquid crystal film can be produced in the following manner. The solution of the polymerizable liquid crystal composition is coated on a supporting substrate, and then dried to form a coated film. The coated film is then irradiated with light to polymerize the polymerizable liquid crystal composition, thereby fixing the twisted orientation formed by the composition in a liquid crystal state in the coated film. Examples of the supporting substrate that can be used herein include glass and a plastic film. Examples of the plastic film include films of polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylate resin, polyvinyl alcohol, polypropylene, cellulose, triacetyl cellulose, a partially saponified product of triacetyl cellulose, an epoxy resin, a phenol resin and a cycloolefin resin. Examples of the polyethylene terephthalate include Melinex (PET), produced by ICI Corporation, Lumirror (PET), produced by Toray Industries, Ltd., Diafoil (PET), produced by Mitsubishi Polyester Film GmbH, and Myler (PET), produced by Teijin DuPont Films Japan, Ltd.

Examples of the cycloolefin resin include a norbornene resin and a dicyclopentadiene resin, but the invention is not limited thereto. Among these, those having no unsaturated bond or having unsaturated bonds that have been hydrogenated are preferably used. Examples thereof include a hydrogenated product of a ring-opening (co)polymer of one or plural kinds of norbornene monomers, an addition (co)polymer of one or plural kinds of norbornene monomers, an addition copolymer of a norbornene monomer and an olefin monomer (such as ethylene and an α-olefin), an addition copolymer of a norbornene monomer and a cycloolefin monomer (such as cyclopentene, cyclooctene and 5,6-dihyroxycyclopentadiene), and modified products thereof. Specific examples thereof include Zeonex and Zeonor (produced by Zeon Corporation), Arton (produced by JSR Corporation), Topas (produced by Ticona, Inc.), Apel (produced by Mitsui Chemicals, Inc.), Escena (produced by Sekisui Chemical Co., Ltd.) and Optorez (produced by Hitachi Chemical Co., Ltd.).

The plastic film may be a uniaxially stretched film or a biaxially stretched film. The plastic film may be subjected to a surface treatment, such as a hydrophilic treatment, e.g., a corona treatment and a plasma treatment, and a hydrophobic treatment. While the method for the hydrophilic treatment is not particularly limited, a corona treatment and a plasma treatment are preferred, and a plasma treatment is particularly preferred. The plasma treatment can be effected by a method disclosed, for example, in JP-A-2002-226616, JP-A-2002-121648. An anchor coating layer may be formed for improving adhesion between the liquid crystal film and the plastic film. The anchor coating layer may be formed of an inorganic material or an organic material as far as the layer improves adhesion between the liquid crystal film and the plastic film. The plastic film may be a laminated film. Instead of the plastic film, a metallic substrate, such as aluminum, iron and copper, having slit grooves formed on the surface thereof, and a glass substrate, such as alkali glass, borosilicate glass and flint glass, having been etched to form grooves in a slit form on the surface thereof may also be used.

The supporting substrate, such as glass and a plastic film, is preferably subjected to a physical or mechanical surface treatment, such as rubbing, or an photo-orientation treatment, before forming a coated film of the polymerizable liquid crystal composition thereon. An arbitrary method may be employed for effecting the rubbing treatment, and in general such methods are employed that a rubbing cloth formed of such a material as rayon, cotton or polyamide is wound on a metallic roll, and the roll is rotated and moved in a state where the roll is in contact with the supporting substrate or the polymer film, or the supporting substrate is moved with the rotated roll staying. The rubbing treatment may be carried out directly on the supporting substrate, or on the plastic film formed on the supporting substrate. The method for the rubbing treatment has been described above. An orientation capability may be imparted to the surface of the supporting substrate by oblique vapor deposition of silicon oxide depending on the kind of the supporting substrate. The photo-orientation treatment may be effected with a polymer having a photo-crosslinkable group, such as cinnamate and azobenzene, or a photo-orientation film obtained by irradiating polyimide with a polarized ultraviolet ray. A special thin film has been known that provides favorable orientation with out a rubbing treatment. Alternatively, a liquid crystal polymer may be coated on the supporting substrate. Furthermore, an orientation treatment may be performed with magnetic field orientation, electric field orientation or shear stress.

The factors determining the orientation of the liquid crystal molecules in the polymerizable liquid crystal composition include (1) the kinds of the compounds contained in the composition, (2) the kind of the supporting substrate, (3) the method of orientation, and the like. Accordingly, the orientation also depends on the mixing ratios of the compounds (1) to (3), the compounds (4) to (6) as optically active compounds, and the surfactant. The ratios of the components of the polymerizable liquid crystal composition are those described above. The compound (1) is used as a major component, the compound (2) is used mainly for controlling the birefringence, and the compound (3) is used mainly for controlling the curing rate. The compounds (4) to (6) are used for controlling the helical pitch, and the surfactant is used for controlling the orientation homogeneity to prevent orientation defects from occurring.

Examples of a coating method for obtaining a coated film having a uniform thickness upon coating the polymerizable liquid crystal composition or a solution thereof include a spin coating method, a microgravure coating method, a gravure coating method, a wire bar coating method, a dip coating method, a spray coating method, a meniscus coating method and a die coating method.

The coated thickness of the polymerizable liquid crystal composition (the coated thickness after drying in the case of the solution) is preferably approximately from 2 to 20 µm. When the coated thickness is less than 1 µm, the degree of polarization tends to be lowered unfavorably while the reflection band width can be assured. The coated thickness is preferably 2 µm or more, and further preferably 3 µm or more. In the case where the coated thickness is larger than 20 µm, on the other hand, the cost is unfavorably increased, but the reflection band width and the degree of polarization are not further increased significantly. The coated thickness is more preferably 15 µm or less, further preferably 10 µm or less, and still further preferably 7 µm or less. The coated thickness of the polymerizable liquid crystal composition is generally from 2 to 10 µm, and preferably from 3 to 7 µm, in the case where the color property covering over the whole visible light region. In the case of an infrared reflection film having selective reflection characteristics for the near infrared region, a thickness of 10 µm or more may be used for providing sufficient reflection characteristics. This is because in the selective reflection of a cholesteric liquid crystal, the selective reflection wavelength and the helical pitch are proportional to each other, and thus the pitch length is necessarily larger when the wavelength is larger. In order to assure sufficient reflectivity for the selective reflection, a thickness corresponding to several pitches is required.

Upon coating the solution of the polymerizable liquid crystal composition of the invention, the solvent is removed after coating to form a polymerizable liquid crystal layer, i.e., a layer of the polymerizable liquid crystal composition, having a uniform thickness on the supporting substrate. The conditions for removing the solvent are not particularly limited, and the coated film may be dried to such an extent that the solvent has been substantially removed, and the coated film of the polymerizable liquid crystal composition loses flowability. The solvent can be removed by air drying at room temperature, drying with a hot plate, drying in a drying furnace, blowing warm air or hot air, or the like. The polymerizable liquid crystal composition in the coated film may complete a twisted orientation during the drying operation of the coated film in some cases, depending on the kinds and the compositional ratios of the compounds used in the polymerizable liquid crystal composition. Accordingly, the coated film after completing the drying step can be subjected to a polymerizing step without subjecting to a heat-treating step described later.

Preferred ranges of the conditions, such as the temperature and time for the heat treatment of the coated film, the wavelength of light used for light irradiation, and the amount of light radiated from a light source, vary depending on the kinds and compositional ratios of the compounds used in the polymerizable liquid crystal composition, and the presence or absence and the addition amount of the photopolymerization initiator. Accordingly, the conditions including the temperature and time for the heat treatment of the coated film, the wavelength of light used for light irradiation, and the amount of light radiated from a light source described later are considered to be approximate ranges.

The heat treatment of the coated film is preferably carried out under such conditions that the solvent is removed, and homogeneous orientation of the polymerizable liquid crystal is obtained. The heat treatment may be carried out at a temperature higher than the liquid crystal phase transition temperature of the polymerizable liquid crystal composition. One example of the heat-treating method is a method of heating the coated film to a temperature where the polymerizable liquid crystal composition exhibits a nematic liquid crystal phase, whereby the polymerizable liquid crystal composition in the coated film forms twisted orientation. Twisted orientation may be formed by changing the temperature of the coated film within a temperature range where the polymerizable liquid crystal composition exhibits a nematic liquid crystal phase. In this method, the coated film is heated to a high temperature region within the aforementioned temperature range to complete substantially twisted orientation of the coated film, and then the temperature is decreased to make orientation with higher regularity. In both cases using the heat-treating methods, the heat-treating temperature may be from room temperature to 120° C., preferably room temperature to 100° C., more preferably from room temperature to 90° C., and further preferably from room temperature to 85° C. The heat-treating time is generally from 5 seconds to 2 hours, preferably from 10 seconds to 40 minutes, and more preferably from 20 seconds to 20 minutes. In order to increase the temperature of the layer containing the polymerizable liquid crystal composition to the prescribed temperature, the heat-treating time is preferably 5 seconds or more. In order to prevent the productivity from being deteriorated, the heat-treating time is preferably 2 hours or less. The polymerizable liquid crystal layer of the invention is thus completed in this manner.

The twisted orientation state of the polymerizable liquid crystal compounds formed in the polymerizable liquid crystal layer is fixed by polymerizing the polymerizable liquid crystal composition through irradiation of light. The wavelength of the light used for the light irradiation is not particularly limited, and an electron beam, an ultraviolet ray, a visible ray, an infrared ray (heat ray) and the like may be used. In general, an ultraviolet ray or a visible ray may be used. The wavelength is generally in a range of from 150 to 500 nm, preferably in a range of from 250 to 450 nm, and more preferably in a range of from 300 to 400 nm. Examples of the light source include a low pressure mercury lamp (such as a bactericidal lamp, a fluorescent chemical lamp and a black light lamp), a high pressure discharge lamp (such as a high pressure mercury lamp and a metal halide lamp), and a short arc discharge lamp (such as a superhigh pressure mercury lamp, a xenon lamp and a mercury xenon lamp). Preferred examples of the light source include a metal halide lamp, a xenon lamp, a superhigh pressure mercury lamp and a high pressure mercury lamp. The wavelength range of the light source used for irradiation may be selected by inserting a filter between the light source and the polymerizable liquid crystal layer to pass the specific wavelength range. The amount of light radiated from the light source is generally from 2 to 5,000 mJ/cm$^2$, preferably from 10 to 3,000 mJ/cm$^2$, and more preferably from 100 to 2,000 mJ/cm$^2$. The temperature condition upon irradiation of light is preferably set similarly to the heat-treating temperature. The atmosphere upon polymerization may be any of a nitrogen atmosphere, an inert gas atmosphere and an air atmosphere, and in particular, polymerization of the polymerizable liquid crystal composition of the invention can proceed in an air atmosphere.

The use of the polymer is as follows. The polymer can be used as a film having optical anisotropy. The optically anisotropic film has circular dichroism owing to the component D, which is an optically active compound. The circular dichroism is controlled by selecting the chirality of the component D, thereby reflecting selectively clockwise circularly polarized light or anticlockwise circularly polarized light. The wavelength of selective reflection depends on the helical pitch length, and the helical pitch length can be controlled by the amount and the helical twisting power of the component D added.

When the helical pitch length is in the range of from 350 to 750 nm, the film selectively reflects light having a wavelength of a part or the whole of the visible region. The film can be used as a reflection film for the visible region by changing the helical pitch length continuously in the thickness direction of the polymer having optical anisotropy, or by laminating two or more layers of films having optical anisotropy that are different in helical pitch length. A combination of the reflection film and a ¼ wavelength plate can be applied to a brightness enhancing film of a liquid crystal display device.

When the helical pitch length is in the range of from 100 to 350 nm, the film selectively reflects light having a wavelength of a part or the whole of the ultraviolet region. The film exhibits a function of a negative C plate and thus can be applied as an optical compensation film to a liquid crystal display device.

When the helical pitch length is in the range of from 800 to 2,500 nm, the film selectively reflects light having a wavelength of a part or the whole of the near infrared region. In the case where the twisting direction of the helical structure is only one direction, the film reflects only one of clockwise circularly polarized light and anticlockwise circularly polarized light of the components of a near infrared ray. Examples of the method for reflecting both the components, i.e., clockwise circularly polarized light and anticlockwise circularly polarized light, include a method of laminating two or more layers of the polymers (i.e., the optically anisotropic films) having twisting directions of the helical structures that are opposite to each other, and a method of laminating two layers of the polymers having the same twisting direction of the helical structures, with a ½ wavelength plate intervening therebetween. These optical devices can also be applied to an infrared ray reflection film.

The polymer of the invention can be applied to, in addition to the aforementioned use, cosmetics, ornamental members, nonlinear optical materials, information recording materials and the like.

EXAMPLES

The invention will be described in more detail with reference to examples shown below, but the invention is not limited to the examples. Evaluation methods used in the examples are shown below.
<Polymerization Conditions>
Light having an intensity of 30 mW/cm2 (365 nm) was radiated from a 250 W superhigh pressure mercury lamp at room temperature for 30 seconds.
<Evaluation of Planar Orientation>
(1) Orientation Treatment of Supporting Substrate
A PET film having a thickness of 50 μm (Lumirror T60, produced by Toray Industries, Ltd.) as a supporting substrate was subjected to a rubbing treatment with a rayon cloth.
(2) Confirmation of Orientation Homogeneity of Liquid Crystal
The presence of orientation defects was confirmed by observing a substrate having a liquid crystal film visually or with a polarizing microscope.
(3) Confirmation of Wavelength of Selective Reflection
A transmission spectrum of a PET film having a cured film was measured with an ultraviolet and visible region spectrophotometer (UV-1700, produced by Shimadzu Corporation) for the ultraviolet and visible regions and with an ultraviolet, visible and near infrared region spectrophotometer (V-670, produced by JASCO Corporation) for the infrared region. A wavelength range having a median transmittance between the maximum transmittance and the minimum transmittance was designated as a selective reflection range. A median value of the selective reflection wavelength range was designated as the selective reflection wavelength center.

The compounds used in the examples are shown below.

(1-1)

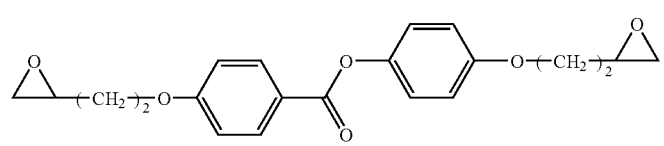

-continued

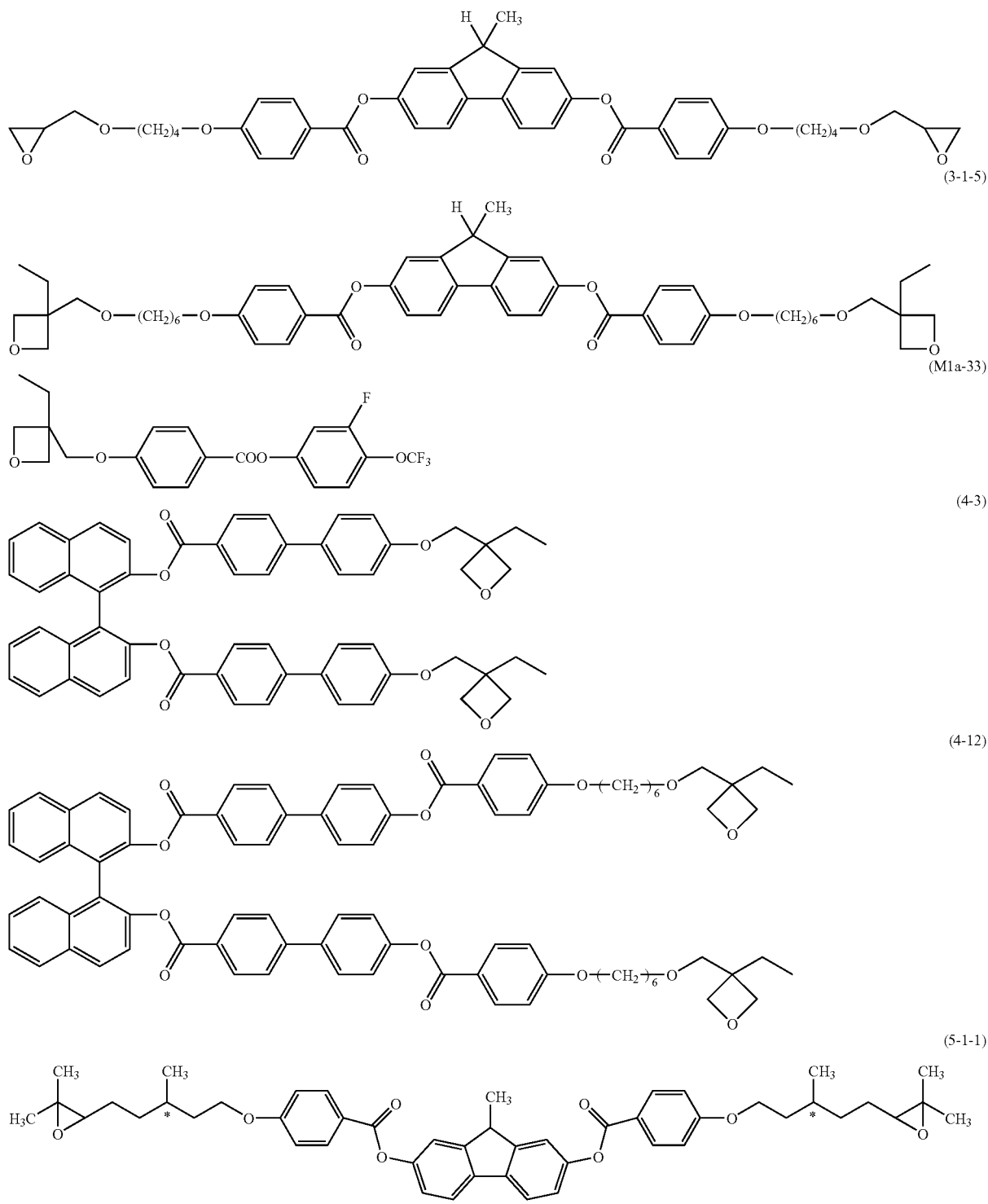

The compound (1-1) was synthesized with reference to the method disclosed in Macromolecules, vol. 26, pp. 1244-1247 (1993).

The compounds (2-1-3) and (3-1-5) were synthesized with reference to the method disclosed in JP-A-2005-60373.

The compound (M1a-33) was synthesized with reference to the method disclosed in JP-A-2005-320317.

The compound (4-3) was synthesized with reference to the method disclosed in JP-A-2007-176927.

The compound (4-12) was synthesized with reference to the method disclosed in JP-A-2005-263778.

The compound (5-1-1) was synthesized with reference to the method disclosed in JP-A-2005-97281.

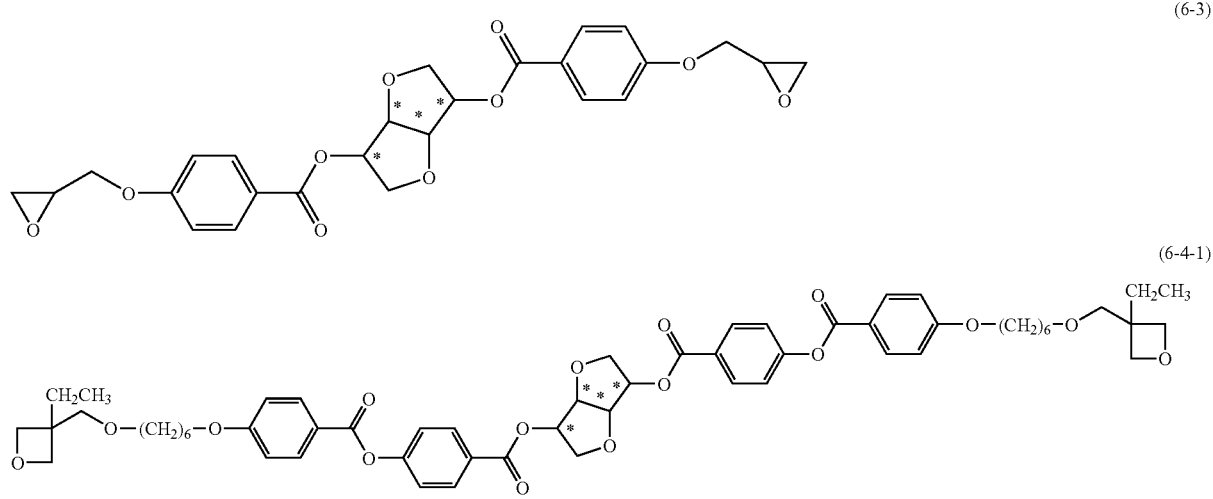

The compound (6-3) was synthesized with reference to the method disclosed in JP-A-2002-161096 and JP-T-H07-508797, and the compound (6-4-1) was synthesized in the following manner.

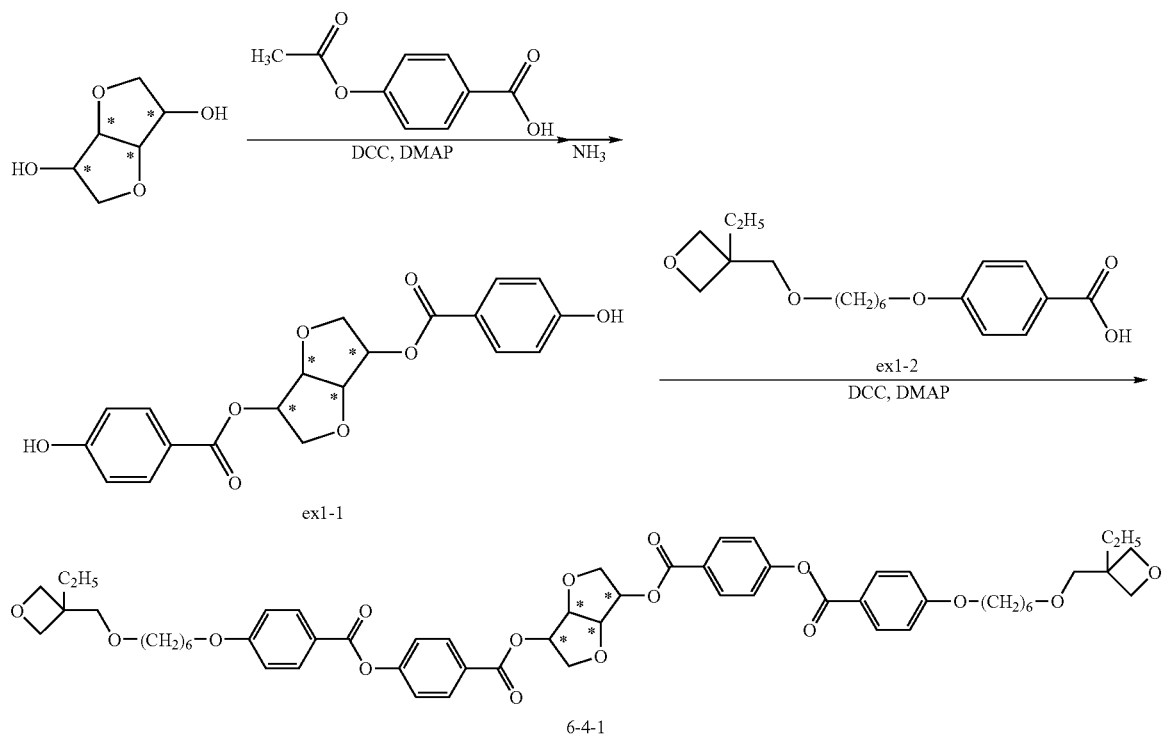

<Step 1>

68 mmol of isosorbide, 140 mmol of acetoxybenzoic acid and 28 mmol of 4-dimethylaminopyridine (DMAP) were added to 250 mL of dichloromethane and stirred in a nitrogen atmosphere. A solution of 147 mmol of 1,3-dicyclohexylcarbodiimide (DCC) dissolved in 100 mL of dichloromethane was added dropwise thereto. After completing the dropwise addition, the solution was stirred at room temperature for 8 hours. Precipitate thus deposited was filtered off, and the organic layer was washed with water and dried over anhydrous magnesium sulfate. The solvent was distilled off under reduced pressure, and methanol was added thereto, followed by stirring in a nitrogen atmosphere. 2.5 mL of aqueous ammonia was added dropwise thereto. After completing the dropwise addition, the solution was stirred at room temperature for 6 hours. After distilling off the solvent under reduced pressure, 100 mL of ethyl acetate and 100 mL of a 2N hydrochloric acid aqueous solution were added thereto, and the organic layer was extracted. The organic layer was washed with water and dried over anhydrous magnesium sulfate. The solvent was distilled off under reduced pressure, and the residue was recrystallized from toluene to provide 21 mmol of the compound (ex1-1).

<Step 2>

21 mmol of the compound (ex1-1), 46 mmol of the compound (ex1-2) and 9 mmol of 4-dimethylaminopyridine (DMAP) were added to 100 mL of dichloromethane and stirred in a nitrogen atmosphere. A solution of 48 mmol of 1,3-dicyclohexylcarbodiimide (DCC) dissolved in 100 mL of dichloromethane was added dropwise thereto. After completing the dropwise addition, the solution was stirred at room temperature for 8 hours. Precipitate thus deposited was filtered off, and the organic layer was washed with water and dried with anhydrous magnesium sulfate. The solvent was distilled off under reduced pressure, and the residue was purified by column chromatography and recrystallization from ethanol to provide 16 mmol of the compound (6-4-1).

Example 1

Preparation of Polymerizable Liquid Crystal Composition (1)

The compounds (1-1), (2-1-3) and (3-1-5) were mixed at a weight ratio of (1-1)/(2-1-3)/(3-1-5)=75/20/5 to prepare a composition, which was designated as a composition MIX1. The compound (4-12) in a weight ratio of 0.039, a fluorine series nonionic surfactant FTX-218, produced by Neos Co., Ltd., in a weight ratio of 0.002 and a polymerization initiator CPI-110P, produced by SAN-APRO Ltd., in a weight ratio of 0.01 were added to the composition MIX1 to prepare a composition. Cyclopentanone was added to the resulting composition to provide a polymerizable liquid crystal composition (1) having a solvent concentration of 60% by weight.
Production of Selective Reflection Film A PET film having been subjected to a rubbing treatment was used as a supporting substrate. The polymerizable liquid crystal composition (1) was coated on the supporting substrate with a spin coater. After coating, the solvent was removed by drying on a hot plate set at 80° C. for 2 minutes, thereby orienting the liquid crystal layer. The resulting coated film was irradiated with an ultraviolet ray (30 mW/cm$^2$, 365 mm) with a superhigh pressure mercury lamp (250 W) at 25° C. for 30 seconds to provide a film exhibiting green selective reflection. The film had a selective reflection wavelength center of 535 nm and a selective reflection range of approximately 80 nm. The film exhibited a planar orientation and had a transparent appearance.

Example 2

A polymerizable liquid crystal composition (2) was prepared in the same manner as in Example 1 except that a fluorine series nonionic surfactant FTX-218 in a weight ratio of 0.0005 was added to the composition MIX1. A cured film was produced in the same manner as in Example 1 except that the polymerizable liquid crystal composition (2) was used to provide a film exhibiting green selective reflection. The film had a selective reflection wavelength center of 535 nm and a selective reflection range of approximately 80 nm. The film exhibited a planar orientation and had a transparent appearance.

Example 3

A polymerizable liquid crystal composition (3) was prepared in the same manner as in Example 1 except that a nonionic surfactant FTX-218 in a weight ratio of 0.005 was added to the composition MIX1. A cured film was produced in the same manner as in Example 1 except that the polymerizable liquid crystal composition (3) was used to provide a film exhibiting green selective reflection. The film had a selective reflection wavelength center of 535 nm and a selective reflection range of approximately 80 nm. The film exhibited a planar orientation and had a transparent appearance.

Example 4

A polymerizable liquid crystal composition (4) was prepared in the same manner as in Example 1 except that a hydrocarbon series nonionic surfactant Polyflow No. 75, produced by Kyoeisha Chemical Co., Ltd., in a weight ratio of 0.002 was added to the composition MIX1. A cured film was produced in the same manner as in Example 1 except that the polymerizable liquid crystal composition (4) was used to provide a film exhibiting green selective reflection. The film had a selective reflection wavelength center of 535 nm and a selective reflection range of approximately 80 nm. The film exhibited a planar orientation and had a transparent appearance.

Comparative Example 1

A polymerizable liquid crystal composition (A) was prepared in the same manner as in Example 1 except that no nonionic surfactant was added to the composition MIX1. A cured film was produced in the same manner as in Example 1 except that the polymerizable liquid crystal composition (A) was used to provide a film exhibiting green selective reflection, but the film suffered formation of a focal conic orientation and had a slightly white turbid appearance. The focal conic orientation means such an orientation state that the helical axes are in parallel to the substrate surface with random directions of the helical axes.

Example 5

A polymerizable liquid crystal composition (5) was prepared in the same manner as in Example 1 except that the compound (4-12) in a weight ratio of 0.033 was added to the composition MIX1. A cured film was produced in the same manner as in Example 1 except that the polymerizable liquid crystal composition (5) was used to provide a film exhibiting red selective reflection. The film had a selective reflection wavelength center of 635 nm and a selective reflection range of approximately 80 nm. The film exhibited a planar orientation and had a transparent appearance.

Example 6

A polymerizable liquid crystal composition (6) was prepared in the same manner as in Example 1 except that the compound (4-12) in a weight ratio of 0.048 was added to the composition MIX1. A cured film was produced in the same manner as in Example 1 except that the polymerizable liquid crystal composition (6) was used to provide a film exhibiting blue selective reflection. The film had a selective reflection wavelength center of 450 nm and a selective reflection range of approximately 70 nm. The film exhibited a planar orientation and had a transparent appearance.

Comparative Example 2

A polymerizable liquid crystal composition (B) was prepared in the same manner as in Example 5 except that no nonionic surfactant was added to the polymerizable liquid crystal composition (5) in Example 5. A cured film was produced in the same manner as in Example 1 except that the polymerizable liquid crystal composition (B) was used to provide a film exhibiting red selective reflection, but the film suffered formation of a focal conic orientation and had a slightly white turbid appearance.

Comparative Example 3

A polymerizable liquid crystal composition (C) was prepared in the same manner as in Example 6 except that no nonionic surfactant was added to the polymerizable liquid crystal composition (6) in Example 6. A cured film was produced in the same manner as in Example 1 except that the polymerizable liquid crystal composition (C) was used to provide a film exhibiting blue selective reflection, but the film suffered formation of a focal conic orientation and had a slightly white turbid appearance.

Example 7

The compounds (1-1), (2-1-3) and (3-1-5) were mixed at a weight ratio of (1-1)/(2-1-3)/(3-1-5)=75/5/20 to prepare a composition, which was designated as a composition MIX2. A polymerizable liquid crystal composition (7) was prepared in the same manner as in Example 1 except that the composition MIX2 was used. A cured film was produced in the same manner as in Example 1 except that the polymerizable liquid crystal composition (7) was used to provide a film exhibiting green selective reflection. The film had a selective reflection wavelength center of 535 nm and a selective reflection range of approximately 80 nm. The film exhibited a planar orientation and had a transparent appearance.

Comparative Example 4

A polymerizable liquid crystal composition (D) was prepared in the same manner as in Example 7 except that no nonionic surfactant was added to the polymerizable liquid crystal composition (7) in Example 7. A cured film was produced in the same manner as in Example 1 except that the polymerizable liquid crystal composition (D) was used to provide a film exhibiting green selective reflection, but the film suffered formation of a focal conic orientation and had a slightly white turbid appearance.

Example 8

A polymerizable liquid crystal composition (8) was prepared in the same manner as in Example 1 except that the compound (4-12) in a weight ratio of 0.018 was added to the composition MIX1. A cured film was produced in the same manner as in Example 1 except that the polymerizable liquid crystal composition (8) was used to provide a film having a reflection range in the near infrared region. The film had a selective reflection wavelength center of 1,200 nm and a selective reflection range of approximately 250 nm. The film exhibited a planar orientation and had a transparent appearance.

Comparative Example 5

A polymerizable liquid crystal composition (E) was prepared in the same manner as in Example 8 except that no nonionic surfactant was added to the polymerizable liquid crystal composition (8) in Example 8. A cured film was produced in the same manner as in Example 1 except that the polymerizable liquid crystal composition (E) was used, but the film suffered formation of a focal conic orientation and had a slightly white turbid appearance.

Example 9

A polymerizable liquid crystal composition (9) was prepared in the same manner as in Example 1 except that the compound (4-3) in a weight ratio of 0.025 was added to the composition MIX1. A cured film was produced in the same manner as in Example 1 except that the polymerizable liquid crystal composition (9) was used to provide a film having a reflection range in the near infrared region. The film had a selective reflection wavelength center of 950 nm and a selective reflection range of approximately 150 nm. The film exhibited a planar orientation and had a transparent appearance.

Comparative Example 6

A polymerizable liquid crystal composition (F) was prepared in the same manner as in Example 9 except that no nonionic surfactant was added to the polymerizable liquid crystal composition (9) in Example 9. A cured film was produced in the same manner as in Example 1 except that the polymerizable liquid crystal composition (F) was used, but the film suffered formation of a focal conic orientation and had a slightly white turbid appearance.

Example 10

A polymerizable liquid crystal composition (10) was prepared in the same manner as in Example 1 except that the compound (6-4-1) in a weight ratio of 0.025 and a nonionic surfactant FTX-218 in a weight ratio of 0.001 were added to the composition MIX1. A cured film was produced in the same manner as in Example 1 except that the polymerizable liquid crystal composition (10) was used to provide a film having a reflection range in the near infrared region. The film had a selective reflection wavelength center of 1,060 nm and a selective reflection range of approximately 200 nm. The film exhibited a planar orientation and had a transparent appearance.

Comparative Example 7

A polymerizable liquid crystal composition (G) was prepared in the same manner as in Example 10 except that no nonionic surfactant was added to the polymerizable liquid crystal composition (10) in Example 10. A cured film was produced in the same manner as in Example 1 except that the polymerizable liquid crystal composition (G) was used, but the film suffered formation of a focal conic orientation and had a slightly white turbid appearance.

Example 11

The compounds (1-1), (2-1-3) and (3-1-5) were mixed at a weight ratio of (1-1)/(2-1-3)/(3-1-5)=90/1/9 to prepare a composition, which was designated as a composition MIX3. The compound (6-3) in a weight ratio of 0.05, the nonionic surfactant FTX-218 in a weight ratio of 0.002 and the polymerization initiator CPI-110P in a weight ratio of 0.03 were added to the composition MIX3 to prepare a composition. A mixed solvent of cyclopentanone and PGMEA (cyclopentanone/PGMEA=1/1 by weight) was added to the resulting composition to provide a polymerizable liquid crystal composition (11) having a solvent concentration of 70% by weight. A cured film was produced in the same manner as in Example 1 except that the polymerizable liquid crystal composition (11) was used to provide a film exhibiting red selective reflection. The film had a selective reflection wavelength center of 630 nm and a selective reflection range of approximately 100 nm. The film exhibited a planar orientation and had a transparent appearance.

Comparative Example 8

A polymerizable liquid crystal composition (H) was prepared in the same manner as in Example 11 except that no nonionic surfactant was added to the polymerizable liquid crystal composition (11) in Example 11. A cured film was produced in the same manner as in Example 1 except that the polymerizable liquid crystal composition (H) was used, but the film suffered formation of a focal conic orientation and had a slightly white turbid appearance.

Example 12

The compounds (1-1), (2-1-3) and (3-1-5) were mixed at a weight ratio of (1-1)/(2-1-3)/(3-1-5)=51/42/7 to prepare a composition, which was designated as a composition MIX4. The compound (5-1-1) in a weight ratio of 0.39, the nonionic surfactant FTX-218 in a weight ratio of 0.002 and the polymerization initiator CPI-110P in a weight ratio of 0.05 were added to the composition MIX4 to prepare a composition. A mixed solvent of cyclopentanone and PGMEA (cyclopentanone/PGMEA=1/1 by weight) was added to the resulting composition to provide a polymerizable liquid crystal composition (12) having a solvent concentration of 70% by weight. A cured film was produced in the same manner as in Example 1 except that the polymerizable liquid crystal composition (12) was used to provide a film exhibiting red selective reflection. The film had a selective reflection wavelength center of 640 nm and a selective reflection range of approximately 80 nm. The film exhibited a planar orientation and had a transparent appearance.

Comparative Example 9

A polymerizable liquid crystal composition (I) was prepared in the same manner as in Example 12 except that no nonionic surfactant was added to the polymerizable liquid crystal composition (12) in Example 12. A cured film was produced in the same manner as in Example 1 except that the polymerizable liquid crystal composition (I) was used, but the film suffered formation of a focal conic orientation and had a slightly white turbid appearance.

Example 13

The compounds (1-1), (2-1-3) and (3-1-5) were mixed at a weight ratio of (1-1)/(2-1-3)/(3-1-5)=61/31/8 to prepare a composition, which was designated as a composition MIX5. The compound (5-1-1) in a weight ratio of 0.54, the nonionic surfactant FTX-218 in a weight ratio of 0.002 and the polymerization initiator CPI-110P in a weight ratio of 0.05 were added to the composition MIX5 to prepare a composition. A mixed solvent of cyclopentanone and PGMEA (cyclopentanone/PGMEA=1/1 by weight) was added to the resulting composition to provide a polymerizable liquid crystal composition (13) having a solvent concentration of 70% by weight. A cured film was produced in the same manner as in Example 1 except that the polymerizable liquid crystal composition (13) was used to provide a film exhibiting blue selective reflection. The film had a selective reflection wavelength center of 480 nm and a selective reflection range of approximately 80 nm. The film exhibited a planar orientation and had a transparent appearance.

Comparative Example 10

A polymerizable liquid crystal composition (J) was prepared in the same manner as in Example 13 except that no nonionic surfactant was added to the polymerizable liquid crystal composition (13) in Example 13. A cured film was produced in the same manner as in Example 1 except that the polymerizable liquid crystal composition (J) was used, but the film suffered formation of a focal conic orientation and had a slightly white turbid appearance.

Example 14

The compounds (1-1), (2-1-3) and (M1a-33) were mixed at a weight ratio of (1-1)/(2-1-3)/(M1a-33)=90/5/5 to prepare a composition, which was designated as a composition MIX6. The compound (6-4-1) in a weight ratio of 0.04, the nonionic surfactant FTX-218 in a weight ratio of 0.002 and the polymerization initiator CPI-110P in a weight ratio of 0.03 were added to the composition MIX6 to prepare a composition. A mixed solvent of cyclopentanone and PGMEA (cyclopentanone/PGMEA=1/1 by weight) was added to the resulting composition to provide a polymerizable liquid crystal composition (14) having a solvent concentration of 70% by weight. A cured film was produced in the same manner as in Example 1 except that the polymerizable liquid crystal composition (14) was used to provide a film exhibiting red selective reflection. The film had a selective reflection wavelength center of 610 nm and a selective reflection range of approximately 100 nm. The film exhibited a planar orientation and had a transparent appearance.

Comparative Example 11

A polymerizable liquid crystal composition (K) was prepared in the same manner as in Example 14 except that no nonionic surfactant was added to the polymerizable liquid crystal composition (14) in Example 14. A cured film was produced in the same manner as in Example 1 except that the polymerizable liquid crystal composition (K) was used, but the film suffered formation of a focal conic orientation and had a slightly white turbid appearance.

Example 15

The compounds (1-1), (2-1-3) and (M1a-33) were mixed at a weight ratio of (1-1)/(2-1-3)/(M1a-33)=90/5/5 to prepare a composition, which was designated as a composition MIX7. The compound (6-4-1) in a weight ratio of 0.06, the nonionic surfactant FTX-218 in a weight ratio of 0.002 and the polymerization initiator CPI-110P in a weight ratio of 0.03 were added to the composition MIX6 to prepare a composition. A mixed solvent of cyclopentanone and PGMEA (cyclopentanone/PGMEA=1/1 by weight) was added to the resulting composition to provide a polymerizable liquid crystal composition (15) having a solvent concentration of 70% by weight. A cured film was produced in the same manner as in Example 1 except that the polymerizable liquid crystal composition (15) was used to provide a film exhibiting blue selective reflection. The film had a selective reflection wavelength center of 440 nm and a selective reflection range of approximately 60 nm. The film exhibited a planar orientation and had a transparent appearance.

Comparative Example 12

A polymerizable liquid crystal composition (L) was prepared in the same manner as in Example 15 except that no nonionic surfactant was added to the polymerizable liquid crystal composition (15) in Example 15. A cured film was produced in the same manner as in Example 1 except that the polymerizable liquid crystal composition (L) was used, but the film suffered formation of a focal conic orientation and had a slightly white turbid appearance.

Example 16

The compound (4-12) in a weight ratio of 0.039, an anionic surfactant Flownon SD-700, produced by Kyoeisha Chemical Co., Ltd., in a weight ratio of 0.002 and the polymerization initiator CPI-110P in a weight ratio of 0.03 were added to the composition MIX1 in Example 1 to prepare a composition. A mixed solvent of cyclopentanone and PGMEA (cyclopentanone/PGMEA=1/1 by weight) was added to the resulting composition to provide a polymerizable liquid crystal composition (16) having a solvent concentration of 65% by weight. A cured film was produced in the same manner as in Example 1 except that the polymerizable liquid crystal composition (16) was used to provide a film exhibiting green selective reflection. The film had a selective reflection wavelength center of 535 nm and a selective reflection range of approximately 80 nm. The film exhibited a planar orientation and had a transparent appearance.

Example 17

The compound (4-12) in a weight ratio of 0.039, a cationic surfactant Ftergent 300, produced by Neos Co., Ltd., in a weight ratio of 0.003 and the polymerization initiator CPI-110P in a weight ratio of 0.03 were added to the composition MIX1 in Example 1 to prepare a composition. A mixed solvent of cyclopentanone and PGMEA (cyclopentanone/PGMEA=1/1 by weight) was added to the resulting composition to provide a polymerizable liquid crystal composition (17) having a solvent concentration of 65% by weight. A cured film was produced in the same manner as in Example 1 except that the polymerizable liquid crystal composition (17) was used to provide a film exhibiting green selective reflection. The film had a selective reflection wavelength center of 535 nm and a selective reflection range of approximately 80 nm. The film exhibited a planar orientation and had a transparent appearance.

Example 18

The compound (4-12) in a weight ratio of 0.039, a nonionic surfactant BYK-370, produced by BYK Chemie Co., Ltd., in a weight ratio of 0.003 and the polymerization initiator CPI-110P in a weight ratio of 0.03 were added to the composition MIX1 in Example 1 to prepare a composition. A mixed solvent of cyclopentanone and PGMEA (cyclopentanone/PGMEA=1/1 by weight) was added to the resulting composition to provide a polymerizable liquid crystal composition (18) having a solvent concentration of 65% by weight. A cured film was produced in the same manner as in Example 1 except that the polymerizable liquid crystal composition (18) was used to provide a film exhibiting green selective reflection. The film had a selective reflection wavelength center of 535 nm and a selective reflection range of approximately 80 nm. The film exhibited a planar orientation and had a transparent appearance.

Comparative Example 13

A polymerizable liquid crystal composition (M) was prepared in the same manner as in Example 16 except that no nonionic surfactant was added to the polymerizable liquid crystal composition (16) in Example 16. A cured film was produced in the same manner as in Example 1 except that the polymerizable liquid crystal composition (M) was used, but the film suffered formation of a focal conic orientation and had a slightly white turbid appearance.

INDUSTRIAL APPLICABILITY

The polymerizable liquid crystal composition of the invention can be cured in the air and provides a liquid crystal film that has a transparent appearance and a planar orientation maintained homogeneously. A film obtained by polymerizing the polymerizable liquid crystal composition of the invention can be applied, for example, to a color filter, a reflective polarizing plate, a phase retarder, a brightness enhancing film, an infrared reflection film, and an optical compensation film, such as a negative C plate.

What is claimed is:
1. A polymerizable liquid crystal composition containing a component A which is at least one compound selected from the group consisting of compounds represented by the formula (1), a component B which is at least one compound selected from the group consisting of compounds represented by the formula (2), a component C which is at least one compound selected from the group consisting of compounds represented by the formula (3), a component D which is at least one compound selected from the group consisting, of compounds represented by the formulae (4) to (6), and a component E which is at least one surfactant selected from the group consisting of a nonionic surfactant, an anionic surfactant and a cationic surfactant

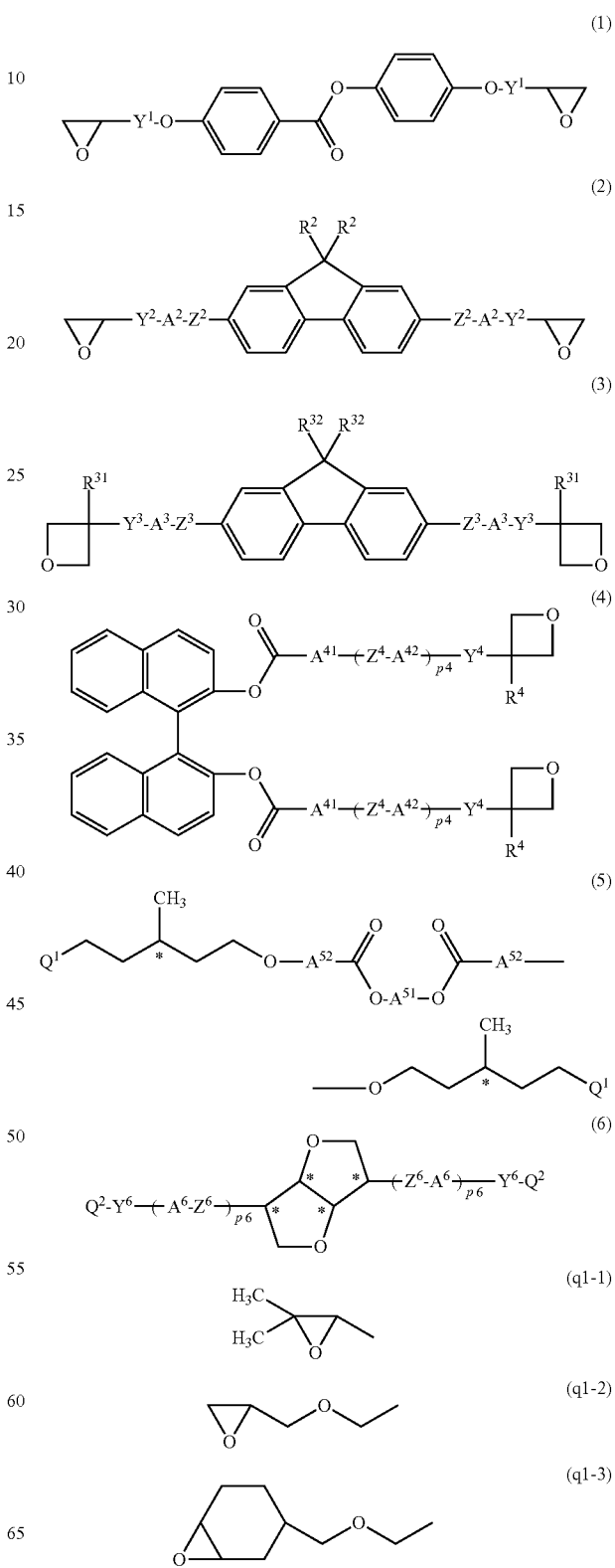

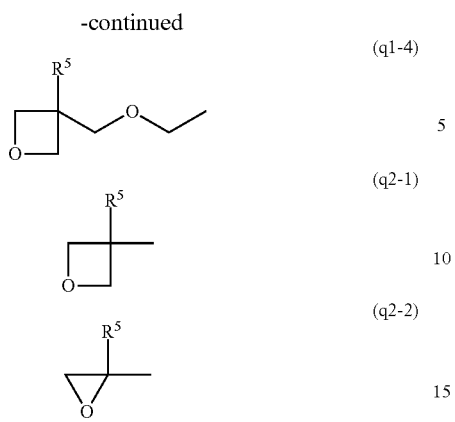

(q1-4)

(q2-1)

(q2-2)

wherein
in the formula (1), $Y^1$ independently represents alkylene having from 1 to 15 carbon atoms, and not-adjacent arbitrary —$CH_2$— in the alkylene may be replaced by —O—, —COO—, —OCO— or —CO—,
in the formula (2), $Y^2$ independently represents alkylene having from 1 to 15 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-phenylene in which at least one hydrogen is replaced by halogen, methyl or trifluoromethyl, or 1,4-cyclohexylene in which at least one hydrogen is replaced by fluorine; $Z^2$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —O$CH_2$—; and $R^2$ independently represents hydrogen, fluorine, chlorine or alkyl having from 1 to 5 carbon atoms,
in the formula (3), $Y^3$ independently represents alkylene having from 1 to 15 carbon atoms, and not-adjacent arbitrary —$CH_2$— in the alkylene may be replaced by —O—, —COO—, —OCO— or —CO—; $A^3$ independently represents 1,4-phenylene, 1,4-cyclohexylene, 1,4-cyclohexenylene, pyridin-2,5-diyl, pyridazin-3,6-diyl, pyrimidin-2,5-diyl, naphthalen-2,6-diyl, tetrahydronaphthalen-2,6-diyl, 1,3-dioxan-2,5-diyl, 1,4-phenylene in which at least one hydrogen is replaced by halogen, methyl or trifluoromethyl, or 1,4-cyclohexylene in which at least one hydrogen is replaced by fluorine; $Z^3$ independently represents a single bond, —COO—, —OCO—, —OCOO—, —$CH_2CH_2$—, —C≡C—, —CH=CH—COO—, —OCO—CH=CH—, —$C_2H_4$—COO—, —OCO—$C_2H_4$—, —$CH_2$O— or —O$CH_2$—; $R^{31}$ independently represents hydrogen or alkyl having from 1 to 5 carbon atoms; and $R^{32}$ independently represents hydrogen, fluorine, chlorine or alkyl having from 1 to 5 carbon atoms,
in the formula (4), $R^4$ independently represents methyl or ethyl; $Y^4$ independently represents alkylene having from 1 to 15 carbon atoms, and not-adjacent arbitrary —$CH_2$— in the alkylene may be replaced by —O—, —COO—, —OCO— or —CO—; $A^{41}$ independently represents 1,4-phenylene or 4,4'-biphenylene; $A^{42}$ independently represents 1,4-phenylene, 4,4'-biphenylene or 1,4-phenylene in which at least one hydrogen is replaced by fluorine; $Z^4$ independently represents —COO— or —OCO—; and $p^4$ independently represents an integer of from 1 to 3, and when $p^4$ is 2 or 3, plural rings represented by $A^{42}$ may be all the same rings or may be constituted by at least two different rings, and plural bonding groups represented by $Z^4$ may be all the same bonding groups or may be constituted by at least two different bonding groups,
in the formula (5), $A^{51}$ represents 1,4-phenylene, 2-methyl-1,4-phenylene, fluoren-2,7-diyl, 9-methylfluoren-2,7-diyl, 9,9'-dimethylfluoren-2,7-diyl or naphthalen-2,6-diyl; $A^{52}$ independently represents 1,4-phenylene or 1,4-phenylene in which at least one hydrogen is replaced by halogen or methyl; and $Q^1$ independently represents a group represented by one of the formulae (q1-1) to (q1-4), $R^5$ in the formula (q1-4) represents methyl or ethyl, and when both of two $Q^1$'s represent a group represented by the formula (q1-4), $R^5$ independently represents methyl or ethyl, and
in the formula (6), $Y^6$ independently represents alkylene having from 1 to 15 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or halogen; $Z^6$ independently represents a single bond, —COO—, —OCO—, —OCOO—, —CH=CH—COO—, —OCO—CH=CH—, —$C_2H_4$—COO— or —OCO—$C_2H_4$—; $p^6$ independently represents an integer of from 0 to 3, and when $p^6$ is 2 or 3, plural rings represented by $A^6$ may be all the same rings or may be constituted by at least two different rings, and plural bonding groups represented by $Z^6$ may be all the same bonding groups or may be constituted by at least two different bonding groups; and $Q^2$ independently represents a group represented by the formula (q2-1) or (q2-2), wherein $R^6$ independently represents hydrogen, methyl or ethyl,
wherein,
a ratio of the component A is from 5 to 98% by weight, a ratio of the component B is from 1 to 60% by weight, and a ratio of the component C is from 1 to 35% by weight, based on a total amount of the components A to C;
a weight ratio of the component D is from 0.001 to 0.90, and a weight ratio of the component E is from 0.0001 to 0.015, based on a total amount of the components A to C; and
a ratio of the solvent in the polymerizable liquid crystal composition is from 40 to 95% by weight.

2. The polymerizable liquid crystal composition according to claim 1, wherein
in the formula (1), $Y^1$ independently represents alkylene having from 1 to 12 carbon atoms, and not-adjacent arbitrary —$CH_2$— in the alkylene may be replaced by —O—, —COO—, —OCO— or —CO—,
in the formula (2), $Y^2$ independently represents alkylene having from 1 to 12 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene, 1,4-cyclohexylene in which at least one hydrogen is replaced by fluorine, or 1,4-phenylene in which at least one hydrogen is replaced by fluorine or methyl; $Z^2$ independently represents —COO— or —OCO—; and $R^2$ independently represents hydrogen, fluorine or alkyl having from 1 to 3 carbon atoms,
in the formula (3), $Y^3$ independently represents alkylene having from 1 to 12 carbon atoms, and not-adjacent arbitrary —$CH_2$— in the alkylene may be replaced by —O—, —COO—, —OCO— or —CO—; $A^3$ independently represents 1,4-phenylene, 1,4-cyclohexylene or 1,4-phenylene in which at least one hydrogen is replaced by fluorine or methyl; $Z^3$ independently represents —COO— or —OCO—; $R^{31}$ independently represents hydrogen, methyl or ethyl; and $R^{32}$ independently represents hydrogen, fluorine or alkyl having from 1 to 3 carbon atoms, in the formula (4), $Y^4$ independently represents alkylene having from 1 to 12 carbon atoms, and not-adjacent arbitrary —$CH_2$— in the alkylene may be replaced by —O—, —COO—, —OCO— or —CO—, in the formula (5), $A^{52}$ independently represents 1,4-phenylene or 1,4-phenylene in which at least one hydrogen is replaced by fluorine or methyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or fluorine; and $Z^6$ independently represents a single bond, —COO— or —OCO—, and the nonionic surfactant is a fluorine series, silicone series or hydrocarbon series nonionic surfactant; the anionic surfactant is a sulfate ester anionic surfactant; and the cationic surfactant is a quaternary ammonium cationic surfactant.

3. The polymerizable liquid crystal composition according to claim 1, wherein in the formula (1), $Y^1$ independently represents alkylene having from 1 to 12 carbon atoms, and not-adjacent arbitrary —$CH_2$— in the alkylene may be replaced by —O—, —COO—, —OCO— or —CO—, in the formula (2), $Y^2$ independently represents alkylene having from 1 to 12 carbon atoms, and not-adjacent arbitrary —$CH_2$— in the alkylene may be replaced by —O—, —COO—, —OCO— or —CO—; $A^2$ independently represents 1,4-phenylene, 1,4-cyclohexylene or 1,4-phenylene in which at least one hydrogen is replaced by fluorine or methyl; $Z^2$ independently represents —COO— or —OCO—; and $R^2$ independently represents hydrogen, fluorine or methyl, in the formula (3), $Y^3$ independently represents alkylene having from 1 to 12 carbon atoms, and not-adjacent arbitrary —$CH_2$— in the alkylene may be replaced by —O—, —COO—, —OCO— or —CO—; $A^3$ independently represents 1,4-phenylene 1,4-cyclohexylene or 1,4phenylene in which at least one hydrogen is replaced by fluorine or methyl; $Z^3$ independently represents —COO— or —OCO—; $R^{31}$ independently represents hydrogen, methyl or ethyl; and $R^{32}$ independently represents hydrogen, fluorine or methyl, in the formula (4), $Y^4$ independently represents alkylene having from 1 to 12 carbon atoms, and not-adjacent arbitrary —$CH_2$— in the alkylene may be replaced by —O—, —COO—, —OCO— or —CO—; and $p^4$ independently represents an integer of from 0 to 2, and when $p^4$ is 2, two rings represented by $A^{42}$ may be the same rings or different rings, and two bonding groups represented by $Z^4$ may be the same bonding groups or different bonding groups, in the formula (5), $A^{51}$ represents 1,4-phenylene, 2-methyl-1,4-phenylene, fluoren-2,7-diyi, 9-methylfluoren-2,7-diyl or 9,9'-dimethylfluoren-2,7-diyl; and $A^{52}$ independently represents 1,4-phenylene or 1,4-phenylene in which at least one hydrogen is replaced by fluorine or methyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—; $A^6$ independently represents 1,4-phenylene, 1,4'-biphenylene or 1,4-phenylene in which at least one hydrogen is replaced by methyl or fluorine; $Z^6$ independently represents a single bond, —COO— or —OCO—; and $p^6$ independently represents an integer of from 1 or 2, and when $p^6$ is 2, two rings represented by $A^6$ may be the same rings or different rings, and two bonding groups represented by $Z^6$ may be the same bonding groups or different bonding groups, and the nonionic surfactant is a fluorine series, silicone series or hydrocarbon series nonionic surfactant; the anionic surfactant is a sulfate ester anionic surfactant; and the cationic surfactant is a quaternary ammonium cationic surfactant.

4. The polymerizable liquid crystal composition according to claim 1, wherein in the formula (1), $Y^1$ represents alkylene having from 1 to 12 carbon atoms, and not-adjacent arbitrary —$CH_2$— in the alkylene may be replaced by —O—, —COO—, —OCO— or —CO—, in the formula (2), $Y^2$ represents alkylene haying from 1 to 12 carbon atoms, and not-adjacent arbitrary —$CH_2$— in the alkylene may be replaced by —O—, —COO—, —OCO— ; —CO—$A^2$ represents 1,4-phenylene or 1,4-phenylene in which at least one hydrogen is replaced by fluorine; $Z^2$ independently represents —COO— or —OCO—; and $R^2$ independently represents hydrogen or methyl, in the formula (3), $Y^3$ represents alkylene having from 1 to 12 carbon atoms, and not-adjacent arbitrary —$CH_2$— in the alkylene may be replaced by —O—, —COO—,— OCO— or —CO—; $A^3$ represents 1,4-phenylene or 1,4-phenylene in which at least one hydrogen is replaced by fluorine; $Z^3$ independently represents —COO— or —OCO—; $R^{31}$ represents methyl or ethyl; and $R^{32}$ independently represents hydrogen or methyl, in the formula (4), $R^4$ represents methyl or ethyl; $Y^4$ independently represents alkylene having from 1 to 12 carbon atoms, and not-adjacent arbitrary —$CH_2$— in the alkylene may be replaced by —O—, —COO— OCO— or —CO—; $A^{41}$ represents 1,4-phenylene or 4,4'-biphenylene: $A^{42}$ represents 1,4-phenylene, 4,4'-biphenylene or 1,4-phenylene in which at least one hydrogen is replaced by fluorine; $Z^4$ represents —COO— or —OCO—; and $p^4$ represents an integer of from 1 to 2, and when $p^4$ is 2, two rings represented by $A^{42}$ may be the same rings or different rings, and two bonding groups represented by $Z_4$ may be the same bonding groups or different bonding groups, in the formula (5), $A^{51}$ represents 1,4-phenylene, 2-methyl-1,4-phenylene, fluoren-2,7-diyl, 9-methylfluoren-2,7-diyl or 9,9'-dimethylfluoren-2,7-diyl; $A^{52}$ represents 1,4-phenylene or 1,4-phenylene in which at least one hydrogen is replaced by fluorine; and $Q^1$ represents a group represented by one of the formulae (q1-1) to (q1-4), and $R^5$ the formula (q1-4) represents methyl or ethyl, in the formula (6), $Y^6$ independently represents alkylene having from 1 to 12 carbon atoms, and not-adjacent arbitrary —$CH_2$— in the alkylene may be replaced by —O—, —COO—, —OCO— or —CO—$A^6$ (independently represents 1,4-phenylene, 1,4'-biphenylene or 1,4-phenylene in which at least one hydrogen is replaced by methyl or fluorine; $Z^6$ independently represents a single bond, —COO— or —OCO—; $p^6$ represents an integer of from 1 or 2, and when $p^6$ is 2, two rings represented by $A^6$ may be the same rings or different rings, and two bonding groups represented by $Z^6$ may be the same bonding groups or different bonding groups; and $Q^2$ represents a group represented by the formula (q2-1) or (q2-2), wherein $R^6$ independently represents hydrogen, methyl or ethyl, and the nonionic surfactant is a fluorine series, silicone series or hydrocarbon sties nonionic surfactant; the anionic surfactant is a sulfate ester anionic surfactant; and the cationic surfactant is a quaternary ammonium cationic surfactant.

5. The polymetizable liquid crystal composition according to claim 1, where in
a ratio of the component A is from 15 to 98% by weight, a ratio of the component B is from 1 to 55% by weight, and a ratio of the component C is from 1 to 30% by weight, based on a total amount of the components A to C; and
a weight ratio of the component D is from 0.005 to 0.80, and a weight ratio of the component E is from 0.0001 to 0.01, based on a total amount of the components A to C.

6. The polymerizable liquid crystal composition according to claim 1, wherein
a ratio of the component A is from 23 to 98% by weight, a ratio of the component B is from 1 to 50% by weight, and a ratio of the component C is from 1 to 27% by weight, based on a total amount of the components A to C; and
a weight ratio of the component D is from 0.010 to 0.70, and a weight ratio of the component E is from 0.0001 to 0.007, based on a total amount of the components A to C.

7. The polymerizable liquid crystal composition according to claim 1, wherein
a ratio of the component A is from 30 to 98% by weight, a ratio of the component B is from 1 to 45% by weight, and a ratio of the component C is from 1 to 25% by weight, based on a total amount of the components A to C; and
a weight ratio of the component D is from 0.015 to 0.60, and a weight ratio of the component E is from 0.0003 to 0,007, based on a total amount of the components A to C.

8. A polymer obtained by polymeierizing the polymerizable liquid crystal composition according to claim 1.

9. An optically anisotropic film having a liquid crystal phase fixed in orientation, obtained by coating the polymerizable liquid crystal composition according to claim 1 on a supporting substrate, orienting the coated composition, and then polymerizing the oriented composition through radiation with all electromagnetic wave.

10. The optically anisotropic film according to claim 9, wherein the electromagnetic. wave radiated is an ultraviolet ray.

11. The optically anisotropic film according to claim 9, wherein the fixed orientation of the liquid crystal phase is a planar orientation.

12. An optical device comprising the optically anisotropic film according to claim 9.

13. The optical device according to claim 12, wherein the optically anisotropic film has circular dichroism.

14. The optical device according to claim 13, wherein the optical device exhibits circular dichroism to light having a wavelength of a part or the whole of a visible region of from 350 to 750 nm.

15. The optical device according to claim 13, wherein the optical device exhibits circular dichroism to light having, a wavelength of the whole of a visible region of from 350 to 750 nm with a helical structure induced by a chiral nematic phase or a cholesteric phase, in which a pitch is continuously changed in a thickness direction of the polymer having optical anisotropy.

16. The optical device according claim 14, wherein the optical device contains two or more layers of polymers each having different wavelength ranges exhibiting circular dichroism, and selectively reflects light having a wavelength of the whole range of from 350 to 750 nm.

17. An optical device comprising the optical device according to claim 12 having provided therewith a layer functioning as a ¼ wavelength plate.

18. The optical device according to claim 12, wherein the optical device functions as a brightness enhancing film.

19. The optical device according to claim 12, wherein the optical device exhibits circular dichroism to light having a wavelength of an ultraviolet region of from 100 to 350 nm.

20. The optical device according to claim 12, wherein the optical device exhibits circular dichroism to light having a wavelength of a near infrared region of from 800 to 2,500 nm.

21. The optical device according to claim 12, wherein the optical device exhibits circular dichroism to light having a wavelength of a range of from 800 to 2,500 nm, and contains two or more layers of polymers each having helical structures opposite to each other in helical direction induced by a chiral nematic phase or a cholesteric phase.

22. The optical device according to claim 20, the optical device functions as an infrared ray reflection film.

23. The optical device according to claim 21, the optical device functions as an infrared ray reflection film.

24. A liquid crystal display device comprising the optical device according to claim 12.

25. A liquid crystal display device comprising the optical device according to claim 13.

26. A liquid crystal display device comprising the optical device according to claim 14.

27. A liquid crystal display device comprising the optical device according to claim 15.

28. A liquid crystal display device comprising the optical device according to claim 16.

29. .A liquid crystal display device comprising the optical device according to claim 17.

30. A liquid crystal display device comprising the optical device according to claim 18.

31. A liquid crystal display device comprising the optical device according to claim 19.

* * * * *